(12) United States Patent
Smith et al.

(10) Patent No.: US 11,608,050 B1
(45) Date of Patent: *Mar. 21, 2023

(54) ELECTRIFIED MILITARY VEHICLE

(71) Applicant: Oshkosh Defense, LLC, Oshkosh, WI (US)

(72) Inventors: Chad Smith, Omro, WI (US); Rachell Harsh, Oshkosh, WI (US); Mitchel Nordahl, Oshkosh, WI (US); Mikel Ullman, Oshkosh, WI (US); Jessica Szymanski, Oshkosh, WI (US); Bradon Zeitler, Oshkosh, WI (US); Deepak Shukla, Oshkosh, WI (US); Ed Trinklein, Oshkosh, WI (US)

(73) Assignee: Oshkosh Defense, LLC, Oshkosh, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/566,541

(22) Filed: Dec. 30, 2021

Related U.S. Application Data

(60) Provisional application No. 63/233,006, filed on Aug. 13, 2021, provisional application No. 63/232,873, (Continued)

(51) Int. Cl.
*B60W 20/15* (2016.01)
*B60W 20/17* (2016.01)
(Continued)

(52) U.S. Cl.
CPC ............ *B60W 20/15* (2016.01); *B60W 10/06* (2013.01); *B60W 10/08* (2013.01); *B60W 10/30* (2013.01);
(Continued)

(58) Field of Classification Search
CPC ...... B60W 10/30; B60W 20/15; B60W 20/17; B60W 50/082; B60W 2300/26;
(Continued)

(56) References Cited

U.S. PATENT DOCUMENTS

| 5,081,365 A | 1/1992 | Field et al. | |
| 5,343,970 A * | 9/1994 | Severinsky | ........... B60W 10/26 |
| | | | 475/5 |

(Continued)

FOREIGN PATENT DOCUMENTS

| CN | 102490584 A * | 6/2012 | ............. B60K 6/387 |
| DE | 102014201355 A1 * | 7/2015 | ............. B60K 6/383 |

(Continued)

*Primary Examiner* — David A Testardi
(74) *Attorney, Agent, or Firm* — Foley & Lardner LLP

(57) ABSTRACT

A control system for operating a military vehicle according to different modes includes processing circuitry that receives a user input indicating a selected mode of the different modes, and operates a driveline and a front end accessory drive (FEAD) of the military vehicle according to the selected mode. The driveline of the military vehicle includes an engine and an integrated motor generator (IMG) and the FEAD includes multiple accessories and an electric motor-generator. The modes include an engine mode and an electric mode. In the engine mode, the engine drives the FEAD and drives tractive elements of the military vehicle through the IMG for transportation. In the electric mode, the engine is shut off to reduce a sound output of the military vehicle and the IMG drives the tractive elements of the military vehicle for transportation and the electric motor-generator drives the FEAD.

19 Claims, 27 Drawing Sheets

Related U.S. Application Data filed on Aug. 13, 2021, provisional application No. 63/232,891, filed on Aug. 13, 2021, provisional application No. 63/232,870, filed on Aug. 13, 2021.

(51) Int. Cl.
*B60W 10/06* (2006.01)
*B60W 10/08* (2006.01)
*B60W 10/30* (2006.01)

(52) U.S. Cl.
CPC ......... *B60W 20/17* (2016.01); *B60W 2300/26* (2013.01); *B60W 2510/0657* (2013.01); *B60W 2510/083* (2013.01); *B60W 2510/244* (2013.01); *B60W 2552/15* (2020.02); *B60W 2710/1022* (2013.01)

(58) Field of Classification Search
CPC ...... B60Y 2400/47; B60K 6/383; B60K 6/48; B60K 6/485; B60K 2006/4825; B60K 2025/005; F02B 67/06
See application file for complete search history.

(56) References Cited

U.S. PATENT DOCUMENTS

| | | | |
|---|---|---|---|
| 5,713,424 A | 2/1998 | Christenson | |
| 5,720,589 A | 2/1998 | Christenson et al. | |
| 5,725,350 A | 3/1998 | Christenson | |
| 5,769,055 A * | 6/1998 | Motose | F02D 41/22 123/198 D |
| 5,769,592 A | 6/1998 | Christenson | |
| 5,775,867 A | 7/1998 | Christenson | |
| 5,785,486 A | 7/1998 | McNeilus et al. | |
| 5,785,487 A | 7/1998 | McNeilus et al. | |
| 5,820,150 A | 10/1998 | Archer et al. | |
| 5,833,429 A | 11/1998 | McNeilus et al. | |
| 5,851,100 A | 12/1998 | Brandt | |
| 5,857,822 A | 1/1999 | Christenson | |
| 5,863,086 A | 1/1999 | Christenson | |
| 5,868,543 A | 2/1999 | McNeilus et al. | |
| 5,885,049 A | 3/1999 | McNeilus et al. | |
| 5,897,123 A | 4/1999 | Cherney et al. | |
| 6,083,138 A * | 7/2000 | Aoyama | B60W 10/08 903/945 |
| 6,086,074 A | 7/2000 | Braun | |
| 6,123,347 A | 9/2000 | Christenson | |
| 6,371,227 B2 | 4/2002 | Bartlett | |
| 6,516,914 B1 | 2/2003 | Andersen et al. | |
| 6,561,718 B1 | 5/2003 | Archer et al. | |
| 6,672,415 B1 * | 1/2004 | Tabata | B60L 58/34 903/910 |
| 6,764,085 B1 | 7/2004 | Anderson | |
| 6,779,806 B1 | 8/2004 | Breitbach et al. | |
| 6,832,148 B1 | 12/2004 | Bennett et al. | |
| 6,883,815 B2 | 4/2005 | Archer | |
| 6,976,688 B2 | 12/2005 | Archer et al. | |
| 7,073,620 B2 | 7/2006 | Braun et al. | |
| 7,207,582 B2 | 4/2007 | Siebers et al. | |
| 7,222,004 B2 | 5/2007 | Anderson | |
| 7,258,194 B2 | 8/2007 | Braun et al. | |
| 7,302,320 B2 | 11/2007 | Nasr et al. | |
| 7,331,586 B2 | 2/2008 | Trinkner et al. | |
| 7,357,203 B2 | 4/2008 | Morrow et al. | |
| 7,379,797 B2 | 5/2008 | Nasr et al. | |
| 7,439,711 B2 | 10/2008 | Bolton | |
| 7,472,914 B2 | 1/2009 | Anderson et al. | |
| 7,521,814 B2 | 4/2009 | Nasr | |
| 7,770,506 B2 | 8/2010 | Johnson et al. | |
| 7,848,857 B2 | 12/2010 | Nasr et al. | |
| 7,878,750 B2 | 2/2011 | Zhou et al. | |
| 7,905,540 B2 | 3/2011 | Kiley et al. | |
| 7,937,194 B2 | 5/2011 | Nasr et al. | |
| 8,000,850 B2 | 8/2011 | Nasr et al. | |
| 8,201,656 B2 | 6/2012 | Archer et al. | |
| 8,333,390 B2 | 12/2012 | Linsmeier et al. | |
| 8,337,352 B2 | 12/2012 | Morrow et al. | |
| 8,376,077 B2 | 2/2013 | Venton-Walters | |
| 8,459,619 B2 | 6/2013 | Trinh et al. | |
| 8,465,025 B2 | 6/2013 | Venton-Walters et al. | |
| 8,561,735 B2 | 10/2013 | Morrow et al. | |
| 8,565,990 B2 | 10/2013 | Ortmann et al. | |
| 8,596,648 B2 | 12/2013 | Venton-Walters et al. | |
| 8,764,029 B2 | 7/2014 | Venton-Walters et al. | |
| 8,801,017 B2 | 8/2014 | Ellifson et al. | |
| 8,801,393 B2 | 8/2014 | Crabtree et al. | |
| 8,833,324 B2 | 9/2014 | O'Brien et al. | |
| 8,834,319 B2 | 9/2014 | Nefcy | |
| 8,839,902 B1 | 9/2014 | Archer et al. | |
| 8,864,613 B2 | 10/2014 | Morrow et al. | |
| 8,876,133 B2 | 11/2014 | Ellifson | |
| 8,955,859 B1 | 2/2015 | Richmond et al. | |
| 8,955,880 B2 | 2/2015 | Malcolm et al. | |
| 8,991,834 B2 | 3/2015 | Venton-Walters et al. | |
| 8,991,840 B2 | 3/2015 | Zuleger et al. | |
| 9,016,703 B2 | 4/2015 | Rowe et al. | |
| 9,045,014 B1 | 6/2015 | Verhoff et al. | |
| 9,114,804 B1 | 8/2015 | Shukla et al. | |
| 9,127,738 B2 | 9/2015 | Ellifson et al. | |
| 9,132,736 B1 | 9/2015 | Shukla et al. | |
| 9,174,686 B1 | 11/2015 | Messina et al. | |
| 9,291,230 B2 | 3/2016 | Ellifson et al. | |
| 9,302,129 B1 | 4/2016 | Betz et al. | |
| 9,303,715 B2 | 4/2016 | Dillman et al. | |
| 9,327,576 B2 | 5/2016 | Ellifson | |
| 9,328,986 B1 | 5/2016 | Pennau et al. | |
| 9,329,000 B1 | 5/2016 | Richmond et al. | |
| 9,376,102 B1 | 6/2016 | Shukla et al. | |
| 9,428,042 B2 | 8/2016 | Morrow et al. | |
| 9,434,321 B2 | 9/2016 | Perron et al. | |
| 9,452,750 B2 | 9/2016 | Shukla et al. | |
| 9,492,695 B2 | 11/2016 | Betz et al. | |
| 9,580,960 B2 | 2/2017 | Aiken et al. | |
| 9,580,962 B2 | 2/2017 | Betz et al. | |
| 9,650,032 B2 | 5/2017 | Kotloski et al. | |
| 9,651,120 B2 | 5/2017 | Morrow et al. | |
| 9,656,640 B1 | 5/2017 | Verhoff et al. | |
| 9,656,659 B2 | 5/2017 | Shukla et al. | |
| 9,669,679 B2 | 6/2017 | Zuleger et al. | |
| 9,677,334 B2 | 6/2017 | Aiken et al. | |
| 9,688,112 B2 | 6/2017 | Venton-Walters et al. | |
| 9,707,869 B1 | 7/2017 | Messina et al. | |
| 9,732,846 B2 | 8/2017 | Li et al. | |
| 9,764,613 B2 | 9/2017 | Rowe et al. | |
| 9,765,841 B2 | 9/2017 | Ellifson et al. | |
| 9,809,080 B2 | 11/2017 | Ellifson et al. | |
| 9,821,789 B2 | 11/2017 | Shukla et al. | |
| 9,890,024 B2 | 2/2018 | Hao et al. | |
| 9,908,520 B2 | 3/2018 | Shukla et al. | |
| 9,944,145 B2 | 4/2018 | Dillman et al. | |
| 9,970,515 B2 | 5/2018 | Morrow et al. | |
| 10,029,555 B2 | 7/2018 | Kotloski et al. | |
| 10,029,556 B2 | 7/2018 | Morrow et al. | |
| 10,030,737 B2 | 7/2018 | Dillman et al. | |
| 10,144,389 B2 | 12/2018 | Archer et al. | |
| 10,160,438 B2 | 12/2018 | Shukla et al. | |
| 10,167,027 B2 | 1/2019 | Perron et al. | |
| 10,221,055 B2 | 3/2019 | Hao et al. | |
| 10,267,390 B2 | 4/2019 | Morrow et al. | |
| 10,315,643 B2 | 6/2019 | Shukla et al. | |
| 10,350,956 B2 | 7/2019 | Dillman et al. | |
| 10,369,860 B2 | 8/2019 | Ellifson et al. | |
| 10,392,000 B2 | 8/2019 | Shukla et al. | |
| 10,392,056 B2 | 8/2019 | Perron et al. | |
| 10,407,288 B2 | 9/2019 | Hao et al. | |
| 10,421,332 B2 | 9/2019 | Venton-Walters et al. | |
| 10,422,403 B2 | 9/2019 | Ellifson et al. | |
| 10,434,995 B2 | 10/2019 | Verhoff et al. | |
| 10,435,026 B2 | 10/2019 | Shively et al. | |
| 10,457,134 B2 | 10/2019 | Morrow et al. | |
| 10,458,182 B1 | 10/2019 | Betz et al. | |
| 10,463,900 B1 | 11/2019 | Betz et al. | |
| 10,464,389 B2 | 11/2019 | Zuleger et al. | |
| 10,486,689 B2 | 11/2019 | Farrell et al. | |

(56) References Cited

U.S. PATENT DOCUMENTS

| | | | |
|---|---|---|---|
| D869,332 S | 12/2019 | Gander et al. | |
| 10,532,722 B1 | 1/2020 | Betz et al. | |
| 10,611,203 B1 | 4/2020 | Rositch et al. | |
| 10,611,204 B1 | 4/2020 | Zhang et al. | |
| 10,619,696 B2 | 4/2020 | Dillman et al. | |
| 10,632,805 B1 | 4/2020 | Rositch et al. | |
| 10,676,079 B1* | 6/2020 | Bucknor | B60K 6/28 |
| 10,723,282 B2 | 7/2020 | Perron et al. | |
| 10,724,616 B2 | 7/2020 | Katsura et al. | |
| 10,752,075 B1 | 8/2020 | Shukla et al. | |
| 10,759,251 B1 | 9/2020 | Zuleger | |
| 10,836,375 B2 | 11/2020 | Kaufman et al. | |
| 10,843,549 B2 | 11/2020 | Morrow et al. | |
| 10,858,231 B2 | 12/2020 | Holmes et al. | |
| 10,934,145 B2 | 3/2021 | Hao et al. | |
| 10,940,728 B2 | 3/2021 | Rositch et al. | |
| 10,953,939 B2 | 3/2021 | Zuleger et al. | |
| 10,960,248 B2 | 3/2021 | Betz et al. | |
| 10,967,728 B2 | 4/2021 | Kotloski et al. | |
| 10,974,561 B2 | 4/2021 | Dillman et al. | |
| 10,974,713 B2 | 4/2021 | Shukla et al. | |
| 10,974,724 B1 | 4/2021 | Shively et al. | |
| 10,981,538 B2 | 4/2021 | Archer et al. | |
| 10,982,736 B2 | 4/2021 | Steinberger et al. | |
| 10,988,132 B2 | 4/2021 | Ayesh et al. | |
| 10,989,279 B2 | 4/2021 | Morrow et al. | |
| 11,001,135 B2 | 5/2021 | Yakes et al. | |
| 11,007,863 B2 | 5/2021 | Yakes et al. | |
| 11,027,606 B2 | 6/2021 | Wildgrube et al. | |
| 11,034,206 B2 | 6/2021 | Zuleger | |
| 11,046,142 B2 | 6/2021 | Zhang et al. | |
| 11,052,899 B2 | 7/2021 | Shukla et al. | |
| 11,097,617 B2 | 8/2021 | Rocholl et al. | |
| 11,110,977 B2 | 9/2021 | Smith et al. | |
| 11,111,120 B2 | 9/2021 | Hao et al. | |
| 11,135,890 B2 | 10/2021 | Ellifson et al. | |
| 11,136,187 B1 | 10/2021 | Koga et al. | |
| 11,137,053 B2 | 10/2021 | Steinberger et al. | |
| 11,148,550 B2 | 10/2021 | Rocholl et al. | |
| 11,161,403 B2 | 11/2021 | Lo et al. | |
| 11,161,415 B1 | 11/2021 | Koga et al. | |
| 11,161,483 B2 | 11/2021 | Betz et al. | |
| 11,167,919 B1 | 11/2021 | Koga et al. | |
| 11,199,239 B2 | 12/2021 | Dumitru et al. | |
| 11,209,067 B2 | 12/2021 | Ellifson et al. | |
| 11,299,139 B2 | 4/2022 | Shukla et al. | |
| 11,376,958 B1* | 7/2022 | Smith | B60K 6/445 |
| | | | 180/65.23 |
| 11,377,089 B1* | 7/2022 | Smith | B60K 6/383 |
| 11,420,522 B1* | 8/2022 | Bernatchez | B62M 27/02 |
| 11,465,486 B1* | 10/2022 | Smith | B60K 6/28 |
| 11,498,409 B1* | 11/2022 | Smith | B60K 6/40 |
| 2005/0080523 A1* | 4/2005 | Bennett | B60K 6/445 |
| | | | 180/65.23 |
| 2005/0109550 A1* | 5/2005 | Buglione | B60K 6/48 |
| | | | 180/65.25 |
| 2005/0113996 A1 | 5/2005 | Pillar et al. | |
| 2005/0209747 A1 | 9/2005 | Yakes et al. | |
| 2005/0256631 A1 | 11/2005 | Cawthorne et al. | |
| 2007/0124037 A1 | 5/2007 | Moran | |
| 2007/0164552 A1 | 7/2007 | Bauer et al. | |
| 2007/0186896 A1* | 8/2007 | Carroll | F02B 67/06 |
| | | | 123/198 R |
| 2007/0278856 A1 | 12/2007 | Craig et al. | |
| 2008/0017426 A1 | 1/2008 | Walters et al. | |
| 2008/0020875 A1* | 1/2008 | Serrels | B60K 6/48 |
| | | | 474/70 |
| 2008/0150350 A1 | 6/2008 | Morrow et al. | |
| 2008/0234096 A1 | 9/2008 | Joshi et al. | |
| 2008/0284118 A1 | 11/2008 | Venton-Walters et al. | |
| 2009/0174158 A1 | 7/2009 | Anderson et al. | |
| 2009/0192660 A1 | 7/2009 | Tamor et al. | |
| 2009/0287366 A1* | 11/2009 | Davis | B60W 20/20 |
| | | | 701/22 |
| 2009/0298646 A1* | 12/2009 | Parsons | F16D 41/07 |
| | | | 474/171 |
| 2010/0019538 A1 | 1/2010 | Kiley et al. | |
| 2010/0049389 A1* | 2/2010 | Ando | G07C 5/0825 |
| | | | 180/65.265 |
| 2010/0065001 A1* | 3/2010 | Spicer | F02N 11/003 |
| | | | 180/65.21 |
| 2010/0138089 A1 | 6/2010 | James | |
| 2010/0145562 A1 | 6/2010 | Moran | |
| 2011/0079978 A1 | 4/2011 | Schreiner et al. | |
| 2012/0225751 A1* | 9/2012 | Andreae | F02B 67/06 |
| | | | 180/65.265 |
| 2012/0244979 A1 | 9/2012 | Kruger | |
| 2012/0328454 A1* | 12/2012 | Roby | F01P 7/046 |
| | | | 474/8 |
| 2013/0218386 A1 | 8/2013 | Fisker et al. | |
| 2014/0228168 A1* | 8/2014 | Kaufman | B60W 30/182 |
| | | | 180/65.265 |
| 2015/0188104 A1 | 7/2015 | Templeman et al. | |
| 2015/0247559 A1* | 9/2015 | Graves | F16F 15/067 |
| | | | 474/117 |
| 2015/0336568 A1 | 11/2015 | Porras et al. | |
| 2016/0052420 A1* | 2/2016 | Kim | B60W 20/12 |
| | | | 701/22 |
| 2016/0082951 A1* | 3/2016 | Ohn | B60W 10/26 |
| | | | 180/65.265 |
| 2016/0185207 A1* | 6/2016 | Gerschutz | B60K 6/365 |
| | | | 903/910 |
| 2017/0028978 A1 | 2/2017 | Dunlap et al. | |
| 2017/0066431 A1* | 3/2017 | Kim | B60W 10/08 |
| 2017/0120899 A1 | 5/2017 | Sugimoto et al. | |
| 2017/0282737 A1* | 10/2017 | Miller | B60L 50/62 |
| 2017/0297425 A1 | 10/2017 | Wildgrube et al. | |
| 2017/0355259 A1 | 12/2017 | Borud et al. | |
| 2018/0001839 A1 | 1/2018 | Perron et al. | |
| 2018/0009431 A1 | 1/2018 | Akuzawa | |
| 2018/0050685 A1 | 2/2018 | Atluri et al. | |
| 2018/0050686 A1 | 2/2018 | Atluri et al. | |
| 2018/0170349 A1* | 6/2018 | Jobson | B60L 7/18 |
| 2018/0281772 A1 | 10/2018 | Hilliard et al. | |
| 2018/0304882 A1* | 10/2018 | Koh | B60K 6/485 |
| 2018/0370373 A1 | 12/2018 | Hooper et al. | |
| 2019/0039407 A1 | 2/2019 | Smith | |
| 2019/0126759 A1 | 5/2019 | Miller et al. | |
| 2019/0135107 A1 | 5/2019 | Fortune et al. | |
| 2019/0143957 A1 | 5/2019 | Dalum et al. | |
| 2019/0202286 A1 | 7/2019 | Natsume et al. | |
| 2019/0276001 A1* | 9/2019 | Kava | B60W 50/082 |
| 2019/0291711 A1 | 9/2019 | Shukla et al. | |
| 2019/0308669 A1 | 10/2019 | Aitharaju et al. | |
| 2019/0316650 A1 | 10/2019 | Dillman et al. | |
| 2019/0344838 A1 | 11/2019 | Perron et al. | |
| 2020/0001698 A1* | 1/2020 | Jang | B60W 10/26 |
| | | | 180/65.265 |
| 2020/0047740 A1* | 2/2020 | Hoesl | B60K 6/40 |
| 2020/0056426 A1 | 2/2020 | Betz et al. | |
| 2020/0062071 A1 | 2/2020 | Zuleger et al. | |
| 2020/0108709 A1 | 4/2020 | Kohler et al. | |
| 2020/0171907 A1 | 6/2020 | Hall et al. | |
| 2020/0180440 A1* | 6/2020 | Uchimura | B60W 50/035 |
| 2020/0223276 A1 | 7/2020 | Rositch et al. | |
| 2020/0232533 A1 | 7/2020 | Dillman et al. | |
| 2020/0316816 A1 | 10/2020 | Messina et al. | |
| 2020/0317083 A1 | 10/2020 | Messina et al. | |
| 2020/0346547 A1 | 11/2020 | Rocholl et al. | |
| 2020/0346556 A1 | 11/2020 | Rocholl et al. | |
| 2020/0384823 A1 | 12/2020 | Shukla et al. | |
| 2020/0384977 A1 | 12/2020 | Higuchi et al. | |
| 2020/0386135 A1 | 12/2020 | Kobayashi et al. | |
| 2021/0031649 A1 | 2/2021 | Messina et al. | |
| 2021/0031837 A1 | 2/2021 | Schmidt | |
| 2021/0070371 A1 | 3/2021 | Ebisumoto et al. | |
| 2021/0070375 A1 | 3/2021 | Ebisumoto et al. | |
| 2021/0107361 A1 | 4/2021 | Linsmeier et al. | |
| 2021/0122205 A1 | 4/2021 | Shukla et al. | |
| 2021/0129757 A1* | 5/2021 | Uken | B60W 50/082 |
| 2021/0140517 A1 | 5/2021 | Steinberger et al. | |
| 2021/0143663 A1 | 5/2021 | Bolton | |

(56) References Cited

U.S. PATENT DOCUMENTS

| | | |
|---|---|---|
| 2021/0155063 A1 | 5/2021 | Rositch et al. |
| 2021/0155218 A1 | 5/2021 | Higuchi et al. |
| 2021/0171137 A1 | 6/2021 | Zuleger et al. |
| 2021/0178890 A1 | 6/2021 | Steinberger et al. |
| 2021/0188069 A1 | 6/2021 | Friedman |
| 2021/0188076 A1 | 6/2021 | Morrow et al. |
| 2021/0213822 A1 | 7/2021 | Ripley et al. |
| 2021/0213934 A1 | 7/2021 | Higuchi et al. |
| 2021/0221190 A1 | 7/2021 | Rowe |
| 2021/0221216 A1 | 7/2021 | Yakes et al. |
| 2021/0231411 A1 | 7/2021 | Grate et al. |
| 2021/0276450 A1 | 9/2021 | Eshleman et al. |
| 2021/0276643 A1 | 9/2021 | Ellifson et al. |
| 2021/0316588 A1 | 10/2021 | Zhang et al. |
| 2021/0323436 A1 | 10/2021 | Rocholl et al. |
| 2021/0323437 A1 | 10/2021 | Rocholl et al. |
| 2021/0323438 A1 | 10/2021 | Rocholl et al. |
| 2021/0327170 A1 | 10/2021 | Rocholl et al. |
| 2021/0327237 A1 | 10/2021 | Rocholl et al. |
| 2021/0339632 A1 | 11/2021 | Rocholl et al. |
| 2021/0339648 A1 | 11/2021 | Koga et al. |
| 2021/0354684 A1 | 11/2021 | Healy et al. |
| 2021/0369515 A1 | 12/2021 | Malcolm et al. |
| 2021/0380179 A1 | 12/2021 | Smith et al. |
| 2021/0396293 A1 | 12/2021 | Ellifson et al. |
| 2022/0049647 A1 | 2/2022 | Papaioannou et al. |
| 2022/0118845 A1 * | 4/2022 | Mu ............... B60W 20/20 701/22 |
| 2022/0371456 A1 * | 11/2022 | Borud ............ B60K 6/52 |

FOREIGN PATENT DOCUMENTS

| | | | | |
|---|---|---|---|---|
| DE | 102016204936 A1 | * | 9/2017 | ............ B60K 6/387 |
| DE | 10 2017 214 229 A1 | | 2/2018 | |
| DE | 10 2018 002 650 A1 | | 10/2019 | |
| DE | 10 2021 100 131 A1 | | 7/2021 | |
| EP | 1 995 482 A1 | | 11/2008 | |
| JP | 2000224710 A | * | 8/2000 | ............ B60K 6/383 |
| JP | 2007022309 A | * | 2/2007 | ............ B60K 6/383 |
| JP | 2012232714 A | * | 11/2012 | |
| WO | WO-2005/071819 A1 | | 4/2004 | |
| WO | WO-2012/139224 A1 | | 10/2012 | |
| WO | WO-2019/116589 A1 | | 6/2019 | |
| WO | WO-2020/097885 A1 | | 5/2020 | |

* cited by examiner

ELECTRIFIED MILITARY VEHICLE

CROSS-REFERENCE TO RELATED PATENT APPLICATIONS

This application claims the benefit of and priority to (a) U.S. Provisional Patent Application No. 63/232,870, filed Aug. 13, 2021, (b) U.S. Provisional Patent Application No. 63/232,873, filed Aug. 13, 2021, (c) U.S. Provisional Patent Application No. 63/232,891, filed Aug. 13, 2021, and (d) U.S. Provisional Patent Application No. 63/233,006, filed Aug. 13, 2021, all of which are incorporated herein by reference in their entireties.

BACKGROUND

Traditionally, military vehicles have been powered by internal combustion engines. However, such internal combustion engines and related systems can produce a significant amount of noise. Under certain circumstances, such as when in enemy territory and trying to remain discreet and unidentified, it may be advantageous to drive military vehicles and their associated subsystems with the engine off to mitigate the amount of noise being produced by the military vehicles, something that current military vehicles cannot provide.

SUMMARY

One embodiment relates to a control system for operating a driveline of a military vehicle according to different modes. The control system includes processing circuitry communicably coupled with a user interface and the driveline of the military vehicle. The driveline includes a front end accessory rive (FEAD) which includes multiple accessories and an electric motor-generator. The processing circuitry is configured to receive a user input from the user interface indicating a selected mode of the different modes, and operate the driveline according to the selected mode. The modes include an engine mode and an electric mode. In the engine mode, the processing circuitry is configured to operate the engine of the driveline to drive the FEAD and drive the tractive elements of the military vehicle through the IMG for transportation. In the electric mode, the processing circuitry is configured to shut off the engine to reduce a sound output of the military vehicle and operate the IMG to drive the tractive elements of the military vehicle for transportation. In the electric mode, the processing circuitry is also configured to operate the electric motor-generator to drive the FEAD.

Another embodiment relates to a control system for operating a military vehicle according to different modes. The control system includes processing circuitry configured to communicably couple with a user interface and a driveline of the military vehicle. The driveline includes an engine, an integrated motor generator (IMG), and a front end accessory drive (FEAD). The FEAD includes multiple accessories and an electric motor-generator. The processing circuitry is configured to receive a user input from the user interface indicating a selected mode of the modes and operate the driveline of the military vehicle according to the selected mode. The modes include an ultrasilent mode. In the ultrasilent mode, the processing circuitry is configured to shut off the engine, operate the IMG to drive tractive elements of the military vehicle for transportation, and disengage a fan of the FEAD.

Still another embodiment relates to a control system for operating a military vehicle according to a first mode, a second mode, a third mode, and a fourth mode. The control system includes processing circuitry configured to receive a user input from a user interface indicating a selected mode of the first mode, the second mode, the third mode, and the fourth mode. The processing circuitry is configured to operate a driveline and a front end accessory drive (FEAD) of the military vehicle according to the selected mode. The driveline includes an engine and an integrated motor generator (IMG). The FEAD includes multiple accessories and an electric motor-generator. In the first mode, the processing circuitry is configured to operate the engine to drive the FEAD, tractive elements of the military vehicle through the IMG for transportation, and the electric motor-generator of the FEAD to generate electrical energy for use or storage by one or more electrical components of the military vehicle. In the first mode, the processing circuitry is configured to operate the IMG to selectively function as a generator to generate electrical energy for use or storage by one or more electrical components of the military vehicle. In the second mode, the processing circuitry is configured to shut off the engine to reduce a sound output of the military vehicle, operate the IMG to drive the tractive elements of the military vehicle for transportation, and operate the electric motor-generator to drive the FEAD. In the second mode, the processing circuitry is configured to operate the electric motor-generator to drive the FEAD and the multiple accessories independently of operation of the engine and the IMG. In the third mode, the processing circuitry is configured to operate both the engine and the IMG to cooperatively drive the tractive elements of the military vehicle for transportation. In the third mode, the processing circuitry is configured to determine a maximum allowable torque based on a rating of a transmission of the military vehicle, obtain a current speed and a current amount of torque provided by the engine, and determine if the transmission can support additional torque based on a comparison between the current amount of the torque provided by the engine and the maximum allowable torque. In the third mode, the processing circuitry is configured to determine that the transmission can support additional torque if the current amount torque provided by the engine is less than the maximum allowable torque. In the third mode, in response to determining that the transmission can support additional torque, the processing circuitry is configured to operate the IMG to provide an additional amount of torque to the tractive elements, the additional amount of torque being less than or equal to a difference between the maximum allowable torque and the current amount of torque provided by the engine. In the fourth mode, the processing circuitry is configured to shut off the engine and operate the IMG to drives the tractive elements of the military vehicle for transportation. In the fourth mode, the processing circuitry is configured to disengage a fan of the FEAD to reduce a sound output of the military vehicle. The sound output of the military vehicle when operating in the fourth mode is less than the sound output of the military vehicle when operating in the second mode. The sound output of the military vehicle when operating in the second mode is less than the sound output of the military vehicle when operating in the first mode and the third mode.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
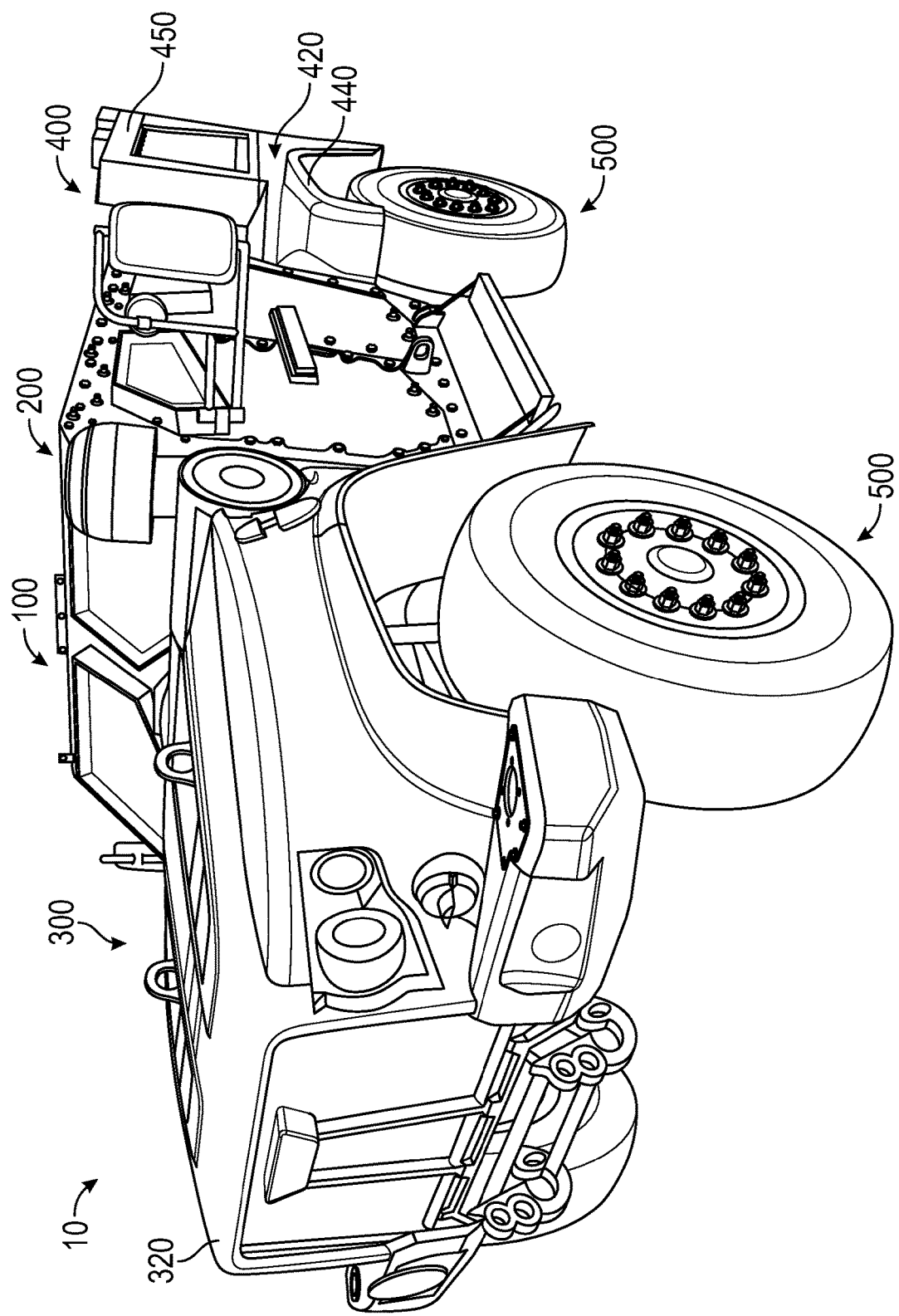
FIG. 1 is a front perspective view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure (e.g., a military vehicle, etc.) includes an electrified driveline. Specifically, the vehicle includes (i) a first driver including an internal combustion engine and (ii) a second driver including a motor/generator and a clutch. The clutch is positioned between the engine and the motor/generator. The engine can drive the driveline independently, the motor/generator can drive the driveline independently, and/or both the engine and the motor/generator can drive the driveline together. Such an electrified driveline arrangement facilitates operating the vehicle in variety of ways that current military vehicles are incapable of.

According to an exemplary embodiment, the vehicle of the present disclosure includes an engine and a FEAD. The FEAD can include a first belt and a second belt that are coupled with each other through a sprag clutch. The first belt is coupled with multiple accessories, which may include, but is not limited to, a fan, an air compressor, and an electric motor/generator. The second belt is coupled with an output of the engine and the sprag clutch. The sprag clutch is coupled with an additional accessory (e.g., a hydraulic pump). The FEAD is operable between an engine-driven mode and an electric-driven mode (e.g., an electrified mode). When the FEAD is operated in the engine-driven mode, the engine drives the second belt and the first belt (e.g., through the sprag clutch) and the accessories that are coupled with the sprag clutch and the first belt. When the FEAD is operated in the engine-driven mode, the electric motor/generator may be driven to generate electrical energy that can be stored in a battery or consumed by electric accessories of the vehicle. When the FEAD is operated in the electric-driven mode, the electric motor/generator drives the first belt and the accessories coupled with the first belt, and the additional accessory (e.g., the hydraulic pump) coupled with the sprag clutch. In the electric-driven mode, the electric motor/generator consumes electrical energy from the battery, and operates independently of operation of the engine.

According to an exemplary embodiment, the vehicle of the present disclosure includes an ESS with a large battery capable of providing electric vehicle propulsion. The ESS can be stored behind a cab within a bed cavity.

According to an exemplary embodiment, the vehicle of the present disclosure includes a control system. The control system includes a controller configured to operate the vehicle according to different modes. The modes include an engine mode, a dual-drive mode, an EV/silent mode, and/or an ultrasilent mode. In the engine mode, an engine of the vehicle drives the FEAD and tractive elements of the vehicle for transportation. In the dual-drive mode, both the engine and an IMG of the vehicle drive the tractive elements of the vehicle for transportation. In the EV/silent mode, the IMG drives the tractive elements of the vehicle for transportation with the engine shut off and an electric motor of the FEAD drives the FEAD. In the ultrasilent mode, the IMG drives the tractive elements of the vehicle for transportation with the engine shut off, the electric motor drives the FEAD, and a fan of the FEAD is disengaged to further reduce sound output of the vehicle during operation.

Overall Vehicle

Figure 2:
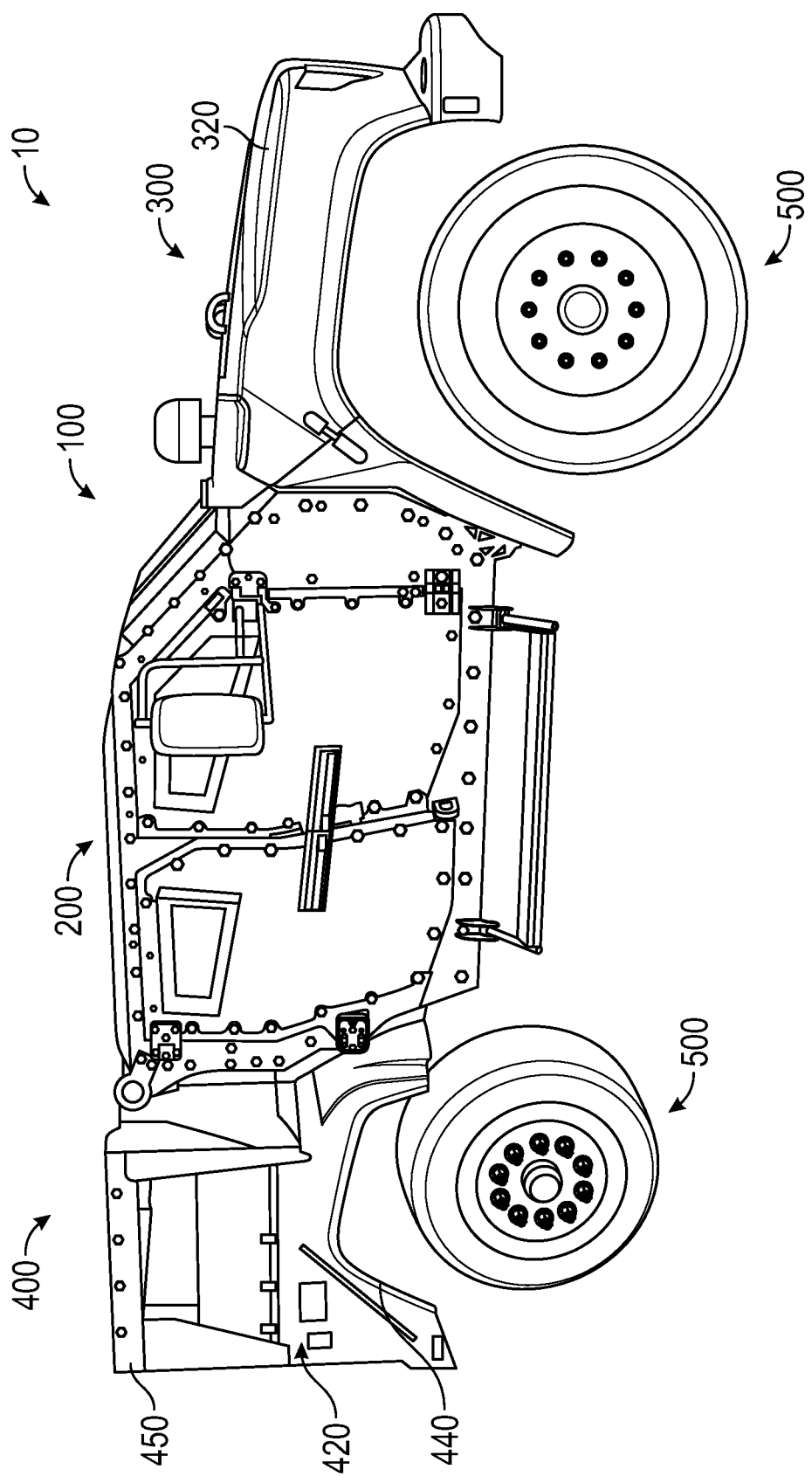
FIG. 2 is a side view of the vehicle of FIG. 1, according to an exemplary embodiment.
Figure 3:
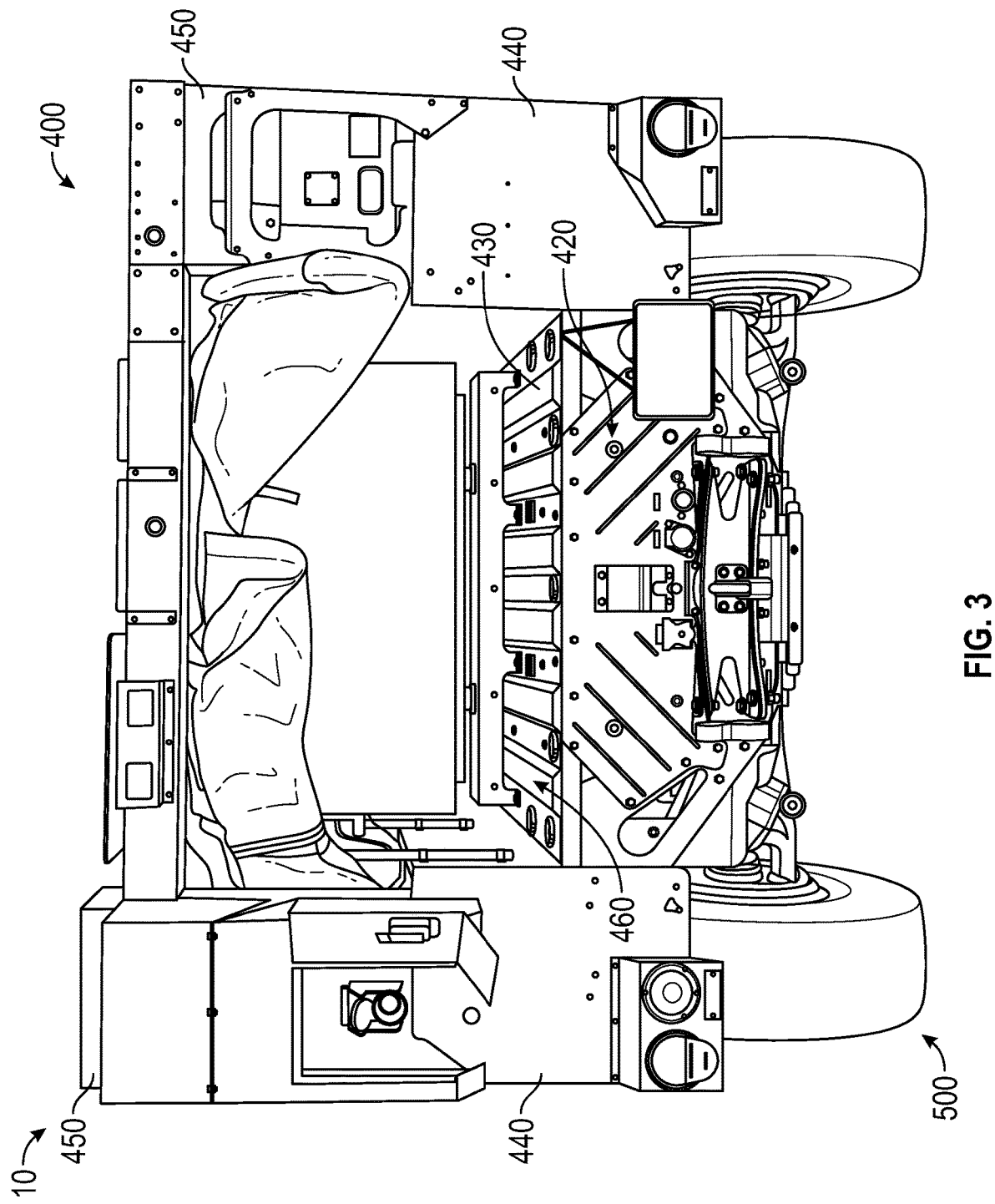
FIG. 3 is a rear view of the vehicle of FIG. 1, according to an exemplary embodiment.

According to the exemplary embodiment shown in FIGS. 1-3, a machine, shown vehicle 10, is configured as a military vehicle. In the embodiment shown, the military vehicle is a joint light tactical vehicle ("JLTV"). In other embodiments, the military vehicle is another type of military vehicle (e.g., a medium tactical vehicle, a heavy tactical vehicle, etc.). In an alternative embodiment, the vehicle 10 is another type of vehicle other than a military vehicle. For example, the vehicle 10 may be a fire apparatus (e.g., a pumper fire truck, a rear-mount aerial ladder truck, a mid-mount aerial ladder truck, a quint fire truck, a tiller fire truck, an airport rescue fire fighting ("ARFF") truck, etc.), a refuse truck, a concrete mixer truck, a tow truck, an ambulance, a farming machine or vehicle, a construction machine or vehicle, and/or still another vehicle.

As shown in FIGS. 1-14, the vehicle 10 includes a chassis assembly, shown as hull and frame assembly 100, including a passenger cabin, shown as passenger capsule 200, a first module, shown as front module 300, a second module, shown as rear module 400; a plurality of axle assemblies (e.g., including axles, differentials, wheels, brakes, suspension components, etc.), shown as axle assemblies 500, coupled to the front module 300 and the rear module 400; and a first electrified driveline arrangement (e.g., a powertrain, a drivetrain, including an accessory drive, etc.), shown as driveline 600.

According to an exemplary embodiment, the passenger capsule 200 provides a robust and consistent level of protection by using overlaps to provide further protection at the door interfaces, component integration seams, and panel joints. The passenger capsule 200 may be manufactured from high hardness steel, commercially available aluminum alloys, ceramic-based SMART armor, and/or other suitable materials to provide a 360-degree modular protection system with two levels of underbody mine/improvised explosive device ("TED") protection. The modular protection system provides protection against kinetic energy projectiles and fragmentation produced by IEDs and overhead artillery fire. The two levels of underbody protection may be made of an aluminum alloy configured to provide an optimum combination of yield strength and material elongation. Each protection level uses an optimized thickness of this aluminum alloy to defeat underbody mine and IED threats.

According to an exemplary embodiment, the passenger capsule 200 is a structural shell that forms a monocoque hull structure. Monocoque refers to a form of vehicle construction in which the vehicle body and chassis form a single unit. In some embodiments, the passenger capsule 200 includes a plurality of integrated armor mounting points configured to engage a supplemental armor kit (e.g., a "B-Kit," etc.). According to the exemplary embodiment shown in FIGS. 1, 2, 4, 5, 9, and 10, the passenger capsule 200 accommodates four passengers in a two-by-two seating arrangement and has four doors mounted thereto. According to the alternative embodiment shown in FIG. 8, the passenger capsule 200 accommodates two passengers and has two doors mounted thereto.

Figure 4:
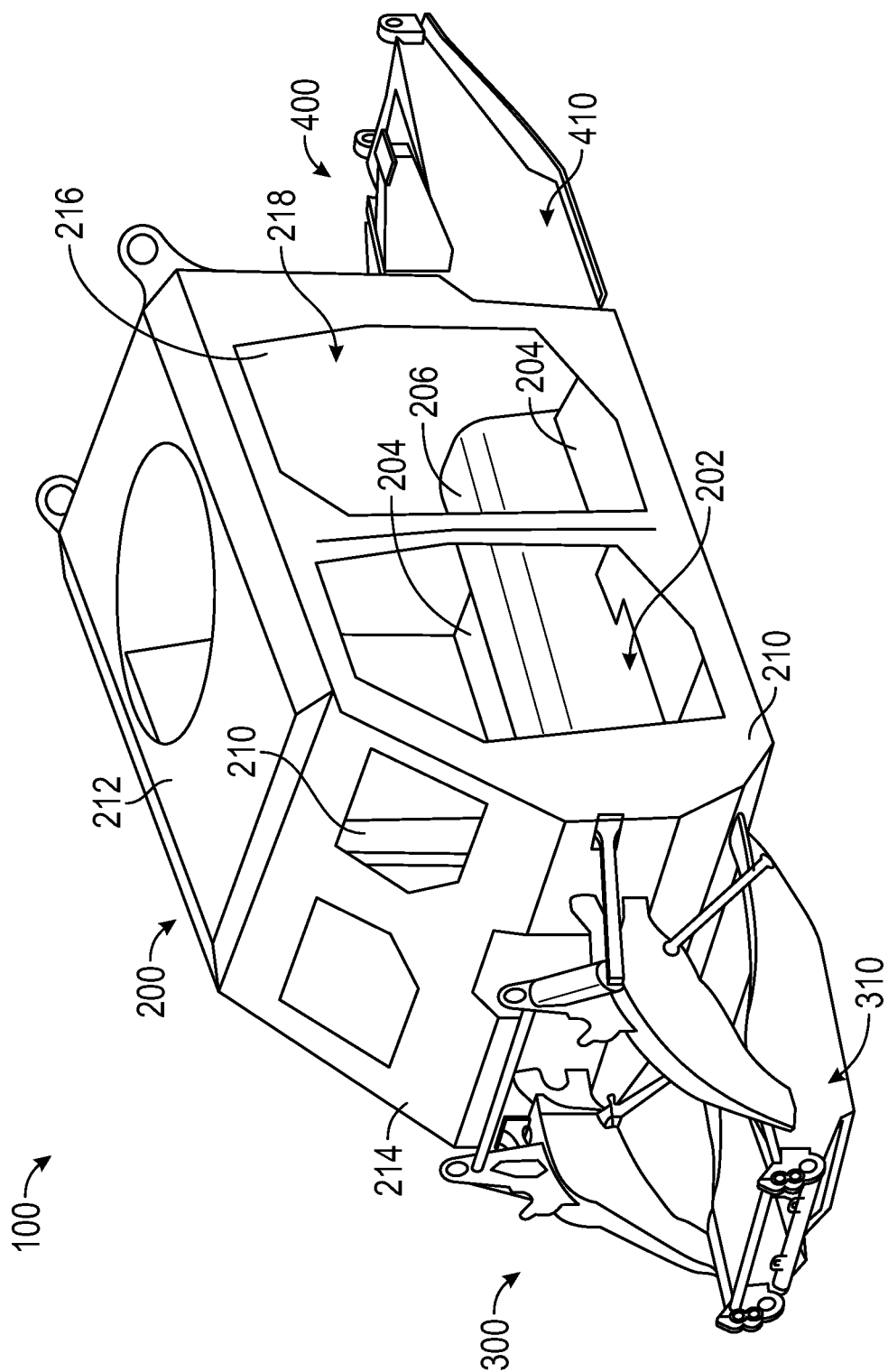
FIG. 4 is a perspective view of a chassis assembly of the vehicle of FIG. 1 including a passenger capsule, a front module, and a rear module, according to an exemplary embodiment.
Figure 5:
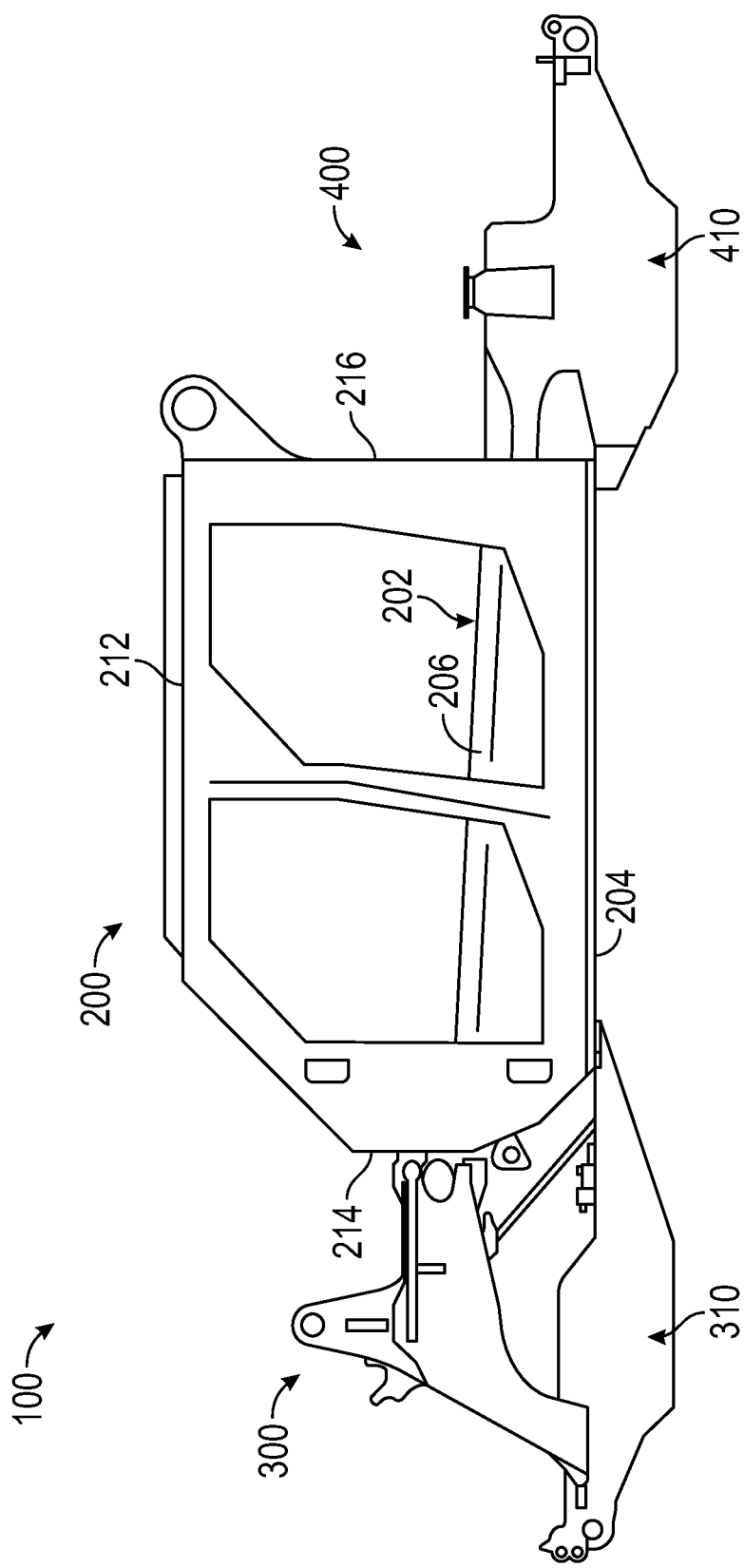
FIG. 5 is a side view of the chassis assembly of FIG. 4, according to an exemplary embodiment.
Figure 6:
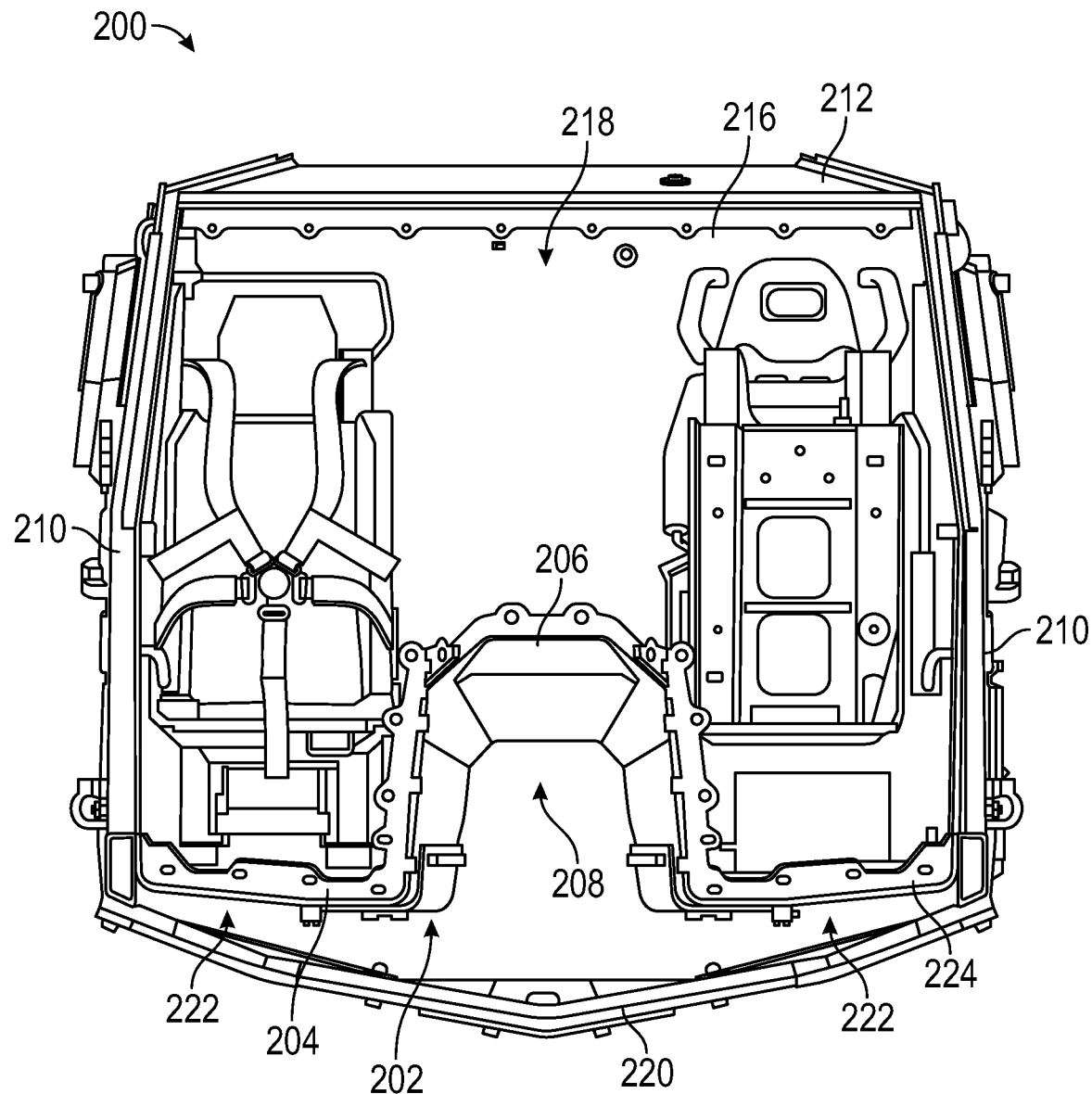
FIG. 6 is a cross-sectional view of the passenger capsule of FIG. 4, according to an exemplary embodiment.

As shown in FIGS. 4-6, the passenger capsule 200 includes a floor assembly, shown as floor assembly 202, having a pair of floor portions, shown as floor portions 204, laterally spaced apart and separated by a central tunnel, shown as structural tunnel 206, extending longitudinally along a centerline of the passenger capsule 200. According to an exemplary embodiment, for load purposes, the structural tunnel 206 replaces a frame or rail traditionally used in vehicle chassis. As shown in FIG. 6, the structural tunnel 206 (i) has an arcuately shaped cross-section that extends upward into an interior, shown as passenger compartment 218, of the passenger capsule 200 and (ii) defines a cavity or recessed space, shown as tunnel slot 208. The configuration of the structural tunnel 206 increases the distance between the ground and the passenger compartment 218 of the passenger capsule 200. Accordingly, the structural tunnel 206 may provide greater blast protection from IEDs located on the ground (e.g., because the IED has to travel a greater distance in order to penetrate the structural tunnel 206).

As shown in FIGS. 4-6, the passenger capsule 200 additionally includes a pair of side panels, shown as sidewalls 210, coupled to opposing lateral sides of the floor assembly 202; a top panel, shown as roof 212, coupled to the sidewalls 210 opposite the floor assembly 202; a front panel, shown as front wall 214, coupled to front ends of the floor assembly 202, the sidewalls 210, and the roof 212; and a rear panel, shown as rear wall 216, coupled to rear ends of the floor assembly 202, the sidewalls 210, and the roof 212. As shown in FIGS. 4 and 6, the floor assembly 202, the sidewalls 210, the roof 212, the front wall 214, and the rear wall 216 cooperatively define the passenger compartment 218.

As shown in FIG. 6, the passenger capsule 200 includes a belly deflector, shown as v-shaped belly deflector 220, coupled to bottom ends of the sidewalls 210 and across the bottom of the passenger capsule 200 beneath the floor assembly 202. According to an exemplary embodiment, the v-shaped belly deflector 220 is configured to mitigate and spread blast forces along the belly of the vehicle 10. As shown in FIG. 6, the v-shaped belly deflector 220 is spaced from the floor assembly 202 such that a space, shown as air gap 222, is formed between the floor portions 204 of the floor assembly 202 and the v-shaped belly deflector 220.

In some embodiments, the floor assembly 202, the sidewalls 210, the roof 212, the front wall 214, the rear wall 216, and the v-shaped belly deflector 220 are fabricated subassemblies that are bolted together to provide the passenger capsule 200. Such a modular approach to the passenger capsule 200 provides increased protection with the application of perimeter, roof, and underbody add on panels. The components of the passenger capsule 200 mitigate and attenuate blast effects, allow for upgrades, and facilitate maintenance and replacements.

As shown in FIGS. 4, 5, 7, 8, and 10, the front module 300 includes a first subframe assembly, shown as front subframe 310, and the rear module 400 includes a second subframe assembly, shown as rear subframe 410. The front subframe 310 includes a first plurality of frame members coupled to the floor assembly 202 and the front wall 214 of the passenger capsule 200 at a first plurality of interfaces. The rear subframe 410 includes a second plurality of frame members coupled to the floor assembly 202 and the rear wall 216 of the passenger capsule 200 at a second plurality of interfaces. Such interfaces may include, for example, a plurality of fasteners (e.g., bolts, rivets, etc.) extending through corresponding pads coupled to the front subframe 310, the rear subframe 410, and the passenger capsule 200. According to an exemplary embodiment, a front axle assembly of the axle assemblies 500 is coupled to the front subframe 310 and a rear axle assembly of the axle assemblies 500 is coupled to the rear subframe 410.

The front subframe 310 and the rear subframe 410 may be manufactured from high strength steels, high strength aluminum, or another suitable material. According to an exemplary embodiment, the front subframe 310 and the rear subframe 410 feature a tabbed, laser cut, bent, and welded design. In other embodiments, the front subframe 310 and the rear subframe 410 are manufactured from tubular members to form a space frame. The front subframe 310 and the rear subframe 410 may also include forged frame sections, rather than fabricated or cast frame sections, to mitigate the stress, strains, and impact loading imparted during operation of the vehicle 10. Aluminum castings may be used for various cross member components where the loading is compatible with such material properties.

The passenger capsule 200, the front subframe 310, and the rear subframe 410 are integrated into the hull and frame assembly 100 to efficiently carry chassis loading imparted during operation of the vehicle 10, during a lift event, during a blast event, or under still other conditions. During a blast event, conventional frame rails can capture the blast force, transferring the blast force into the vehicle 10 and the occupants thereof. The vehicle 10 replaces conventional frame rails and instead includes the passenger capsule 200, the front module 300, and the rear module 400. According to an exemplary embodiment, the passenger capsule 200, the front module 300, and the rear module 400 vent blast gases (e.g., traveling upward after a tire triggers an IED), thereby reducing the blast force on the passenger capsule 200 and the occupants within passenger capsule 200. Traditional frame rails may also directly impact (e.g., contact, engage, hit, etc.) the floor of traditional military vehicles. The hull and frame assembly 100 does not include traditional frame rails extending along a length of the vehicle 10, thereby eliminating the ability for such frame rails to impact the floor assembly 202 of the passenger capsule 200.

Figure 9:
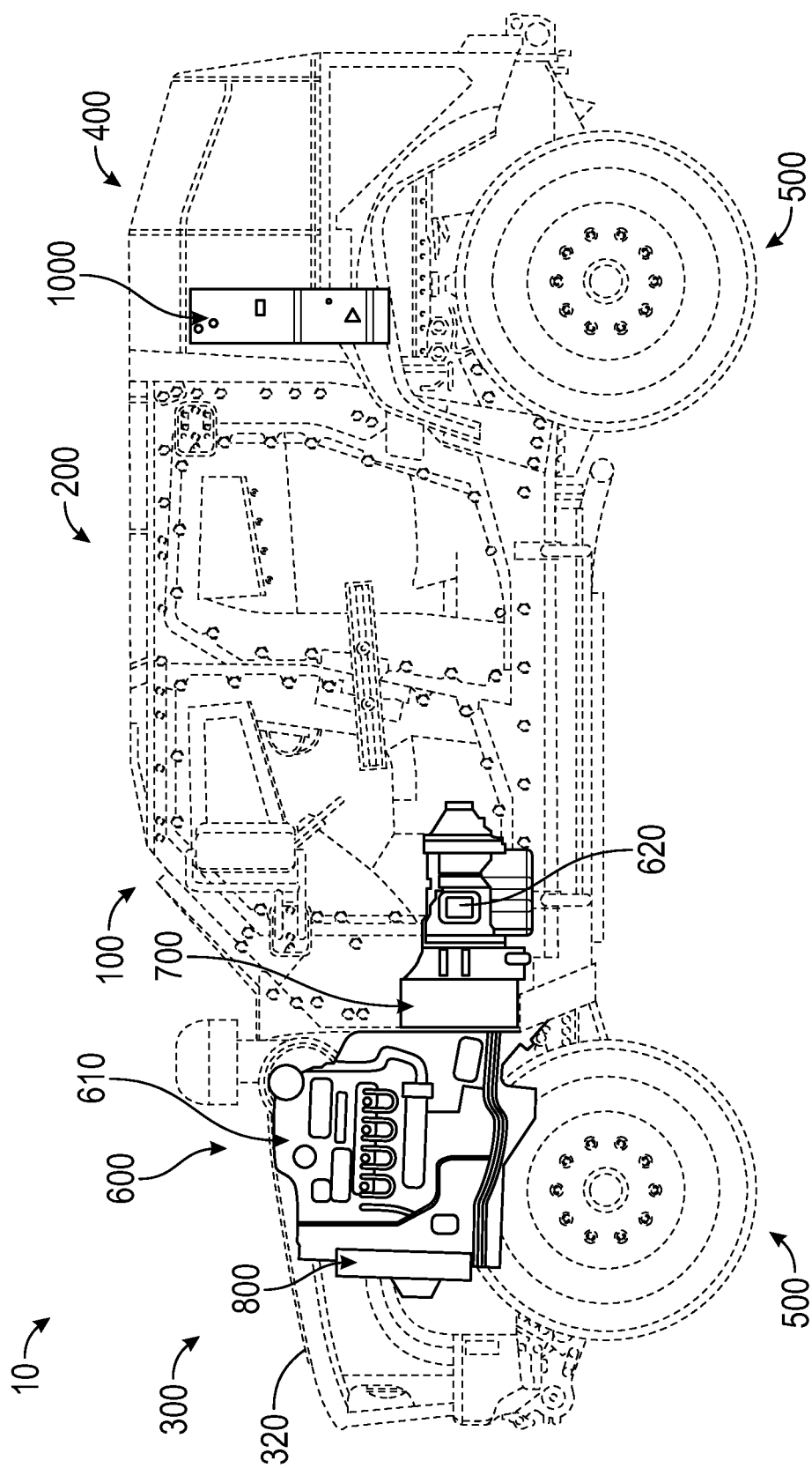
FIG. 9 is a partially transparent side view of the vehicle of FIG. 1 having a driveline including an engine, an integrated motor/generator ("IMG"), a transmission, an energy storage system ("ESS"), and a front-end accessory drive ("FEAD"), according to an exemplary embodiment.

As shown in FIGS. 1, 2, and 9, the front module 300 includes a body panel, shown as hood 320, supported by the front subframe 310. As shown in FIG. 9, the hood 320 partially surrounds components of the driveline 600 (e.g., an engine, a FEAD, radiators, etc.) of the vehicle 10. The hood 320 may be manufactured from a composite material (e.g., carbon fiber, fiberglass, a combination of fiberglass and carbon fiber, etc.) or a metal material (e.g., steel, aluminum, etc.). The hood 320 may be configured (e.g., shaped, etc.) to maximize vision while clearing under-hood components.

As shown in FIGS. 1-3, the rear module 400 includes a body assembly, shown as cargo body assembly 420, supported by the rear subframe 410. The cargo body assembly 420 includes a deck, shown as bed 430; a pair of wheel wells, shown as wheel wells 440, positioned along opposing lateral sides of the bed 430 and over the wheels of the rear axle assembly of the axle assemblies 500; and a pair of storage compartments, shown as stowage boxes 450, positioned along and on top of the wheel wells 440. As shown in FIG. 3, the bed 430, the wheel wells 440, and the stowage boxes 450 cooperatively define a compartment, shown as bed cavity 460.

Figure 7:
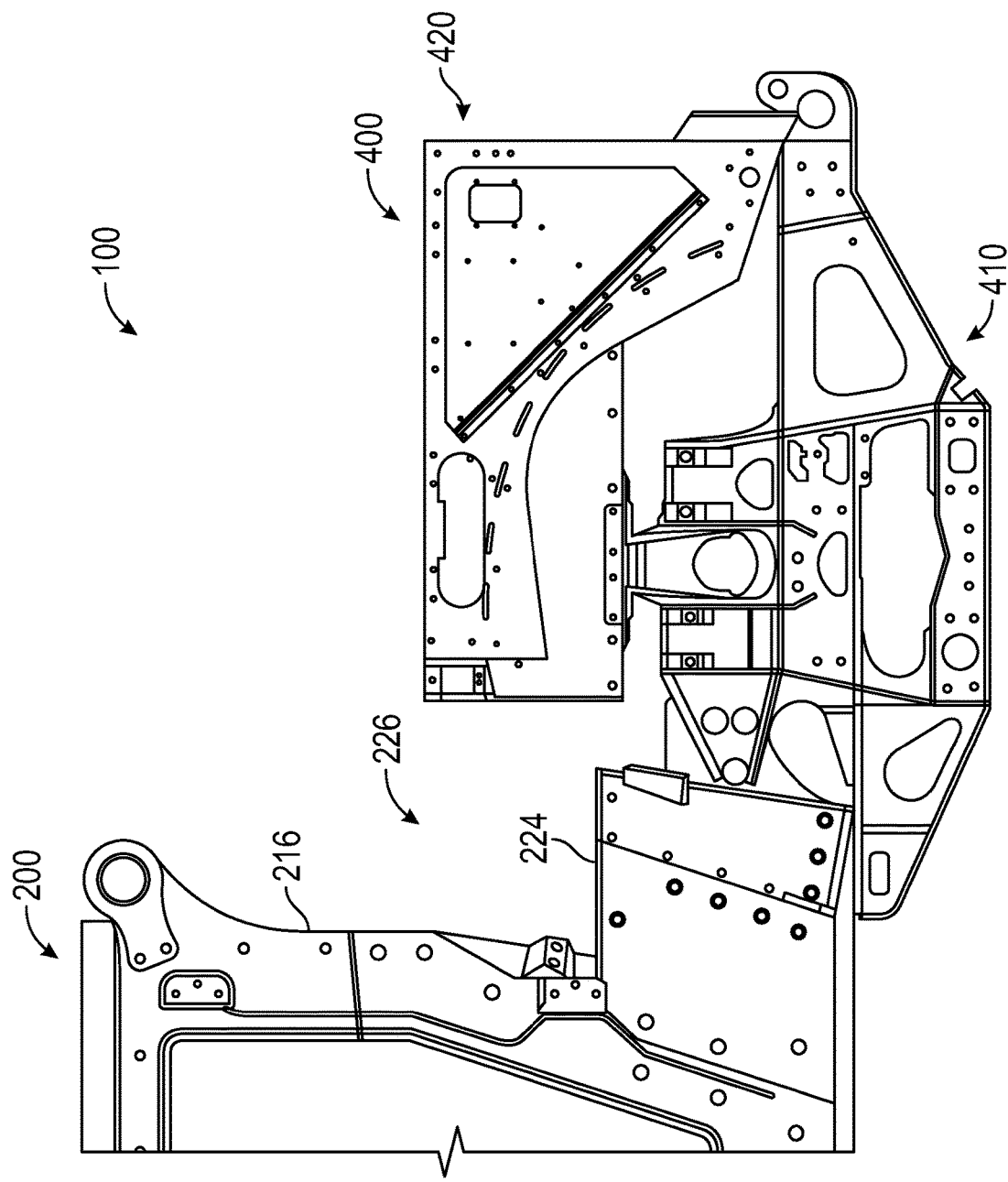
FIG. 7 is a detailed side view of a chassis assembly of the vehicle of FIG. 1, according to another exemplary embodiment.
Figure 8:
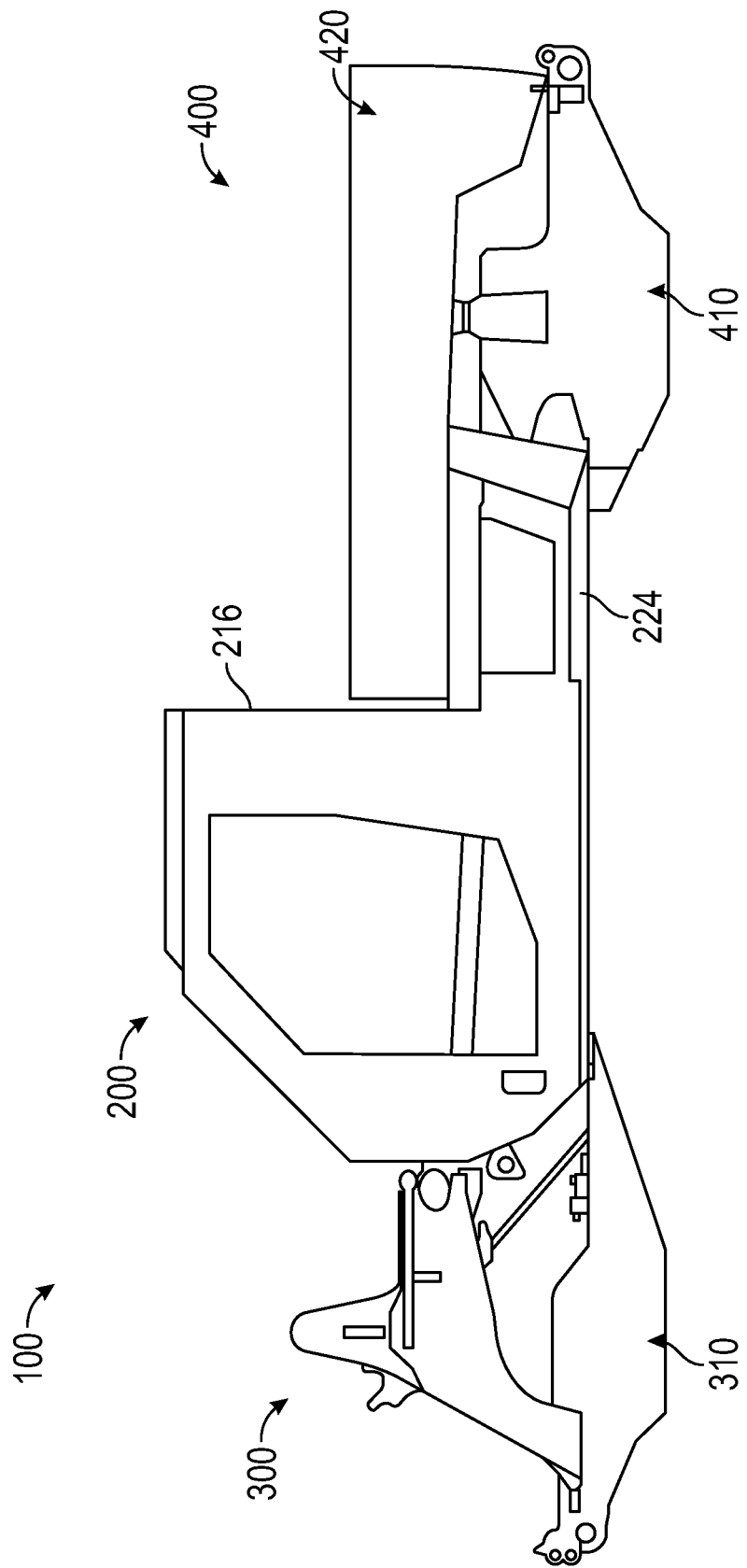
FIG. 8 is a side view of a chassis assembly of the vehicle of FIG. 1, according to another exemplary embodiment.

In some embodiment, as shown in FIG. 7, the passenger capsule 200 includes a protrusion, shown as capsule extension 224, extending from a bottom portion of the rear wall 216 of the passenger capsule 200. According to an exemplary embodiment, the capsule extension 224 provides an extended wheelbase for the vehicle 10, which facilitates providing a cavity, shown as gap 226, between the rear wall 216 and the cargo body assembly 420 of the rear module 400. In some embodiments, as shown in FIG. 8, the capsule extension 224 replaces a rear portion (e.g., back seats, etc.) of the passenger capsule 200 and supports an extended cargo body assembly 420 (e.g., eliminating the gap 226 of FIG. 7 or maintaining the gap 226 of FIG. 7).

Driveline

As shown in FIGS. 9-26, the driveline 600 includes a first driver, shown as engine 610; a transmission device, shown as transmission 620; a first drive shaft, shown transaxle drive shaft 630, coupled to the transmission 620; a power splitter, shown as transaxle 640, coupled to the transaxle drive shaft 630 and the rear axle assembly 500; a second drive shaft, shown as front axle drive shaft 650, extending between the transaxle 640 and the front axle assembly 500 (e.g., a front differential thereof); a second driver, shown as IMG 700, positioned between the engine 610 and the transmission 620; an accessory drive assembly, shown as FEAD 800, positioned in front of the engine 610; and an on-board ESS, shown as ESS 1000.

Figure 10:
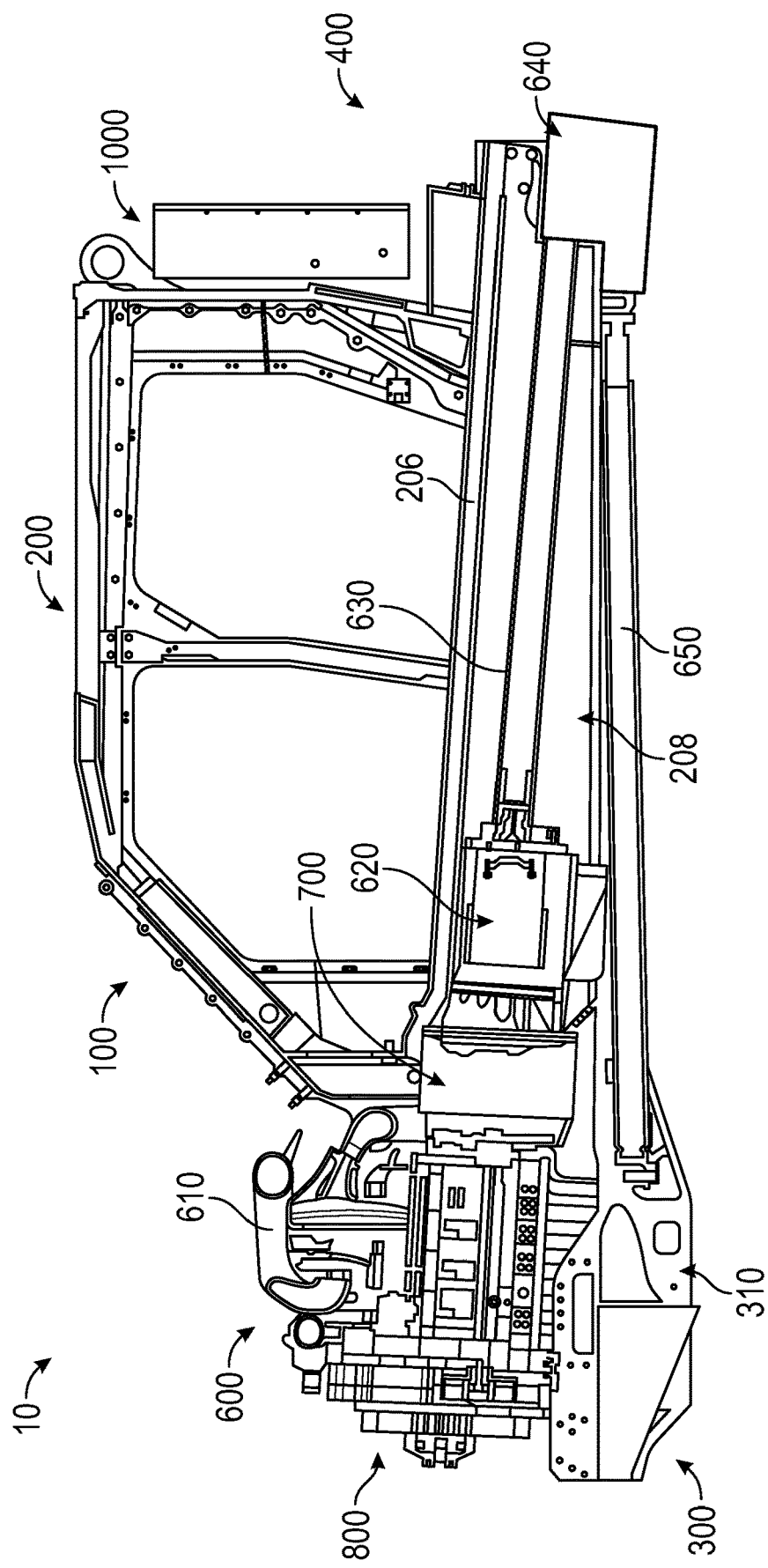
FIG. 10 is a cross-sectional side view of the driveline of FIG. 9 including the engine, the IMG, the transmission, the ESS, the FEAD, and a transaxle, according to an exemplary embodiment.
Figure 11:
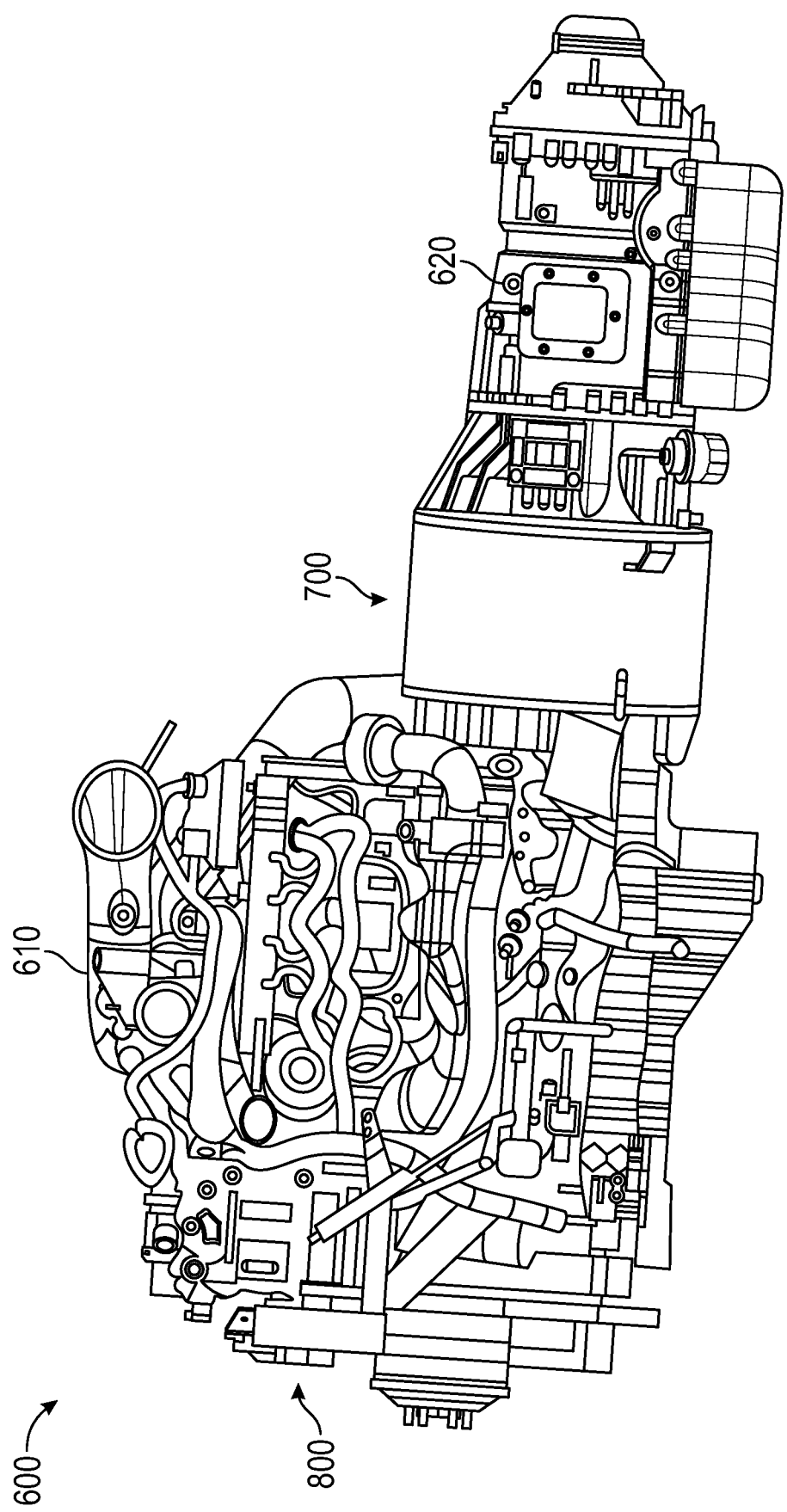
FIG. 11 is a detailed side view of the engine, the IMG, the transmission, and the FEAD of the driveline of FIG. 9, according to an exemplary embodiment.

As shown in FIGS. 9 and 10, the engine 610 and the FEAD 800 are positioned within the front module 300 and supported by the front subframe 310. The FEAD 800 may include an independent FEAD motor (e.g., motor/generator 822) and various belt driven-accessories and/or electrically-operated accessories (e.g., a fan, a hydraulic pump, an air compressor, an air conditioning ("A/C") compressor, etc.). As shown in FIG. 10, the IMG 700 and the transmission 620 are positioned beneath the passenger capsule 200 within the tunnel slot 208 of the structural tunnel 206. The transaxle drive shaft 630 extends from the transmission 620 longitudinally along the structural tunnel 206 and within tunnel slot 208 to the transaxle 640. According to an exemplary embodiment, the transaxle 640 is positioned within the rear module 400 and supported by the rear subframe 410. As shown in FIG. 10, the front axle drive shaft 650 is positioned beneath the transaxle drive shaft 630 and outside of the tunnel slot 208 (e.g., between the transaxle drive shaft 630 and the v-shaped belly deflector 220).

According to various embodiments, the engine 610 is individually, the IMG 700 is individually, or both the engine 610 and the IMG 700 are cooperatively configured to provide power to the transmission 620 to drive the transmission 620 and, thereby, drive the transaxle drive shaft 630, the transaxle 640, the rear axle assembly 500, the front axle drive shaft 650, and the front axle assembly 500 to drive the vehicle 10. According to various embodiments, the FEAD 800 is configured to be selectively driven by the engine 610, by the FEAD motor, by the IMG 700, and/or electrically-operated. According to an exemplary embodiment, the ESS 1000 is configured to power various high-voltage components and low-voltage components of the vehicle 10 (e.g., the IMG 700, the FEAD motor, electrified FEAD accessories, cab displays, cab gauges, cab lights, external lights, etc.). According to various embodiments, except for electrical wiring, the components of the ESS 1000 (e.g., battery packs, inverters, power distribution components, power conversion hardware, etc.) are variously positioned about the vehicle 10 (e.g., within the rear module 400, under the passenger capsule 200, etc.), except proximate the engine 610 or within the tunnel slot 208 of the structural tunnel 206. Such positioning facilitates maintaining the components of the ESS 1000 at proper operating temperatures and away from high temperature zones proximate the engine 610 and/or within the tunnel slot 208 of the structural tunnel 206. In some embodiments (e.g., when the FEAD 800 includes the FEAD motor, when the engine 610 drives the FEAD, etc.), the FEAD motor and the IMG 700 are configured to selectively operate as generators to facilitate charging the ESS 1000 using power provided by the engine 610 while the vehicle 10 is stationary or moving.

Engine, Transmission, and Transaxle

According to an exemplary embodiment, the engine 610 is a compression-ignition internal combustion engine that utilizes diesel fuel. In other embodiments, the engine 610 is a spark-ignition engine that utilizes one of a variety of fuel types (e.g., gasoline, compressed natural gas, propane, etc.). The transmission may be a commercially available transmission. The transmission 620 may include a torque converter configured to improve efficiency and decrease heat loads. Lower transmission gear ratios combined with a low range of an integrated rear differential/transfer case provide optimal speed for slower speeds, while higher transmission gear ratios deliver convoy-speed fuel economy and speed on grade. According to an exemplary embodiment, the transmission 620 includes a driver selectable range selection.

The transaxle 640 is designed to reduce the weight of the vehicle 10. The weight of the transaxle 640 is minimized by integrating a transfercase and a rear differential into a single unit, selecting an optimized gear configuration, and/or utilizing high strength structural aluminum housings. By integrating the transfercase and the rear differential into the transaxle 640 (thereby forming a singular unit), the connecting drive shaft and end yokes traditionally utilized to connect the transfercase and the rear differential have been eliminated. An integral neutral and front axle disconnect allows the vehicle 10 to be flat towed or front/rear lift and towed with minimal preparation (i.e., without removing the transaxle drive shaft 630 or the front axle drive shaft 650). Specifically, the transaxle 640 includes an internal mechanical disconnect capability that allows the front axle assembly 500 and/or the rear axle assembly 500 to turn without rotating the transaxle 640 and the transmission 620. A mechanical air solenoid over-ride is easily accessible from the interior and/or exterior of the vehicle 10. Once actuated, no further vehicle preparation is needed. After the recovery operation is complete, the driveline 600 can be re-engaged by returning the air solenoid mechanical over-ride to the original position.

IMG

According to an exemplary embodiment, the IMG 700 is electrically coupled to the ESS 1000, selectively mechanically coupled to the engine 610, and mechanically coupled to the transmission 620. The IMG 700 is configured to be mechanically driven by the engine 610 to selectively generate electricity for storage in the ESS 1000 and/or to power electrical components of the vehicle 10. The IMG 700 is configured to receive electrical power from the ESS 1000 to facilitate driving the transmission 620 and, therefore, the axle assemblies 500 of the vehicle 10. In some embodiments, the IMG 700 is configured to receive electrical power from the ESS 1000 to function as a starter for the engine 610. Such starting capability can be performed while the vehicle 10 is stationary or while the vehicle 10 is moving. In some embodiments, the driveline 600 additionally or alternatively includes a backup or dedicated engine starter.

Figure 12:
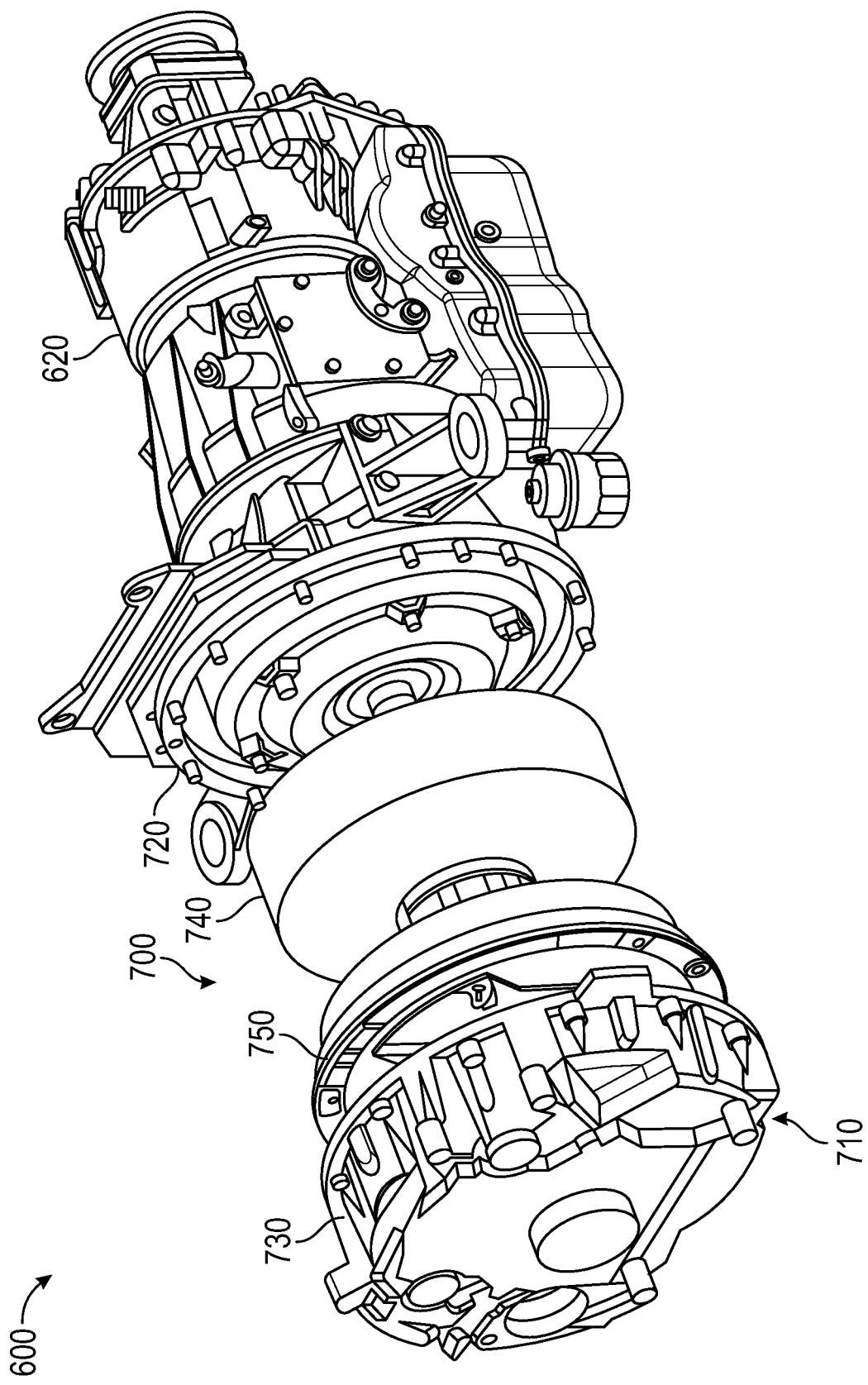
FIG. 12 is an exploded view the IMG and the transmission of the driveline of FIG. 9, according to an exemplary embodiment.
Figure 13:
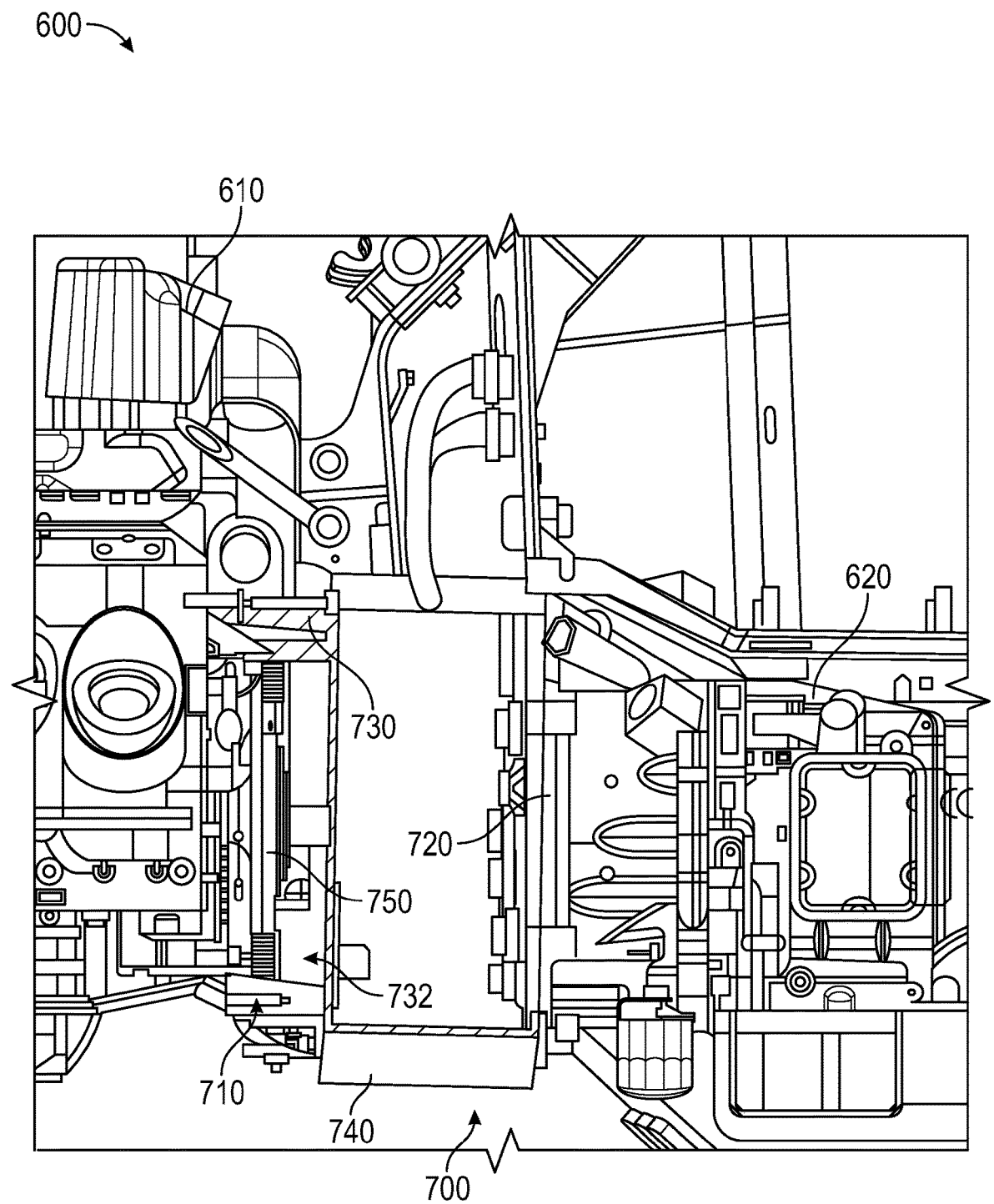
FIG. 13 is a detailed cross-sectional side view of the IMG of the driveline of FIG. 9, according to an exemplary embodiment.
Figure 14:
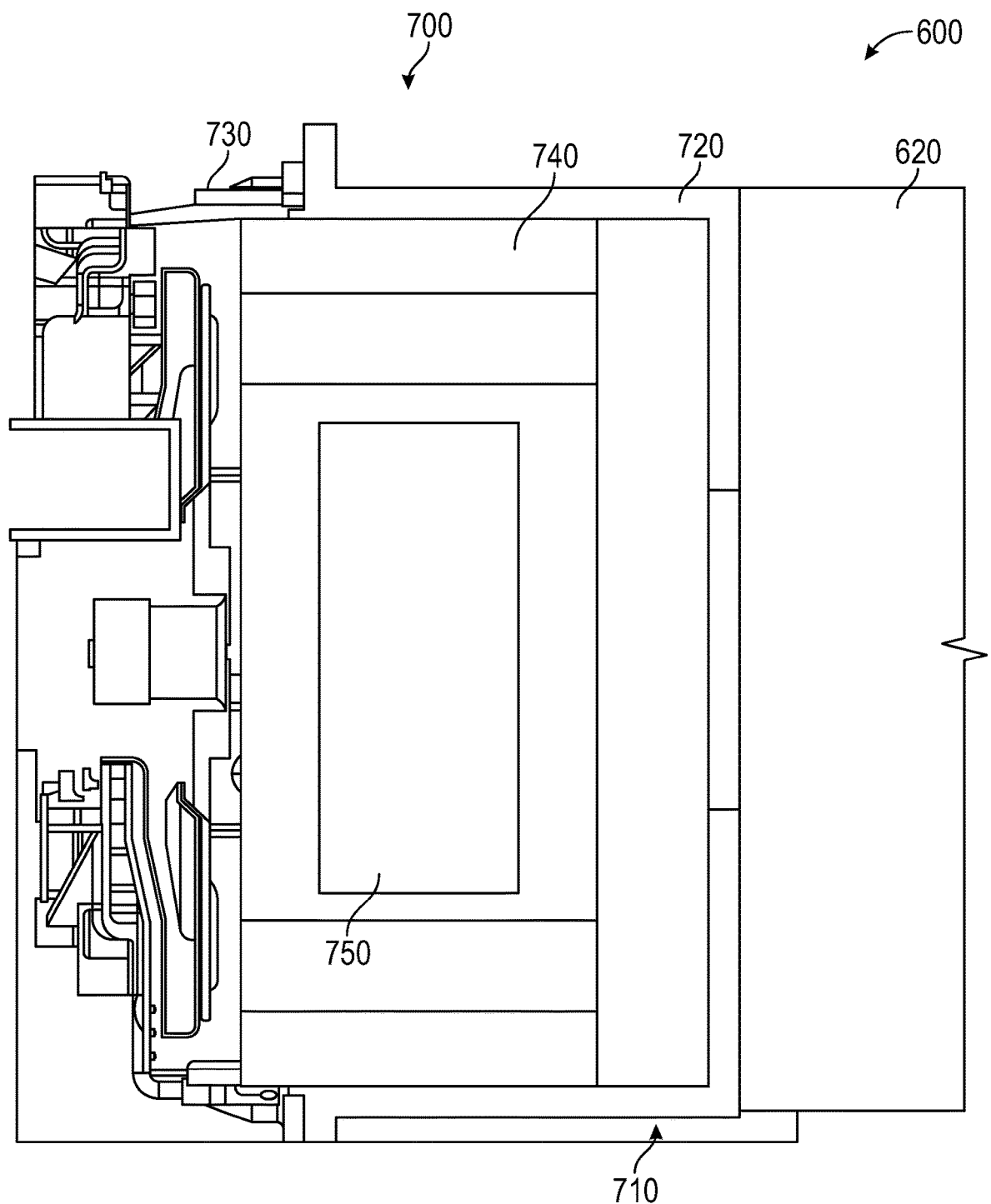
FIG. 14 is a detailed cross-sectional side view of the IMG of the driveline of FIG. 9, according to another exemplary embodiment.

As shown in FIGS. 12-14, the IMG 700 includes a housing, shown as IMG housing 710, including a first portion, shown as backing plate 720, coupled to the transmission 620, and a second portion, shown as engine mount 730, coupled to the engine 610. The IMG 700 further includes an electromagnetic device, shown as motor/generator 740, coupled to the backing plate 720, and a clutch mechanism, shown as engine clutch 750, coupled to the motor/generator 740 and selectively couplable to the engine 610. The motor/generator 740 and the engine clutch 750 are, therefore, positioned between the backing plate 720 and the engine mount 730 and enclosed within the IMG housing 710 (e.g., a single unit).

According to an exemplary embodiment, the engine clutch 750 is controllable (e.g., disengaged, engaged, etc.) to facilitate (i) selectively mechanically coupling the engine 610 and the motor/generator 740 (e.g., to start the engine 610 with the motor/generator 740, to drive the motor/generator 740 with the engine 610 to produce electricity, to drive the motor/generator 740 with the engine 610 to drive the transmission 620, etc.) and (ii) selectively mechanically decoupling the engine 610 and the motor/generator 740 (e.g., to drive the motor/generator 740 with power from the ESS 1000 to drive the transmission 620, the FEAD 800, etc.). In an alternative embodiment, the IMG 700 does not include the engine clutch 750 such that the engine 610 is directly coupled to the motor/generator 740.

As shown in FIGS. 12 and 13, the motor/generator 740 and the engine clutch 750 are arranged in a stacked arrangement with the engine clutch 750 positioned within an interior chamber, shown as cavity 732, of the engine mount 730. As shown in FIG. 14, the motor/generator 740 and the engine clutch 750 are arranged in an integrated arrangement with the engine clutch 750 positioned within an interior chamber, shown as cavity 752, of the motor/generator 740. The integrated arrangement of the motor/generator 740 and the engine clutch 750 facilitates reducing the packaging size of the IMG 700, which facilitates reducing the overall length of the driveline 600.

According to an exemplary embodiment, the engine clutch 750 is a pneumatically-operated clutch that is (i) spring-biased towards engagement with the engine 610 to couple the engine 610 to the other components of the driveline 600 (e.g., the motor/generator 740, the transmission 620, etc.) and (ii) selectively disengaged using compressed air provided from an air compressor (e.g., included in the FEAD 800, air compressor 808, etc.) to decouple the engine 610 from the other components of the driveline 600. Such a spring-biased and air-disengaged clutch ensures that the driveline 600 of the vehicle 10 is operational in the event of damage to the ESS 1000 or if a state-of-charge ("SoC") of the ESS 1000 falls below a minimum SoC threshold (e.g., 20% SoC). As an example, if the engine clutch 750 is disengaged and the motor/generator 740 is driving the vehicle 10, the engine clutch 750 will auto-engage (i) if electrical power is lost due to the ESS 1000 being damaged or the FEAD motor is damaged (which will cause the air compressor of the FEAD 800 to stop providing compressed air to the engine clutch 750) or (ii) if switching to an engine drive mode, which may include stopping the FEAD motor (e.g., in response to the SoC of the ESS 1000 falling below the minimum SoC threshold, which causes the air compressor of the FEAD 800 to stop providing compressed air to the engine clutch 750). In the event of auto-engagement of the engine clutch 750, the engine 610 (if already off) will be started by the inertial forces of the vehicle 10 (if moving), can be started by the motor/generator 740, or can be started by the dedicated engine starter. Such auto-engagement, therefore, ensures that engine 610 is connected to the remainder of the driveline 600 to drive the vehicle 10 in the event of some malfunction in the electrical system or when transitioning from electric drive to engine drive. According to an exemplary embodiment, the components of the driveline 600 do not need to be stopped nor do component speeds need to be matched to switch between engine drive and electric drive.

FEAD

According to an exemplary embodiment, the FEAD 800 is configured to drive (e.g., provide mechanical energy to, provide torque to, provide rotational inertia to, etc.) various accessories of the vehicle 10. As shown in FIGS. 15-17 and 19, the various accessories include a first accessory, shown as air compressor 808, a second accessory, shown as fan 810, a third accessory, shown as motor/generator 822, a fourth accessory, shown as hydraulic pump 832, and a fifth accessory, shown as air conditioning ("A/C") compressor 848. In other embodiments, the FEAD 800 includes additional, fewer, or different accessories. According to an exemplary embodiment, the FEAD 800 is selectively transitionable between different configurations, modes, or states to change a drive source (e.g., to change which of multiple available primary movers, engines, internal combustion engines, electric motors, etc. drive various accessories of the vehicle 10).

E-FEAD

According to the exemplary embodiment shown in FIGS. 15-19, the FEAD 800 is configured as an electrified FEAD ("E-FEAD") having a dual-belt drive arrangement. The FEAD 800 can be selectively driven by either the engine 610 (e.g., in a first mode or state) or the motor/generator 822 (e.g., in a second mode or state). Accordingly, the FEAD 800 and, therefore, the driving of the accessories can be transitioned between an electrified state or mode and an engine-driven state or mode. When the FEAD 800 is in the electrified state or mode, the FEAD 800 can operate independently of operation of the engine 610. For example, when the FEAD 800 is in the electrified state, the FEAD 800 and accessories thereof can operate even when the engine 610 is off or in-operational, thereby operating independently of the engine 610. In another example, when the FEAD 800 is in the electrified state, the FEAD 800 can operate to drive the accessories of the vehicle 10 while the engine 610 operates to drive other driveable elements or systems of the vehicle 10 such as the wheels of the axle assemblies 500, thereby operating independently and simultaneously with operation of the engine 610.

Figure 15:
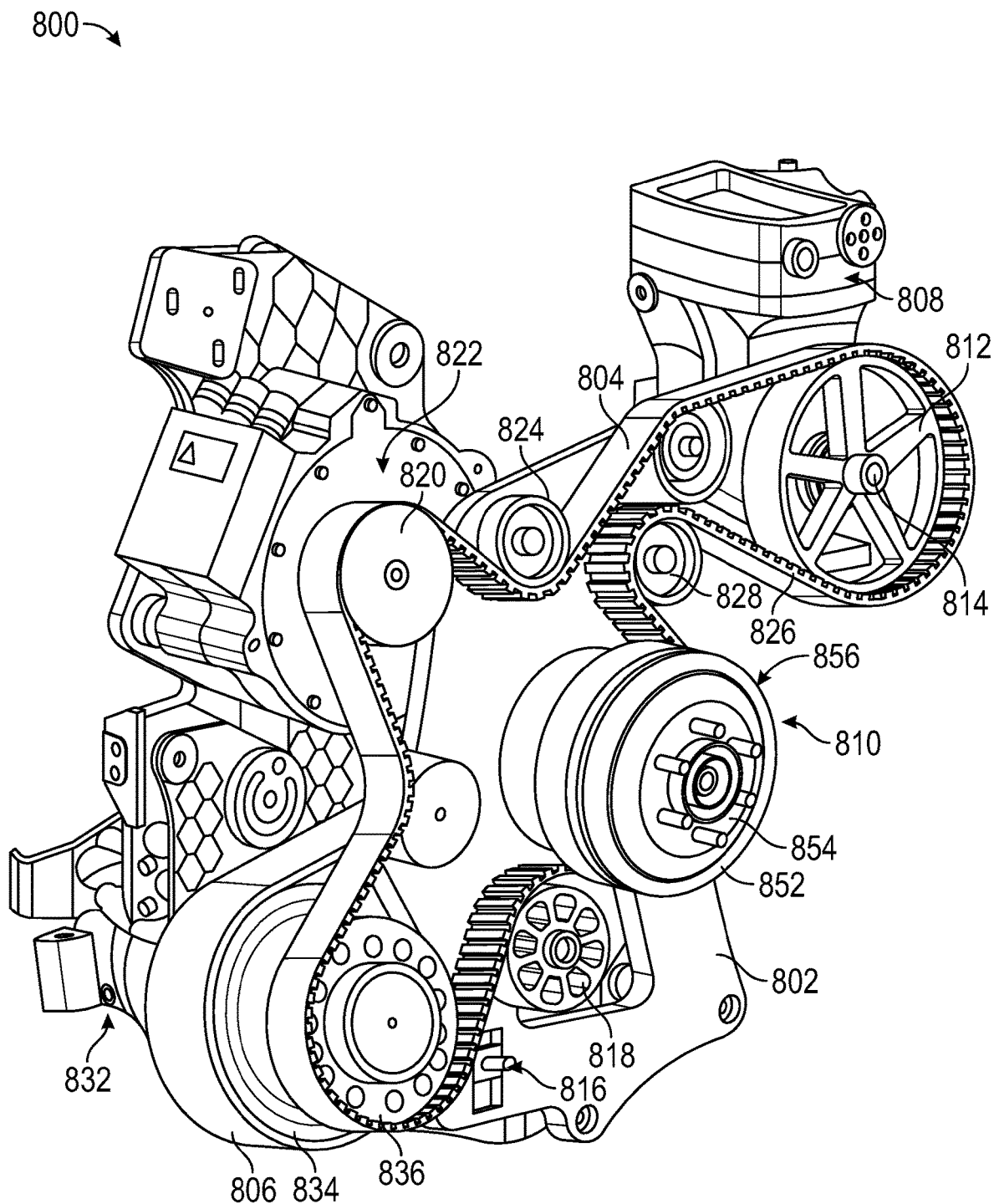
FIG. 15 is a front perspective view of the FEAD of FIG. 9, according to an exemplary embodiment.
Figure 16:
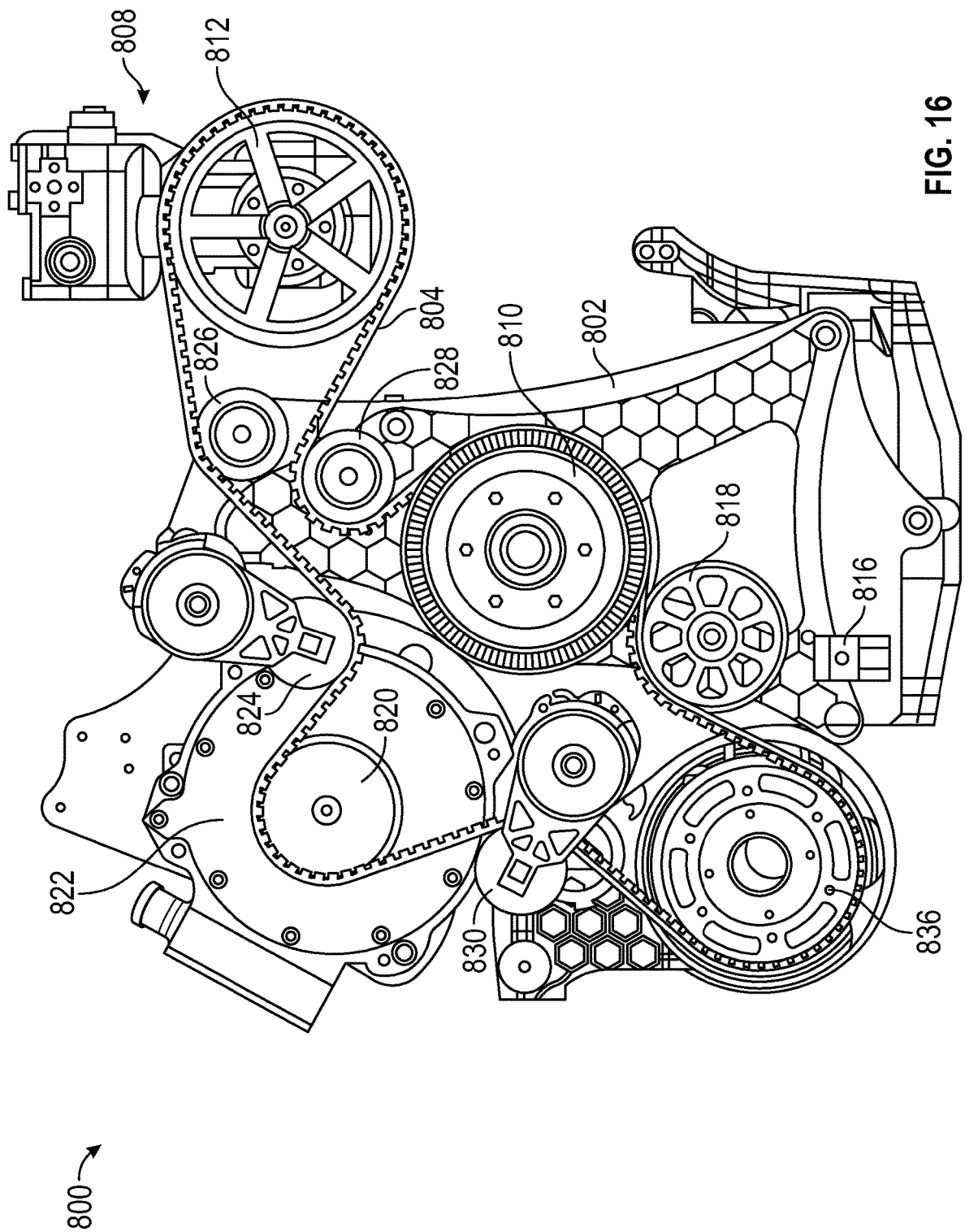
FIG. 16 is a front view of the FEAD of FIG. 15, according to an exemplary embodiment.
Figure 17:
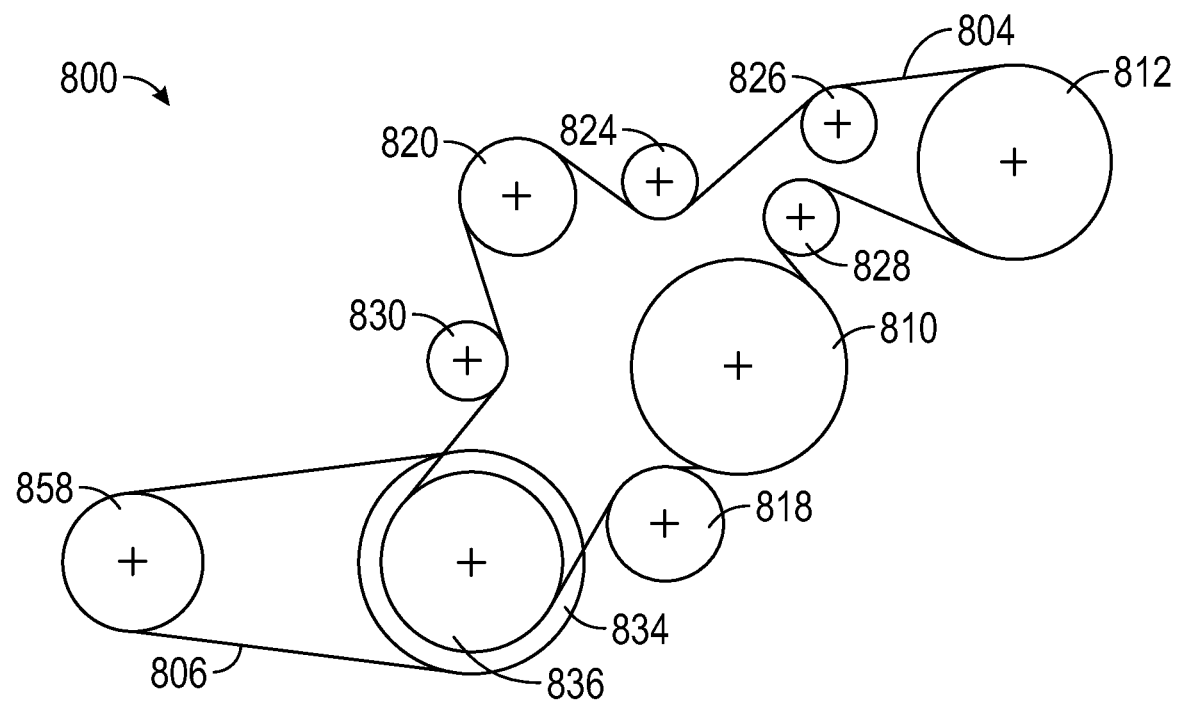
FIG. 17 is a schematic diagram of the FEAD of FIG. 15, according to an exemplary embodiment.

As shown in FIGS. 15-17, the FEAD 800 includes a first belt (e.g., tensile member, chain, power transmitting band, pulley, etc.), shown as FEAD belt 804, and a second belt (e.g., tensile member, chain, power transmitting band, pulley, etc.), shown as engine belt 806. The engine belt 806 is coupled between an output shaft 858 of the engine 610 (e.g., at a front end of the engine 610) and a one-way bearing or clutch, shown as sprag clutch 834. The FEAD belt 804 is coupled with, and defines a power band circuit between, a shaft 820 of the motor/generator 822, a drive member 812 of the air compressor 808 (e.g., an air compressor pulley or sheave), an outer race 852 of a fan clutch 856 of the fan 810, a tensioning pulley 818, a pulley 836 of the sprag clutch 834, a first roller 824, a second roller 826, a third roller 828, and a fourth roller 830 (e.g., roller pulleys). The FEAD belt 804 and the engine belt 806 can be V-belts or synchronous belts and are configured to drive or be driven by any of the coupled components, clutches, shafts, pulleys, rollers, gears, rotatable members, etc. of the FEAD 800 as described in detail herein.

Figure 18:
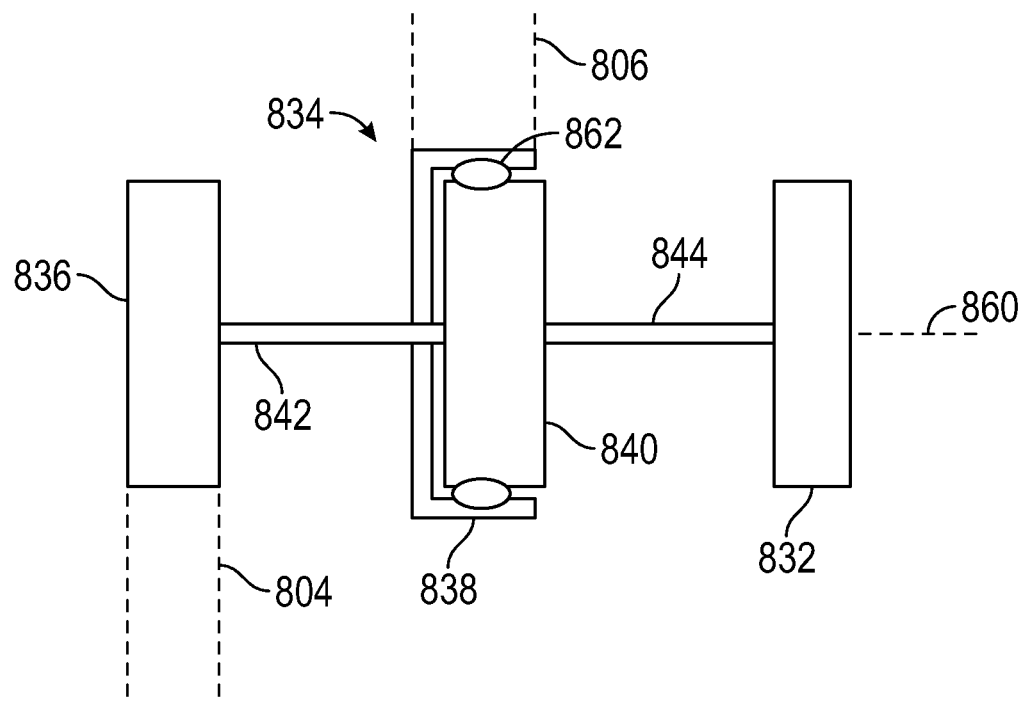
FIG. 18 is a schematic diagram of a sprag clutch of the FEAD of FIG. 15, according to an exemplary embodiment.

The hydraulic pump 832 is configured to be driven (e.g., by providing a torque input at an input shaft 844 of the hydraulic pump 832 as shown in FIG. 18) to pressurize a hydraulic fluid, according to an exemplary embodiment. The hydraulic fluid may be stored in a reservoir or tank, pressurized by the hydraulic pump 832, and provided to different hydraulically driven accessories, accessory systems, hydraulic motors, hydraulic actuators, power steering systems, suspension systems, etc. of the vehicle 10. The hydraulic pump 832 may be a component of a hydraulic circuit of the vehicle 10 that is used for different body operations or body systems of the vehicle 10, or different chassis systems of the vehicle 10 that use hydraulic primary movers (e.g., hydraulic motors, hydraulic linear actuators, etc.). The hydraulic pump 832 can be any of a gear pump, a piston pump, a vane pump, a clutch pump, a dump pump, a refuse pump, etc. or any other hydraulic pump (e.g., clutched) that receives an input torque and pressurizes or drives a hydraulic fluid. In an exemplary embodiment, the hydraulic pump 832 pressurizes the hydraulic fluid for a power steering system and a suspension system of the vehicle 10.

The air compressor 808 is configured to be driven (e.g., by providing a torque input at an input shaft 814 of the air compressor 808 such as by driving, with the FEAD belt 804, the drive member 812 that is fixedly coupled with the input shaft 814) to pressurize air or any other gas, according to an exemplary embodiment. The air may be pressurized and stored in an air tank (e.g., a tank, a reservoir, a pressure vessel, etc.) that is fluidly coupled with the air compressor 808. For example, the air compressor 808 can be configured to operate to maintain a required pressure in the air tank for different chassis operations or systems such as brakes. In an exemplary embodiment, the air compressor 808 is configured to pressurize air for air brakes of the vehicle 10 (e.g., drum brakes that include a brake chamber that is fluidly coupled with the air tank). The air compressor 808 is a component of a fluid circuit for providing pressurized air to different accessories or systems of the vehicle 10, including but not limited to, air brakes of the axle assemblies 500. In some embodiments, the air compressor 808 is configured to pressurize air for other chassis or body operations of the vehicle 10 (e.g., suspension components, etc.).

The fan 810 is configured to be driven (e.g., by providing a torque input, with the FEAD belt 804, through the fan clutch 856 of the fan 810 when the fan clutch 856 is in an engaged state) to drive a rotor or impeller component of the fan 810. The fan 810 is configured to drive an airflow through cooling components (e.g., an engine radiator, a transmission cooler, heat exchangers, a hydraulic cooler, an A/C condenser, a battery cooler, etc.) of the vehicle 10 to provide cooling for the engine 610 and various other systems (e.g., a hydraulic circuit, the transmission 620, the ESS 1000, etc.) of the vehicle 10. The impeller component or assembly can be selectively engaged with the FEAD belt 804 through the fan clutch 856. The fan clutch 856 may be an electric clutch that is selectively engaged or disengaged to thereby couple or de-couple the impeller component or assembly of the fan 810 with the FEAD belt 804. The FEAD belt 804 couples with the outer race 852 of the fan clutch 856, and the impeller assembly of the fan 810 is fixedly coupled with an inner race 854 of the fan clutch 856. Engaging or disengaging the fan clutch 856 couples or decouples the inner race 854 with the outer race 852 of the fan clutch 856. The fan clutch 856 can be transitioned between the engaged state and the disengaged state automatically based on a temperature of the engine 610 or other vehicle components, in response to a user input, in response to a control mode, etc.

As shown in FIGS. 15 and 16, the tensioning pulley 818 is positioned along the FEAD belt 804 between the pulley 836 of the sprag clutch 834 and the fan 810. In other embodiments, the tensioning pulley 818 is otherwise positioned along the FEAD belt 804. The tensioning pulley 818 is adjustable (e.g., physically moveable, translatable, etc.) to increase or decrease a tension of the FEAD belt 804. The tensioning pulley 818 can be adjusted by providing an input to an adjustment member 816 (e.g., lever, knob, etc.) to reposition (e.g., translate, etc.) the tensioning pulley 818.

According to an exemplary embodiment, the motor/generator 822 is configured to function both as a motor and as a generator in different modes of the FEAD 800. When the motor/generator 822 functions as a motor, the motor/generator 822 is configured to consume electrical energy from the ESS 1000 of the vehicle 10 and output a torque to the FEAD belt 804 through the shaft 820 of the motor/generator 822. The FEAD belt 804 transfers the torque or mechanical energy to each of the fan 810, the air compressor 808, and the hydraulic pump 832 so that the motor/generator 822 functions as the primary mover of the FEAD 800 when activated, thereby electrifying the FEAD 800 and facilitating independent operation the FEAD 800 (i.e., operating independently of operation of the engine 610). The FEAD belt 804 can be configured to drive the hydraulic pump 832 through the sprag clutch 834, as described in greater detail below with reference to FIG. 18.

The motor/generator 822 is also configured to function as a generator and be driven by the FEAD belt 804 when the engine 610 operates as the primary mover of the FEAD 800. The engine 610 is configured to drive the sprag clutch 834 through the engine belt 806, which thereby drives (i) the hydraulic pump 832 through the sprag clutch 834 and (ii) the FEAD belt 804 through the sprag clutch 834, and thereby the fan 810, the air compressor 808, and the motor/generator 822 through the pulley 836 of the sprag clutch 834. In some embodiments, the FEAD 800 can be transitioned between the engine-driven mode and the electrified mode by (i) selectively configuring the engine 610 to drive the engine belt 806 (e.g., by engaging a clutch of the engine 610 so that the engine outputs torque to the sprag clutch 834 via the engine belt 806, or by starting or stopping the engine 610) or (ii) activating the motor/generator 822 to drive the FEAD belt 804 (e.g., by providing electrical power to the motor/generator 822 to thereby cause the motor/generator 822 to function as an electric motor and drive the FEAD belt 804). When the engine 610 drives the FEAD 800 through the engine belt 806, the sprag clutch 834, and the FEAD belt 804, the motor/generator 822 may be driven through the shaft 820 and function as a generator (as necessary or continuously) to generate electrical energy based on the driving of the shaft 820 (e.g., now functioning as an input shaft) and provide the electrical energy to various electrical components of the vehicle 10 and/or to the ESS 1000 for storage.

As shown in FIGS. 15 and 16, the FEAD 800 includes a structural member, shown as frame 802, with which each of the motor/generator 822, the air compressor 808, the tensioning pulley 818, the hydraulic pump 832, the sprag clutch 834, the fan 810, and the roller pulleys 824-830 are coupled (e.g., translationally fixedly coupled). According to an exemplary embodiment, the frame 802 is coupled (e.g., mounted, secured, fixedly coupled, fastened, attached, etc.) to a front of the engine 610. In other embodiments, the frame 802 is coupled to the hull and frame assembly 100 (e.g., a portion of the front module 300).

As shown in FIG. 18, the sprag clutch 834 includes a first portion, shown as outer race 838, a second portion, shown as inner race 840, and one-way rotational elements, shown as sprags 862, positioned between the inner race 840 and the outer race 838. The sprags 862 are configured to (i) permit free rotation between the inner race 840 and the outer race 838 when the inner race 840 is rotated relative to the outer race 838 about a central axis 860 thereof (e.g., when the pulley 836, and therefore, the inner race 840 is driven by the motor/generator 822) and (ii) limit or jam when the outer race 838 is rotated relative to the inner race 840 about the central axis 860 (e.g., when the outer race 838 is driven by the engine 610 through the engine belt 806).

As shown in FIGS. 15 and 17, the engine belt 806 is coupled with the outer race 838 of the sprag clutch 834 so that when the engine 610 drives the engine belt 806, the outer race 838 locks with the inner race 840 and both the outer race 838 and the inner race 840 rotate in unison (e.g., due to the sprags 862 locking the inner race 840 with the outer race 838 or limiting relative rotation between the inner race 840 and the outer race 838). The pulley 836 of the sprag clutch 834 is fixedly coupled with the inner race 840 of the sprag clutch 834 (e.g., via a shaft 842) so that rotation of the inner race 840 drives the pulley 836 and the FEAD belt 804. The input shaft 844 of the hydraulic pump 832 is coupled (e.g., rotatably) with the inner race 840 of the sprag clutch 834 such that rotation of the inner race 840 (e.g., in unison with rotation of the outer race 838 when the engine 610 drives the outer race 838 and the inner race 840 in unison through the engine belt 806) also drives the hydraulic pump 832.

As shown in FIG. 18, the pulley 836 and, therefore, the FEAD belt 804 are coupled with the inner race 840 of the sprag clutch 834. When the motor/generator 822 of the FEAD 800 operates as the primary mover of the FEAD 800, the motor/generator 822 drives the FEAD belt 804 (thereby driving the air compressor 808 and/or the fan 810), which drives the pulley 836 and the inner race 840 to rotate relative to the outer race 838 of the sprag clutch 834, thereby also driving the hydraulic pump 832 without driving the outer race 838 and the engine belt 806. In this way, the sprag clutch 834 can function to facilitate driving the FEAD 800 with either the engine 610 or the motor/generator 822. When the motor/generator 822 drives the FEAD 800 and accessories thereof, the inner race 840 of the sprag clutch 834 rotates freely relative to the outer race 838. When the engine 610 drives the FEAD 800 and accessories thereof, the inner race 840 and the outer race 838 of the sprag clutch 834 have limited relative rotation to thereby transfer the torque from the engine 610 and the engine belt 806 to the FEAD 800 and accessories thereof.

It should be understood that while FIG. 18 shows the engine belt 806 being coupled with the outer race 838 of the sprag clutch 834, and the hydraulic pump 832 and the FEAD belt 804 being coupled with the inner race 840 of the sprag clutch 834, in other embodiments, the engine belt 806 is coupled with the inner race 840 of the sprag clutch 834 and the hydraulic pump 832 and the FEAD belt 804 are coupled with the outer race 838 of the sprag clutch 834.

Figure 19:
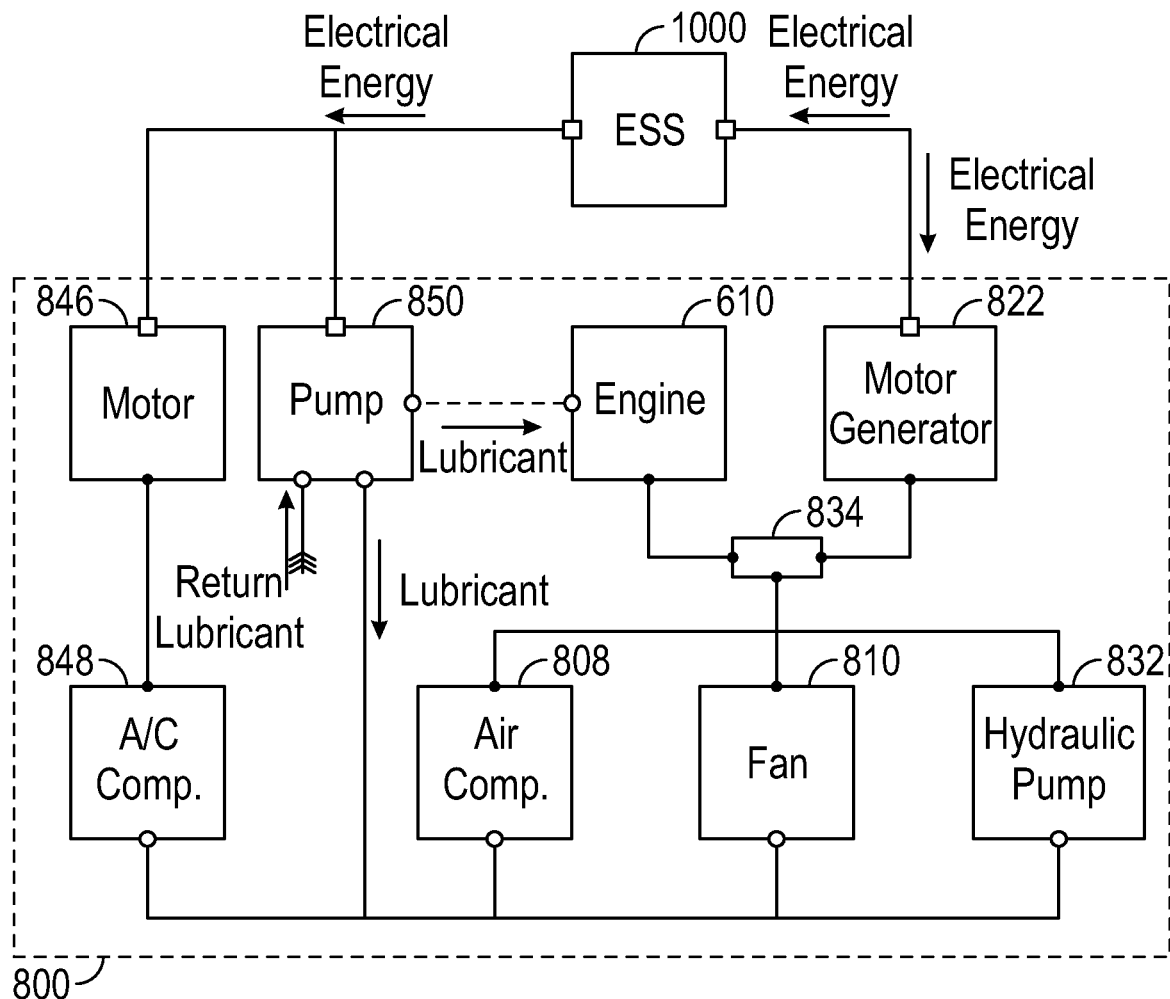
FIG. 19 is a schematic block diagram of the FEAD of FIG. 15 operably coupled with the ESS of FIGS. 9 and 10, according to an exemplary embodiment.

As shown in FIG. 19, the FEAD 800 is operably or electrically coupled with the ESS 1000 so that the ESS 1000 can exchange electrical energy with electrical components of the FEAD 800. The FEAD 800 also includes the A/C compressor 848 and an electric motor 846 that is configured to drive the A/C compressor 848. The A/C compressor 848 and the electric motor 846 can operate independently of the engine 610 and the motor/generator 822 so that the A/C compressor 848 does not depend on operation, drive speed, or on/off status of the engine 610 or the motor/generator 822. The engine 610 or the motor/generator 822 are selectively configured to provide mechanical energy to drive the air compressor 808, the fan 810, or the hydraulic pump 832. When the engine 610 drives the air compressor 808, the fan 810, and the hydraulic pump 832, the engine 610 may also drive the motor/generator 822 so that the motor/generator 822 generates electrical energy. The motor/generator 822 is electrically coupled (e.g., via electrical wiring) with the ESS 1000 and provides generated electrical energy to the ESS 1000 for storage and discharge to other electrical components of the vehicle 10. When the motor/generator 822 operates to drives the FEAD 800 (e.g., in the electrified mode), the motor/generator 822 consumes electrical energy provided by the ESS 1000 (or more specifically batteries thereof) and uses the electrical energy to drive the accessories of the FEAD 800.

As shown in FIG. 19, the FEAD 800 includes a pump (e.g., an oil pump, a lubrication pump, etc.), shown as lubricant pump 850, that is configured to provide lubricant to the A/C compressor 848, the air compressor 808, the fan 810, and/or the hydraulic pump 832. In some embodiments, the lubricant pump 850 is a component in a fluid lubricant circuit that includes a reservoir for the lubricant, one or more filters to filter the lubricant, etc. In some embodiments, the lubricant pump 850 is configured to provide lubricant to the engine 610. The lubricant pump 850 may be selectively fluidly coupled with the accessories of the FEAD 800 (e.g., the A/C compressor 848, the air compressor 808, the fan 810, the hydraulic pump 832, etc.) or lubricant inlets (e.g., grease fittings) of the accessories of the FEAD 800 to provide lubricant (e.g., grease, liquid lubricant, oil-based lubricant, etc.) to reduce friction and reduce wear of the accessories of the FEAD 800. The lubricant fluid circuit including the lubricant pump 850 can include a valve and a branch (e.g., a tee) to selectively direct lubricant to the accessories of the FEAD 800 or moving parts of the accessories of the FEAD 800 as required, automatically, or in response to a user input. The lubricant pump 850 can include an electric motor that consumes electrical energy provided by the ESS 1000 to operate independently of operation of the engine 610 and/or the motor/generator 822 (e.g., operates when the engine 610 and/or the motor/generator 822 are in an off state, not operating to provide torque or generate electrical energy, etc.). The lubricant pump 850 is configured to receive return lubricant from any of the A/C compressor 848, the air compressor 808, the fan 810, the hydraulic pump 832, or the engine 610, and recirculate the return lubricant.

The A/C compressor 848 and the electric motor 846 are configured to operate independently of the engine 610 and the motor/generator 822 to provide A/C for occupants of the vehicle 10. The electric motor 846 operates by consuming electrical power provided by the ESS 1000 (or other batteries of the vehicle 10) and driving the A/C compressor 848. The A/C compressor 848 is configured to compress a refrigerant to pass the refrigerant through a heat exchanger for A/C. Advantageously, the A/C compressor 848 can be operated regardless of the mode of the FEAD 800 (e.g., if the FEAD 800 is being driven by the engine 610, if the FEAD 800 is being driven by the motor/generator 822, if the FEAD 800 is not being driven).

Energy Storage System Capacity, Operating Range, and Charging

Figure 20:
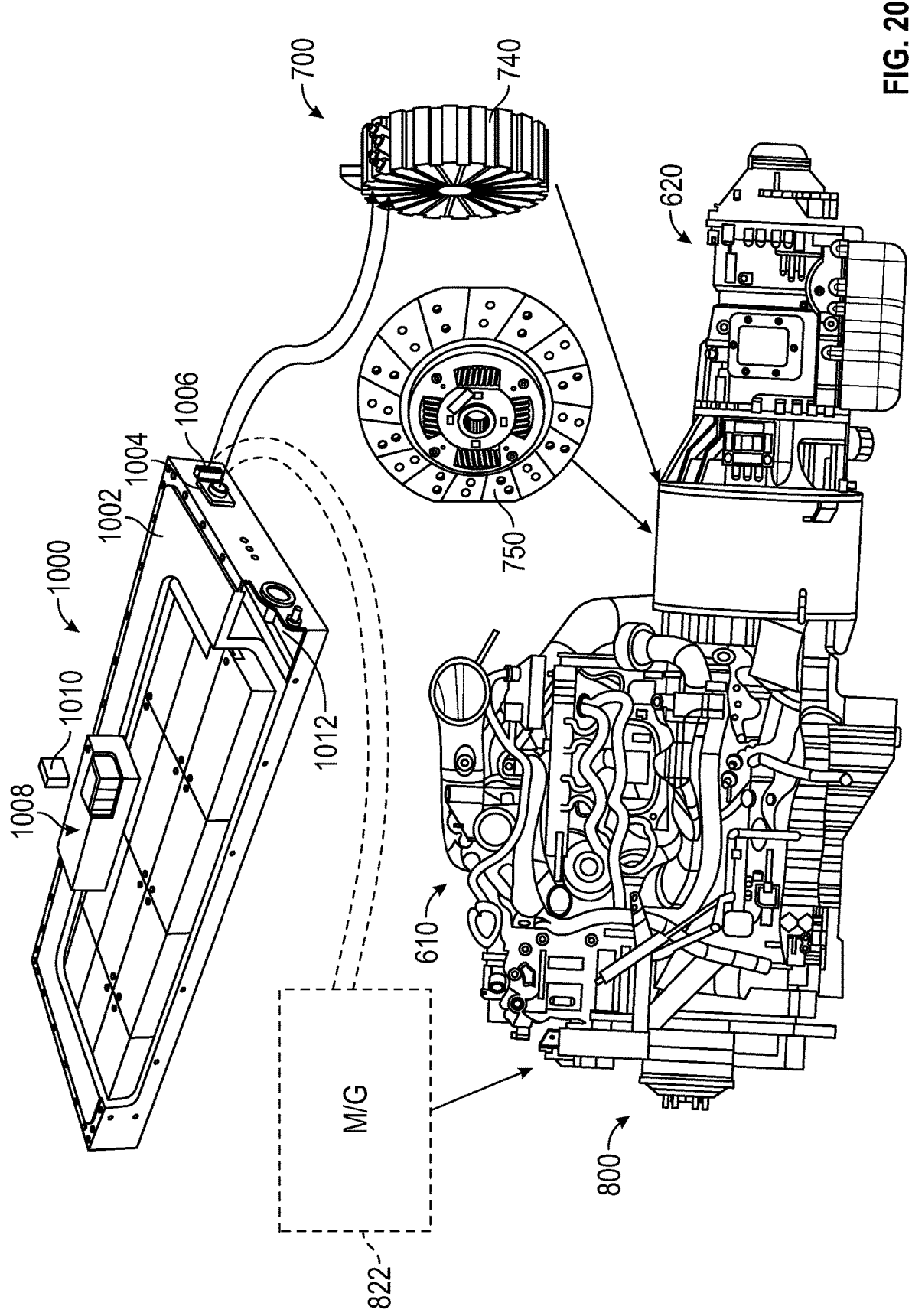
FIG. 20 is a schematic diagram of the ESS of FIG. 9, according to an exemplary embodiment.

As shown in FIG. 20, the ESS 1000 is electrically coupled to the IMG 700. In some embodiments (e.g., embodiments where the FEAD 800 includes the motor/generator 822), the ESS 1000 is also electrically coupled to the motor/generator 822 of the FEAD 800. In an electric drive mode of operation, the ESS 1000 provides power to the IMG 700 to drive the transmission 620 and/or other components/systems of the vehicle 10 (e.g., to the motor/generator 822 to drive the FEAD 800). In a charge mode of operation (e.g., during the engine mode), (i) the IMG 700 is driven by the engine 610 via the engine clutch 750 and electrical power may be generated and provided to the ESS 1000 and/or (ii) the motor/generator 822 may be driven by the engine 610 and electrical power may be generated and provided to the ESS 1000.

As shown in FIG. 20, the ESS 1000 includes a battery storage housing 1002, a power connector 1004 supported by the battery storage housing 1002, and a data connector 1006 supported by the battery storage housing 1002. The power connector 1004 provides power communication between the ESS 1000, the IMG 700, and/or the motor/generator 822. The data connector 1006 provides data communication between the ESS 1000, the IMG 700, and/or the motor/generator 822. The ESS 1000 includes a number of batteries 1008, each including a number of cells 1010. The batteries 1008 are coupled together to provide an energy storage capacity of the ESS 1000.

In some embodiments, the batteries 1008 are configured (e.g., structured, designed, etc.) to operate at 700 volts ("V"). In some embodiments, the batteries 1008 are configured to operate at 24 V. In some embodiments, the batteries 1008 are configured to operate at a voltage between 700 V and 24 V. In an exemplary embodiment, the batteries 1008 are configured to operate at 666 V nominal voltage with a 406 kW discharge power. In some embodiments, the ESS 1000 has an energy storage capacity of 30.6 kWh. In some embodiments, the ESS 1000 is configured to operate at ambient temperatures between −40 degrees Celsius and 80 degrees Celsius.

In some embodiments, the energy storage capacity is defined for a target load. The target load is defined by the vehicle 10 (e.g., weight, transmission design, suspension dynamics, etc.) and can be expressed as an average load in kilowatts ("kW"). In some embodiments, the target load is defined by a specific vehicle and a specific use case. In some embodiments, the vehicle 10 is structured to provide a silent mobility mode where the systems and components the vehicle 10 are operated using energy from the ESS 1000 and the engine 610 is inactive. The silent mobility mode can define the energy storage capacity in part. In some embodiments, the target load is defined at the gross-vehicle-weight-rating ("GVWR") of the vehicle 10. Table 1, reproduced below, depicts six use cases and associated target loads during the silent mobility mode.

In use case "Vehicle 1," the target load is 68 kW average load and results in 22 minutes of run time and 13.5 miles of distance traveled. The energy storage capacity of "Vehicle 1" can be defined as 22 minutes of run time and/or 13.5 miles of distance traveled. In some embodiments, the target load of "Vehicle 1" is at least sixty-five kilowatts (65 kW). In some embodiments, the energy storage capacity of "Vehicle 1" can be defined as at least 20 minutes of run time and/or at least 13 miles of distance traveled.

In use case "Vehicle 2," the target load is 53 kW average load and results in 29 minutes of run time and 6 miles of distance traveled. The energy storage capacity of "Vehicle 2" can be defined as 29 minutes of run time and/or 6 miles of distance traveled. In some embodiments, the target load of "Vehicle 2" is at least fifty kilowatts (50 kW). In some embodiments, the energy storage capacity of "Vehicle 2" can be defined as at least 29 minutes of run time and/or at least 6 miles of distance traveled.

In use case "Vehicle 3," the target load is 40 kW average load and results in 38 minutes of run time and 14.5 miles of distance traveled. The energy storage capacity of "Vehicle 3" can be defined as 38 minutes of run time and/or 14.5 miles of distance traveled. In some embodiments, the target load of "Vehicle 3" is at least forty kilowatts (40 kW). In some embodiments, the energy storage capacity of "Vehicle 3" can be defined as at least 35 minutes of run time and/or at least 14 miles of distance traveled.

In use case "Idle," the goal is to idle the vehicle 10 using the ESS 1000 without requiring activation of the engine 610 (e.g., operate all loads of the vehicle 10 using the ESS 1000). The target load of the "Idle" use case is 17 kW average load and results in 90 minutes of run time. The energy storage capacity of "Idle" can be defined as 90 minutes of run time and/or 0 miles of distance traveled.

In use case "Fuel_Econ," the goal is to maximize the distance traveled by the vehicle 10. The target load is 40 kW average load and results in 22 miles of distance traveled. The energy storage capacity of "Fuel_Econ" can be defined 22 miles of distance traveled.

In use case "25 mph," the goal is to maximize a time of operation while moving the vehicle 10 at 25 mph over ground. The target load is 34 kW average load and results in 44 minutes of run time. The energy storage capacity of "25 mph" can be defined as 44 minutes of run time.

SoC and the upper SoC limit is 93% of the maximum SoC. In some embodiments, the lower SoC limit is greater than or less than 20% (e.g., 5%, 10%, 15%, 25%, etc.). In some embodiments, the upper SoC limit may be greater than or less than 93% (e.g., 88%, 90%, 95%, etc.).

The ESS 1000 can include a charge controller 1012 structured to control the flow of electrical energy into the batteries 1008 using a charge profile. The charge profile instituted by the charge controller 1012 may be dependent on the battery 1008 chemistry and other considerations. In some embodiments, the energy storage capacity may be defined as the amount of energy available between the lower SoC limit and the upper SoC limit.

Figure 21:
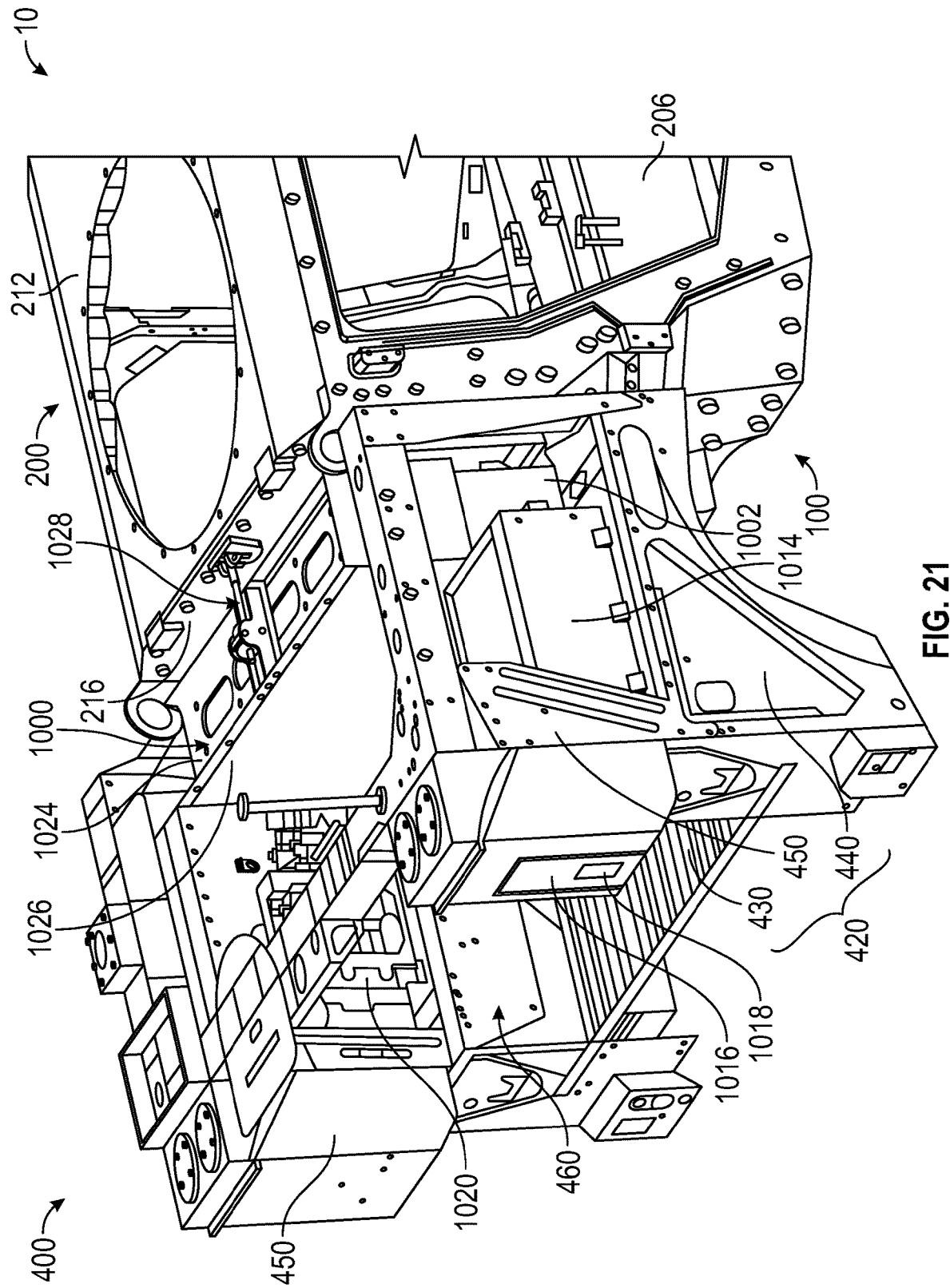
FIG. 21 is a rear perspective view of the vehicle of FIG. 1 including the ESS of FIG. 20, according to an exemplary embodiment.
Figure 22:
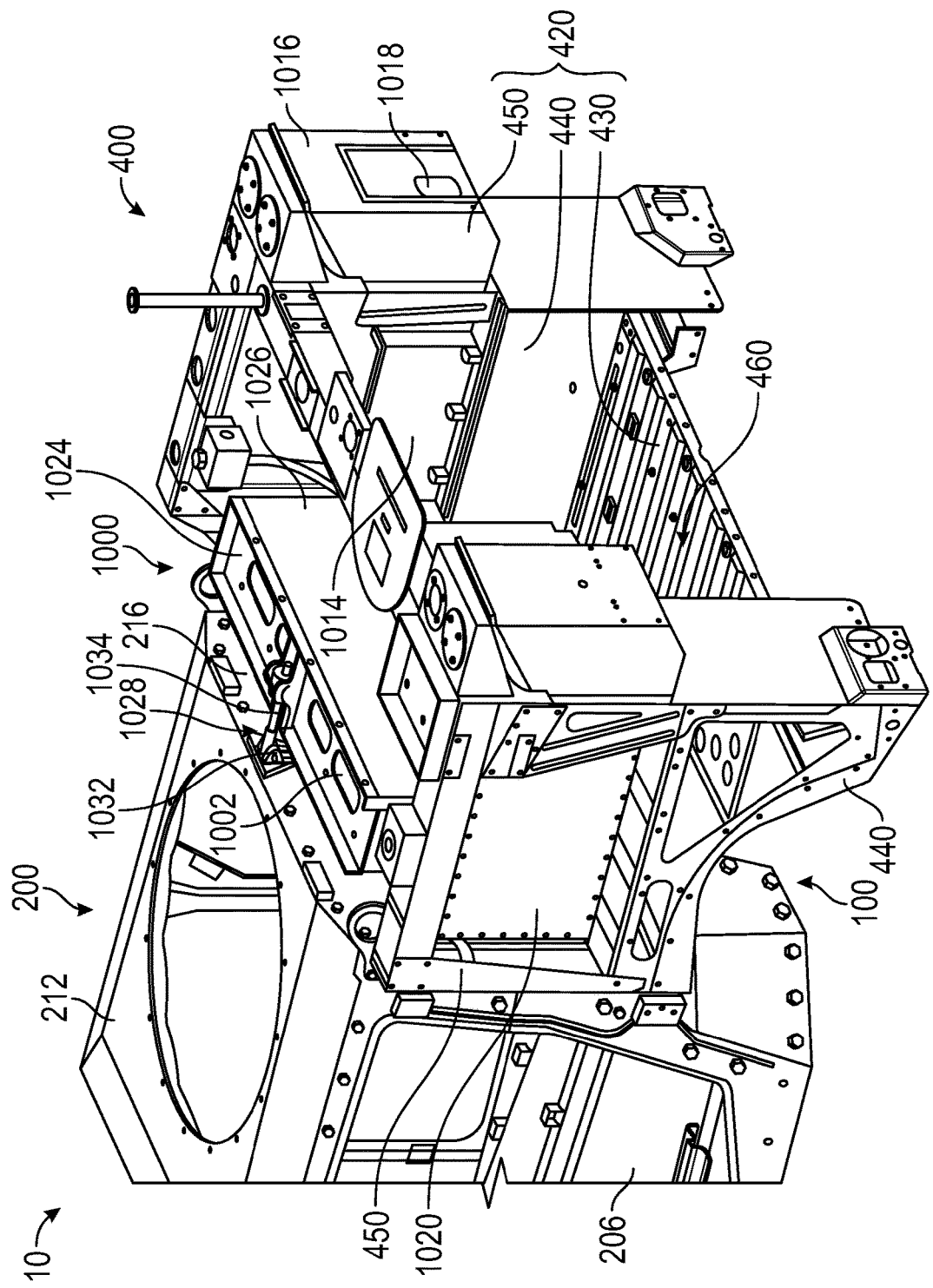
FIG. 22 is another rear perspective view of the vehicle of FIG. 21, according to an exemplary embodiment.

As shown in FIG. 21, power conversion hardware 1014 (e.g., a DC/DC converter) is coupled to the rear module 400 and structured to convert DC power received from either the IMG 700, the motor/generator 822, and/or the ESS 1000 and convert the DC power to power usable by the vehicle systems (e.g., 12 V, 24 V, and/or 48 V). A power panel 1016 is also coupled to the rear module 400 and provides a charging plug 1018 that can be used for plugging the ESS 1000 into an external power station for charging. Additionally, the power panel 1016 can include external power output that receive cords, plugs, or other power connections configured to provide power to external components and systems. An AC power system 1020 includes inverters that convert (i) available DC power from the IMG 700, the motor/generator 822, and/or the ESS 1000 into AC power for consumption by components of the vehicle 10 and/or external systems and/or (ii) AC power from the IMG 700 and/or the motor/generator 82 into DC power for consump-

TABLE 1

| Use Case | Vehicle 1 | | Vehicle 2 | | Vehicle 3 | | Idle | Fuel_Econ | 25 mph |
|---|---|---|---|---|---|---|---|---|---|
| Target Load | 68 kW | | 53 kW | | 40 kW | | 17 kW | 40 kW | 34 kW |
| Criteria | Minutes | Miles | Minutes | Miles | Minutes | Miles | Minutes | Miles | Minutes |
| Result | 22 | 13.5 | 29 | 6 | 38 | 14.5 | 90 | 22 | 44 |

In one example, the ESS 1000 includes batteries 1008 that provide 30.6 kWh of energy storage capacity and are capable of providing enough energy for a minimum pure electric vehicle (EV) drive operation (e.g., silent mobility mode) of at least 30 minutes at 25 mph (e.g., 30-35 min at 45 mph).

The battery storage housing 1002 and the batteries 1008 may have a weight of about 818.4 pounds. In some embodiments, the battery storage housing 1002 and batteries 1008 may have a weight of between about 600 pounds and about 1000 pounds. The battery storage housing 1002 may have dimensions of about 60.8 inches wide, about 29.5 inches tall, and about 8.5 inches thick. In some embodiments, the battery storage housing 1002 is shaped differently and defines different dimensions (e.g., dependent upon the positioning on the vehicle 10, the desired battery capacity, weight loading requirements, etc.). For example, the battery storage housing 1002 may be between 40 and 80 inches wide, between 10 and 40 inches tall, and between 4 and 12 inches thick. In some embodiments, the battery storage housing 1002 is not structured as a single housing containing multiple batteries. In some embodiments, each battery 1008 or a subset of batteries 1008 may include battery storage housings 1002 that may be collocated on the vehicle 10 or distributed in multiple positions about the vehicle 10.

The batteries 1008 are configured to be maintained at between a lower SoC limit and an upper SoC limit. In one embodiment, the lower SoC limit is 20% of the maximum tion by components of the vehicle 10 and/or external systems. In some embodiments, the charging plug 1018 is an external plug positioned above the rear, driver side wheel well of the rear module 400.

The engine 610, the IMG 700, the motor/generator 822, the charge controller 1012, and the batteries 1008 are sized such that electrical power generation through engine drive of the IMG 700 and/or the motor/generator 822 of the FEAD 800 is greater than the power depletion through operation of the vehicle 10 in the silent mobility mode. In other words, the charge time through engine 610 generation of electrical power via the IMG 700 and/or the motor/generator 822 of the FEAD 800 is less than the depletion time in an electric vehicle drive mode (i.e., takes less time to charge than to deplete). The batteries 1008 can be charged in a first time by the motor generator (e.g., the motor generator 822 and/or the IMG 700). The batteries 1008 are depleted in the silent mobility mode in a second time. The first time is less than the second time. In some embodiments, the vehicle 10 is structured to operate in any combination of engine 610 powered, IMG 700 powered, motor/generator 822 powered, engine 610 charging the ESS 1000, etc. For example, a blended power mode can include propulsion of the vehicle 10 via both electrical power and engine generated power. The engine 610 can charge the ESS 1000 while the vehicle 10 is driving or stationary.

Between-the-Wheels Configuration

As shown in FIGS. 21-26, the ESS 1000 is mounted in the bed cavity 460 of the rear module 400 adjacent the rear wall 216 of the passenger capsule 200 in between the wheel wells 440. A bracket 1024 supports the ESS 1000 in position and includes a protective plate 1026 that shields the ESS 1000 from impact. The protective plate 1026 may surround the ESS 1000 to provide protection from vulnerable directions. The bracket 1024 may include a vibration damping material disposed between the bracket 1024, the protective plate 1026, and the ESS 1000 to inhibit vibrational transfer between the hull and frame assembly 100 and the ESS 1000. In some embodiments, the protective plate 1026 is formed from similar materials to the body or frame of the vehicle 10 to inhibit the intrusion of hostile fragments, blasts, or projectiles.

The bracket 1024 is mounted to the vehicle 10 with an upper isolator mount 1028 that is connected between the bracket 1024 and the passenger capsule 200. In some embodiments, the upper isolator mount 1028 is generally centered on the bracket 1024 and connected to the rear wall 216 of the passenger capsule 200. The upper isolator mount 1028 provides front-to-back vibration isolation relative to the passenger capsule 200. In some embodiments, the upper isolator mount 1028 includes a spring damper shock system coupled between the bracket 1024 and the passenger capsule 200. In some embodiments, the upper isolator mount 1028 includes a pneumatic damper or a hydraulic fluid damper. In some embodiments, the upper isolator mount 1028 is coupled between the bracket 1024 and another portion of the vehicle 10 and/or the hull and frame assembly 100. In some embodiments, the upper isolator mount 1028 includes a plate 1032 rigidly coupled to the passenger capsule 200 (e.g., by welding, fastening, etc.) and a rod 1034 coupled to the plate 1032 with a spherical rod end. The rod 1034 is fastened to the bracket 1024 using a nut, a weld, or a captured end. In some embodiments, the ESS 1000 includes a plurality of the upper isolator mounts 1028.

Figure 23:
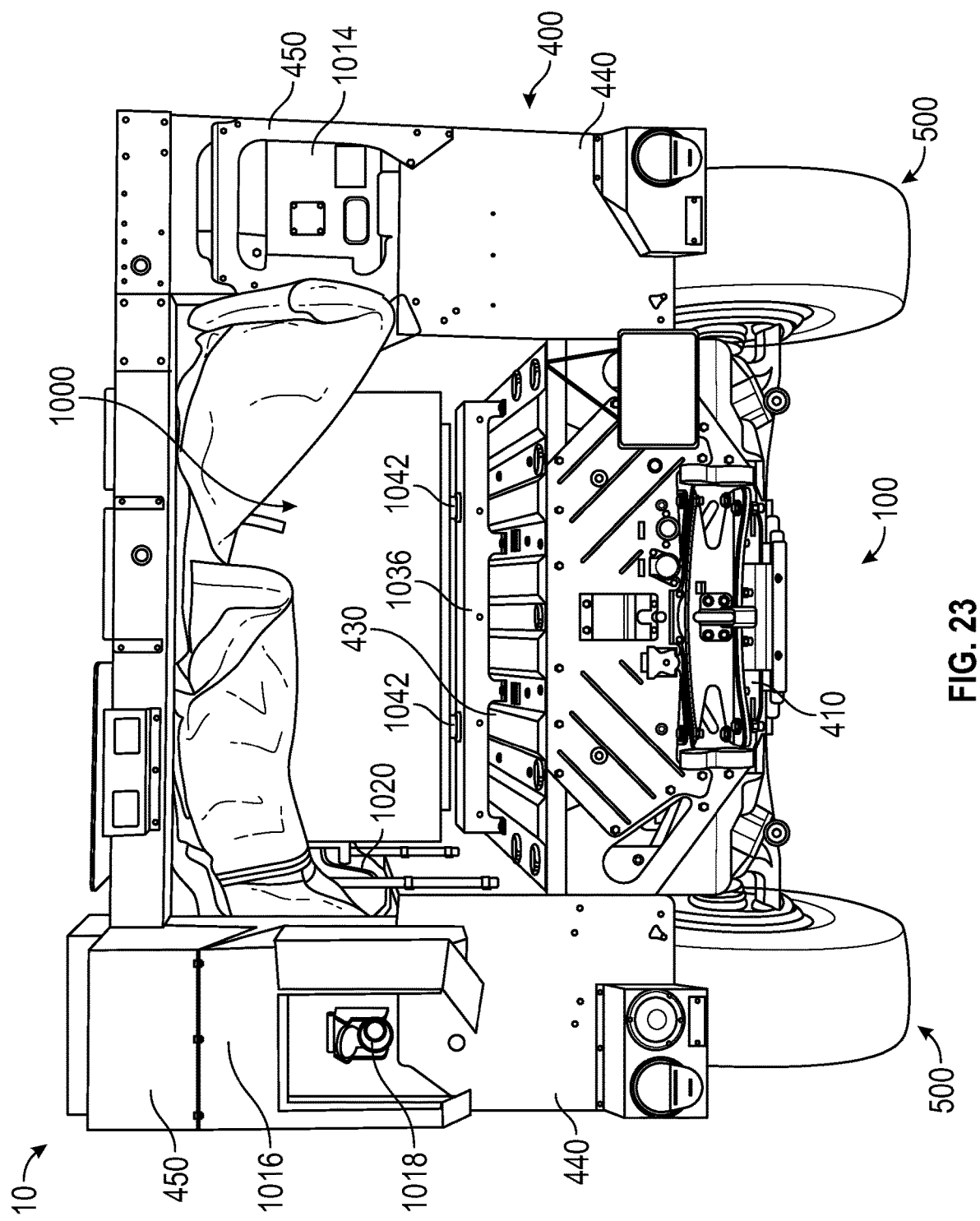
FIG. 23 is a rear view of the vehicle of FIG. 21 having a bed cavity, according to an exemplary embodiment.
Figure 24:
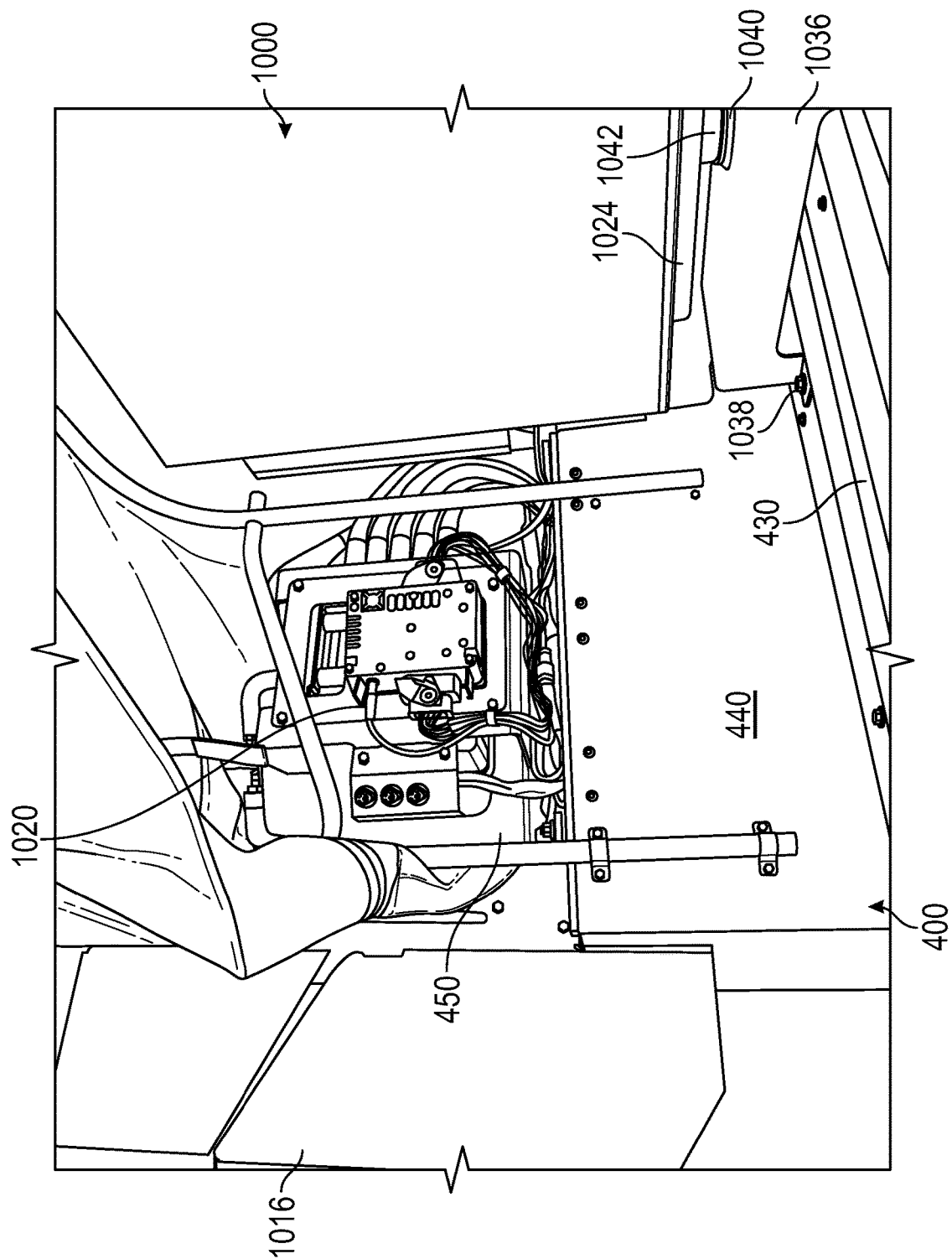
FIG. 24 is a detailed perspective view of the bed cavity of FIG. 23, according to an exemplary embodiment.
Figure 25:
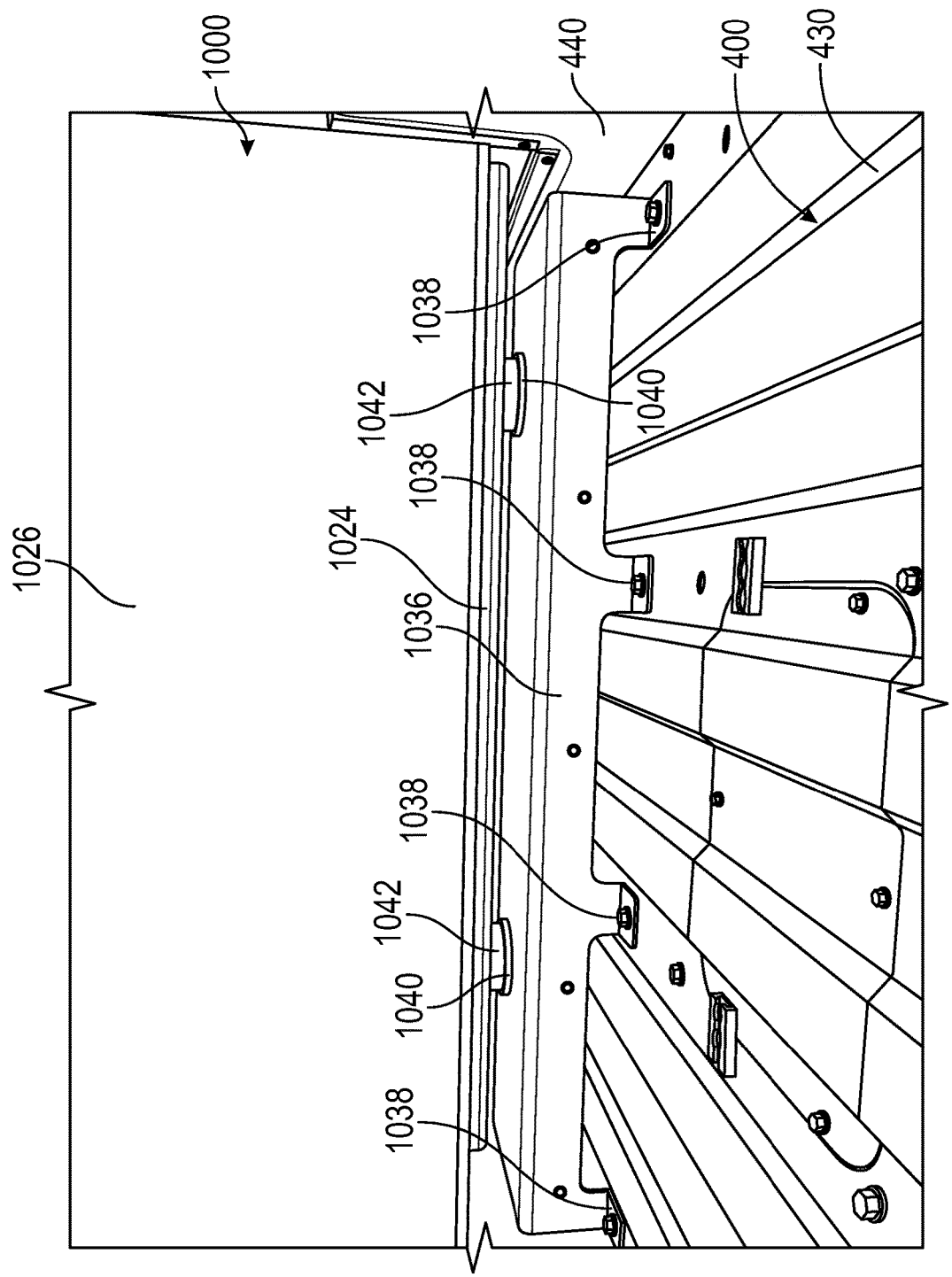
FIG. 25 is another detailed perspective view of the bed cavity of FIG. 23, according to an exemplary embodiment.
Figure 26:
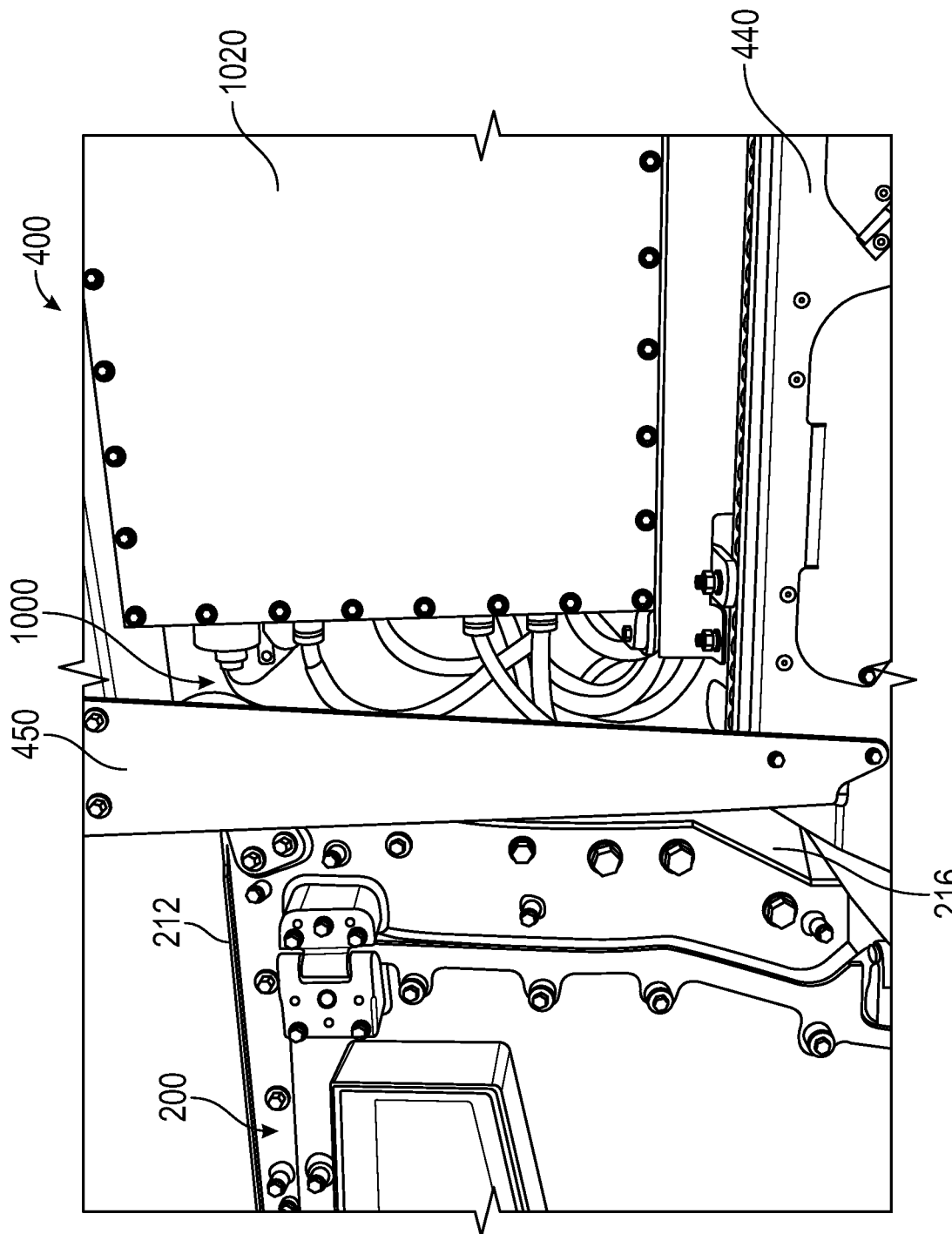
FIG. 26 is a detailed perspective view of a rear portion of the vehicle of FIG. 21, according to an exemplary embodiment.

As shown in FIGS. 23-25, a lower support 1036 is coupled to the bed 430. For example, four legs 1038 are coupled to the bed 430 using fasteners. In some embodiments, more than four or less than four legs 1038 are included. In some embodiments, the lower support 1036 is welded to the bed 430 or formed as a part of the bed 430. The lower support 1036 includes ESS mount structures in the form of recesses 1040 sized to receive lower isolator mounts 1042. In some embodiments, the recesses 1040 are circular and the lower isolator mounts 1042 are secured using adhesive. In some embodiments, the recesses are square, rectangular, oval, or another shape. In some embodiments, the lower isolator mounts 1042 are fastened to the recesses 1040, captured within the recesses 1040, or otherwise held in place between the bracket 1024 and the lower support 1036. As shown in FIG. 25, two lower isolator mounts 1042 are used to support the bracket 1024 on the lower support 1036. In some embodiments, more than two or less than two lower isolator mounts 1042 are included. In some embodiments, the lower isolator mounts 1042 are rubber or another vibration attenuating material. In some embodiments, the bracket 1024 is adhered, fastened to, captured by, or otherwise directly coupled to the lower isolator mounts 1042.

The upper isolator mount 1028 and the lower isolator mounts 1042 maintain the bracket 1024, and thereby the ESS 1000, in position relative to the passenger capsule 200 and the rear module 400 during use of the vehicle 10. The ESS 1000 is positioned within the rear module 400. The weight of the ESS 1000 is supported by the rear subframe 410. The ESS 1000 is centered between the wheel wells 440 within the bed cavity 460 and supported on top of the bed 430.

In some embodiments, the AC power system 1020 (e.g., a high voltage inverter) and power distribution components are positioned in or above driver side stowage box 450 above the rear, driver side wheel well 440 with cables running to through the tunnel slot 208 of the structural tunnel 206 to the IMG 700, the motor/generator 822 of the FEAD 800, and other high voltage components. The power conversion hardware 1014 (700V to 24V) is positioned in or above the passenger side stowage box 450 above the rear, passenger side wheel well 440 and cables run therefrom to low voltage components (e.g., cab electronics, etc.).

Controls

Figure 27:
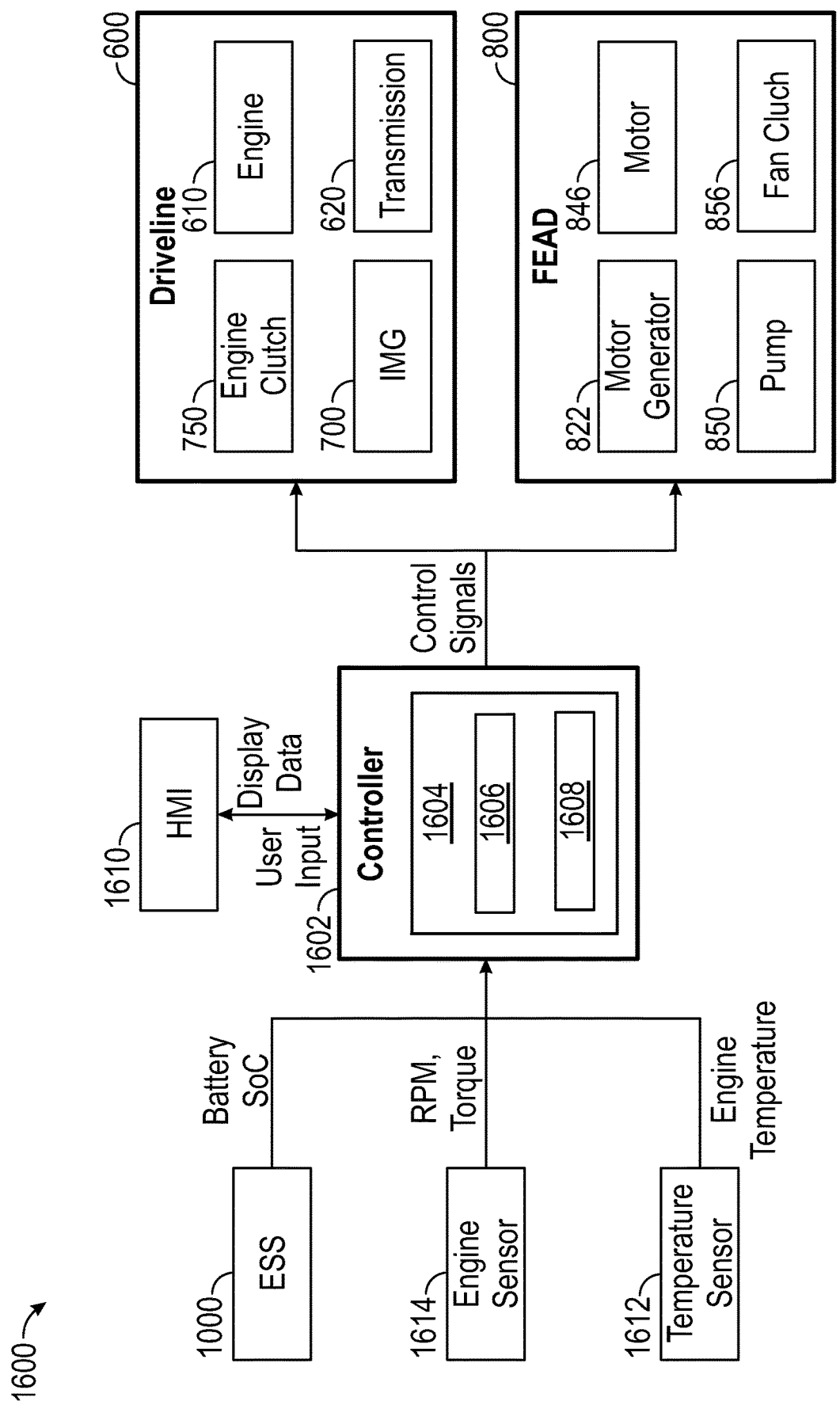
FIG. 27 is a block diagram of a control system for the vehicle of FIG. 1, according to an exemplary embodiment.
Figure 28:
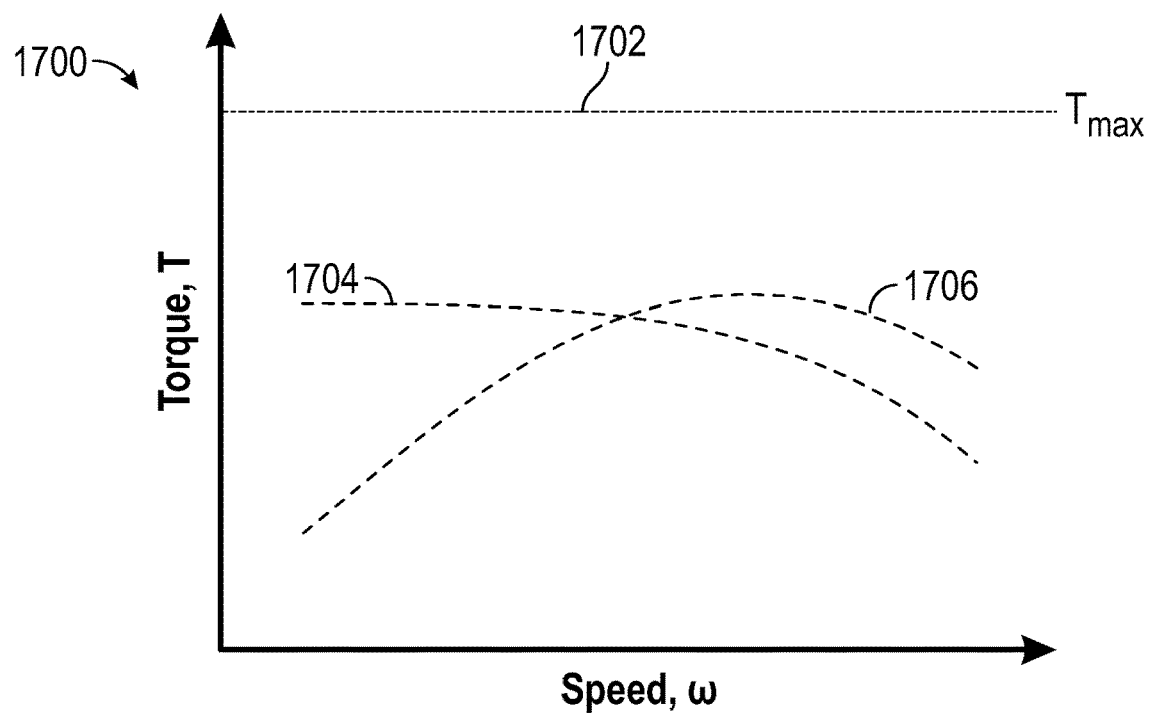
FIG. 28 is a graph showing torque versus speed for an internal combustion engine and an electric motor, the graph including a maximum torque as defined by a transmission of the driveline of FIG. 9, according to an exemplary embodiment.
Figure 29:
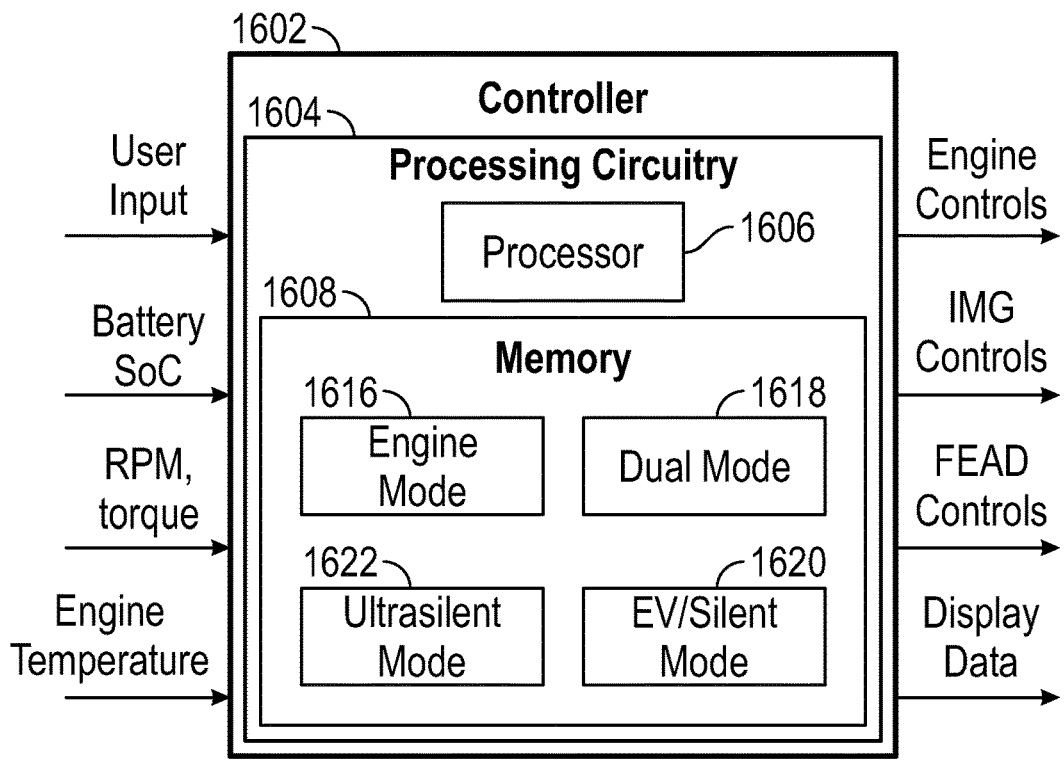
FIG. 29 is a block diagram of a controller of the control system of FIG. 27, according to an exemplary embodiment.

Referring to FIGS. 27-29, the vehicle 10 can include a control system 1600 for controlling the vehicle 10 or systems of the vehicle 10 between and according to different modes of operation. In some embodiments, the vehicle 10 is operable in an engine mode, a dual-drive mode, an EV/silent mode, and/or an ultrasilent mode. The control system 1600 includes a controller 1602 configured to transition the vehicle 10 between the different modes. According to exemplary embodiment, the control system 1600 is configured to provide control signals to the driveline 600 (e.g., the engine 610, the transmission 620, the IMG 700, the FEAD 800, etc.) to transition the driveline 600 and the FEAD 800 between the different modes.

As shown in FIG. 27, the control system 1600 includes the controller 1602, an operator interface, shown as human machine interface ("HMI") 1610, the ESS 1000 (and/or sensors or controllers of the ESS 1000), a temperature sensor 1612, and an engine sensor 1614. The ESS 1000 is configured to provide detected battery SoC of batteries or energy storage devices of the ESS 1000 to the controller 1602. The engine sensor 1614 can be a sensor of the engine 610, feedback from a controller of the engine 610, etc. to provide current speed co of the engine 610 (e.g., revolutions per minute "RPM") and/or current torque i of the engine 610. The temperature sensor 1612 is configured to provide a detected, measured, or sensed temperature of the engine 610 and/or of other components of the vehicle 10 (e.g., the ESS 1000, the transmission 620, etc.) to the controller 1602. The HMI 1610 is configured to receive a user input and provide the user input to the controller 1602 (e.g., a selection of a specific mode). The controller 1602 is configured to use any of the battery SoC, the current speed co of the engine 610, the current torque i of the engine 610, the temperature of the engine 610 (or other components), and/or the user input to transition the vehicle 10 (e.g., the driveline 600 and the FEAD 800) between the different modes, and to operate the vehicle 10 (e.g., the driveline 600 and the FEAD 800) according to the different modes. The HMI 1610 can be positioned within the passenger compartment 218 of the passenger capsule 200 of the vehicle 10.

As shown in FIGS. 27 and 29, the controller 1602 includes a processing circuit 1604 including a processor 1606 and memory 1608. The processing circuit 1604 can be communicably connected to a communications interface such that the processing circuit 1604 and the various components thereof can send and receive data via the communications interface. The processor 1606 can be implemented as a general purpose processor, an application specific integrated circuit ("ASIC"), one or more field programmable gate arrays ("FPGAs"), a group of processing components, or other suitable electronic processing components.

The memory 1608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory 1608 can be or include volatile memory or non-volatile memory. The memory 1608 can include database components, object code components, script components, or any other type of information structure for supporting the various activities and information structures described in the present application. According to some embodiments, the memory 1608 is communicably connected to the processor 1606 via the processing circuit 1604 and includes computer code for executing (e.g., by the processing circuit 1604 and/or the processor 1606) one or more processes described herein.

As shown in FIG. 29, the memory 1608 includes an engine mode 1616, a dual-drive mode 1618, an EV/silent mode 1620, and an ultrasilent mode 1622, according to an exemplary embodiment. The processing circuit 1604 is configured to transition between the different modes and operate the vehicle 10 according to an active one of the engine mode 1616, the dual-drive mode 1618, the EV/silent mode 1620, or the ultrasilent mode 1622. The controller 1602 may transition between the modes in response to a user input, or at least partially automatically (e.g., based on sensor data). The controller 1602 generates engine control signals for the engine 610, the engine clutch 750, and/or the transmission 620, IMG control signals for the IMG 700, FEAD control signals for the FEAD 800 or controllable components thereof, and display data for the HMI 1610 according to the active one of the modes 1616-1622. The HMI 1610 can be or include any of a display screen, a touch screen, input buttons, levers, a steering wheel, a joystick, alert lights, alert speakers, etc., or any other component configured to facilitate input of data from the user to the controller 1602 or output of data from the controller 1602 to the HMI 1610.

Engine Mode

According to an exemplary embodiment, the control system 1600 is configured to operate the vehicle 10 according to the engine mode 1616. In some embodiments, the controller 1602 transitions the vehicle 10 into the engine mode 1616 when a user input is received from the HMI 1610 to operate the vehicle 10 according to the engine mode 1616. In some embodiments, the engine mode 1616 is a default mode of operation of the vehicle 10.

When the vehicle 10 is operated by the controller 1602 according to the engine mode 1616, control signals are generated by the controller 1602 and provided to the driveline 600 so that the engine 610 operates to drive the driveline 600 through the IMG 700 and the transmission 620. The controller 1602 can also provide control signals to the IMG 700 so that the IMG 700 functions as a generator, is driven by the engine 610, and generates electrical energy that is provided to the ESS 1000 for storage, and/or provided to electrical components of the vehicle 10 for consumption. The engine 610 also drives the FEAD 800 in the engine mode 1616, according to some embodiments. In some embodiments, in the engine mode 1616, the controller 1602 is configured to provide control signals to the motor/generator 822 of the FEAD 800 such that the motor/generator 822 functions as a generator and is driven by the engine 610. The motor/generator 822 of the FEAD 800 generates electrical energy when driven by the engine 610 and provides the electrical energy to the ESS 1000 for storage and later use, and/or provides the electrical energy to electrical components of the vehicle 10 for consumption. In the engine mode 1616, the engine 610 may therefore drive the IMG 700, the FEAD 800, and/or the transmission 620. The engine 610 drives the axle assemblies 500 or tractive elements thereof by driving the transmission 620.

The engine 610 drives the FEAD 800 and the accessories of the FEAD 800 (e.g., the hydraulic pump 832, the air compressor 808, the fan 810, the motor/generator 822). The engine 610 may also selectively drive the fan 810 through selective engagement of the fan clutch 856. In some embodiments, the controller 1602 is configured to use the engine temperature from the temperature sensor 1612 to transition the fan clutch 856 between an engaged state and a disengaged state. For example, when the engine temperature exceeds a predetermined value, the controller 1602 may transition the fan clutch 856 into the engaged state so that the fan 810 is driven by the engine 610 to cool the engine 610 (and/or other components of the vehicle 10). When the engine temperature decreases below another predetermined temperature, the controller 1602 can generate control signals for the fan clutch 856 to transition the fan clutch 856 into the disengaged state. In some embodiments, the controller 1602 is configured to operate the HMI 1610 to provide an alert or display to the user that the fan clutch 856 is about to be actuated to the engaged state. In some embodiments, the controller 1602 operates the HMI 1610 to display a current status of the fan clutch 856.

Dual-Drive Mode

According to an exemplary embodiment, the controller 1602 is configured to transition the vehicle 10 into the dual-drive mode 1618 and operate the vehicle 10 according to the dual-drive mode 1618. In another embodiment, the controller 1602 does not include the dual-drive mode 1618. In the dual-drive mode 1618, both the engine 610 and the IMG 700 operate to provide torque to tractive elements of the vehicle 10 through the transmission 620. The engine 610 and the IMG 700 can both operate to provide a maximum torque to the transmission 620 as defined by specifications or ratings of the transmission 620. In the dual-drive mode 1618, the IMG 700 and the engine 610 cooperatively operate to drive the driveline 600.

As shown in FIG. 28, a graph 1700 illustrates a maximum allowable torque 1702, an electric motor torque speed curve 1704, and an engine torque speed curve 1706. The maximum allowable torque 1702 is defined by a rating or capability of the transmission 620. When the vehicle 10 is in the dual-drive mode 1618, the controller 1602 is configured to (i) monitor torque and speed of the engine 610 (e.g., as provided by the engine sensor 1614, a defined by a predetermined torque-speed curve for the engine 610, etc.) and (ii) determine, based on the maximum allowable torque 1702 (e.g., based on a comparison between the current torque of the engine 610 and the maximum allowable torque 1702), an additional amount of torque that can be supported by the transmission 620. If the transmission 620 can support additional torque, the controller 1602 is configured to operate the IMG 700 (e.g., by generating and providing control signals to the IMG 700) to provide additional torque to the transmission 620. In some embodiments, the controller 1602 is configured to operate the IMG 700 to provide additional torque so that a combined torque output by the IMG 700 and the engine 610 is equal to or less than the maximum allowable torque 1702 supported by the transmission 620.

The dual-drive mode 1618 can be similar to the engine mode 1616 but with the additional torque provided to the transmission 620 by the IMG 700 (e.g., with the IMG 700 operating as an electric motor). In some embodiments, the IMG 700 and the engine 610 both operate to provide combined torque to the transmission 620 at a same speed. In some embodiments, the speeds of the IMG 700 and the engine 610 are different.

Advantageously, the dual-drive mode 1618 can be used when the vehicle 10 climbs a hill, when the vehicle 10 is under enemy fire, etc. to provide enhanced acceleration and gradeability. In some embodiments, the dual-drive mode 1618 includes operating the engine 610 and the IMG 700 cooperatively to consistently (e.g., over time, or when the dual-drive mode 1618 is active) provide the maximum allowable torque 1702 to the transmission 620. In some embodiments, the controller 1602 is configured to transition the vehicle 10, or more specifically the driveline 600, into the dual-drive mode 1618 in response to a user input received via the HMI 1610. In some embodiments, the controller 1602 is configured to automatically transition the driveline 600 into the dual-drive mode 1618 in response to sensor data indicating a slope, tilt, roll, or angle of the vehicle 10 (e.g., to detect when the vehicle 10 is climbing a hill and additional or assisting torque from the IMG 700 may be advantageous).

Silent Mode

According to an exemplary embodiment, the controller 1602 includes the EV/silent mode 1620 and is configured to operate the driveline 600 according to the EV/silent mode 1620 in response to receiving a user input from the HMI 1610 to operate according to the EV/silent mode 1620. In the EV/silent mode 1620, the controller 1602 is configured to generate control signals for the engine 610 and provide the control signals to the engine 610 to shut off the engine 610. Advantageously, shutting off the engine 610 reduces a sound output of the vehicle 10 to facilitate substantially quieter operation of the vehicle 10. When the engine 610 is shut off, the driveline 600 (e.g., tractive elements of the axle assemblies 500) is driven by the IMG 700. The IMG 700 can function as an electric motor, consuming electrical energy from the ESS 1000 to drive the vehicle 10 (e.g., for transportation of the vehicle 10). Advantageously, shutting off the engine 610 also reduces a thermal signature of the vehicle 10 to facilitate concealment or harder thermal detection of the vehicle 10.

In the EV/silent mode 1620, the FEAD 800 is driven by the motor/generator 822 as described in greater detail above with reference to FIGS. 15-19. Shutting off the engine 610, driving the transmission 620 with the IMG 700, and driving the FEAD 800 with the motor/generator 822 can reduce an operational sound level of the vehicle 10 (relative to the engine mode 1616) by a significant amount. By way of example, Applicant performed a drive-by test in the engine mode and the silent mode, which resulted in about a 25 decibels (dB) reduction in sound when switching from the engine mode to the silent mode. The fan 810 and fan clutch 856 can be operated based on the temperature received from the temperature sensor 1612 as described in greater detail above with reference to the engine mode 1616. In some embodiments, the controller 1602 is configured to monitor the battery SoC of the ESS 1000 to determine an amount of energy remaining and an estimated remaining runtime of the vehicle 10 in the EV/silent mode 1620. In some embodiments, when the SoC of the ESS 1000 reduces to or below a first threshold, the controller 1602 operates the HMI 1610 to provide a warning to the user regarding the SoC of the ESS 1000. In some embodiments, the controller 1602 is configured to monitor electrical energy consumption or a rate of energy consumption of the ESS 1000 during the EV/silent mode 1620 to determine an estimated amount of runtime remaining for the vehicle 10 in the EV/silent mode 1620. In some embodiments, when the SoC of the ESS 1000 reduces to a minimum allowable level (e.g., 20% SoC), the controller 1602 is configured to automatically transition the vehicle 10 into the engine mode 1616 (e.g., starting the engine 610 by engaging the engine clutch 750). In some embodiments, the controller 1602 is configured to operate the HMI 1610 to notify the user prior to transitioning into the engine mode 1616. In some embodiments, the user can provide an input to override the automatic transition into the engine mode 1616, or to transition the vehicle 10 into the ultrasilent mode 1622.

When the vehicle 10 is operated according to the EV/silent mode 1620, the vehicle 10 may be configured to operate for at least 30 minutes at a speed of at least 25 mph (e.g., 30-35 minutes at 45 mph). In some embodiments, when in the EV/silent mode 1620, the FEAD 800 and, therefore, the fan 810 are driven by the motor/generator 822, independently of a speed of the IMG 700 that is used to drive the vehicle 10 for transportation (e.g., the transmission 620). In some embodiments, operating the fan 810 independently of operation of the IMG 700 facilitates operating the fan 810 at a constant speed (e.g., 1400 RPM) regardless of a speed of the IMG 700 (which prevents sound fluctuations that would otherwise occur due to increasing and decreasing the fan speed). However, when the vehicle 10 is operated in the engine mode 1616 and the engine 610 drives the FEAD 800, the speed of the fan 810 may vary based on variations of the speed of the engine 610.

Ultra-Silent Mode

According to an exemplary embodiment, the controller 1602 includes the ultrasilent mode 1622 and is configured to operate the vehicle 10 according to the ultrasilent mode 1622. In another embodiment, the controller 1602 does not include the ultrasilent mode 1622. When the vehicle 10 is operated according to the ultrasilent mode 1622, the controller 1602 is configured to maintain or transition the engine 610 in an off state (e.g., to reduce sound output) and drive the driveline 600 by operating the IMG 700 (e.g., to provide an output torque to the transmission 620). The ultrasilent mode 1622 can be similar to the EV/silent mode 1620 but with additional operations to further reduce sound output of the vehicle 10.

In some embodiments, the ultrasilent mode 1622 includes shutting off operation of the fan 810 by disengaging the fan clutch 856. Shutting off operation of the fan 810 by disengaging the fan clutch 856 can further reduce sound output of the vehicle 10. In some embodiments, during operation of the vehicle 10 in the ultrasilent mode 1622, automatic transitioning of the vehicle 10 into the engine mode 1616 (or more particularly, starting of the engine 610) is limited. In some embodiments, during operation of the vehicle 10 in the ultrasilent mode 1622, operation of the fan 810 of the FEAD 800, and activation of the engine 610 is limited, regardless of the temperature provided by the temperature sensor 1612, and the SoC of the batteries of the ESS 1000. In this way, the vehicle 10 can be operated in the ultrasilent mode 1622 even to the point of complete depletion of the ESS 1000. In some embodiments, the controller 1602 is configured to provide alerts, notifications, alarms, etc. to the user or operator of the vehicle 10 via the HMI 1610 to notify the operator that the batteries of the ESS 1000 are about to be depleted, that an overheat condition is proximate, etc. The operator may manually transition the vehicle 10 out of the ultrasilent mode 1622 (e.g., to start the engine 610 to charge the batteries of the ESS 1000 and/or to engage the fan 810 of the FEAD 800) as desired. Advantageously, operating the vehicle 10 according to the ultrasilent mode 1622 facilitates improved noise and thermal concealment of the vehicle 10.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the hull and frame assembly 100, the driveline 600, IMG 700, the FEAD 800, the ESS 1000, the control system 1600, etc.) as shown in the various exemplary embodiments is illustrative only. Additionally, any element disclosed in one embodiment may be incorporated or utilized with any other embodiment disclosed herein.

What is claimed is:

1. A control system for operating a driveline of a military vehicle according to a plurality of modes, the control system comprising:
processing circuitry configured to communicably couple with a user interface and the driveline of the military vehicle, the driveline comprising an engine, an integrated motor generator (IMG), and a front end accessory drive (FEAD), the FEAD comprising a plurality of accessories and an electric motor-generator, wherein the processing circuitry is configured to:
receive a user input from the user interface indicating a selected mode of the plurality of modes; and
operate the driveline according to the selected mode;
wherein the plurality of modes comprise an engine mode and an electric mode;
wherein in the engine mode, the processing circuitry is configured to operate the engine of the driveline to drive the FEAD and drive tractive elements of the military vehicle through the IMG for transportation; and
wherein in the electric mode, the processing circuitry is configured to shut off the engine to reduce a sound output of the military vehicle, operate the IMG to drive the tractive elements of the military vehicle for transportation, and operate the electric motor-generator to drive the FEAD;
wherein the plurality of modes further comprise a dual-drive mode, wherein in the dual-drive mode, the processing circuitry is configured to operate both the engine and the IMG cooperatively to drive the tractive elements of the military vehicle for transportation, and wherein the processing circuitry is configured to:
determine a maximum allowable torque based on a rating of a transmission of the military vehicle;
obtain a current speed and a current amount of torque provided by the engine;
determine if the transmission can support additional torque based on a comparison between the current amount of the torque provided by the engine and the maximum allowable torque, wherein the processing circuitry determines that the transmission can support additional torque if the current amount of torque provided by the engine is less than the maximum allowable torque; and
in response to determining that the transmission can support additional torque:
operate the IMG to provide an additional amount of torque to the tractive elements, the additional amount of torque being less than or equal to a difference between the maximum allowable torque and the current amount of torque provided by the engine;
wherein the plurality of modes further comprise an ultrasilent mode, wherein in the ultrasilent mode, the processing circuitry is configured to shut off the engine and operate the IMG to drive the tractive elements of the military vehicle for transportation using energy from an energy storage system (ESS), wherein a fan of the FEAD is disengaged in the ultrasilent mode, wherein a sound output of the military vehicle when operating in the ultrasilent mode is less than the sound output of the military vehicle when operating in the electric mode, and wherein the sound output of the military vehicle when operating in the electric mode is less than the sound output of the military vehicle when operating in the engine mode or the dual-drive mode, wherein the processing circuitry is configured to limit engagement of the fan of the FEAD and transitioning out of the ultrasilent mode until a user input to transition the military vehicle out of the ultrasilent mode is received, even if the ESS reaches complete energy depletion.

2. The control system of claim 1, wherein the ESS is supported by a rear module that is coupled to a rear end of a passenger capsule of the military vehicle.

3. The control system of claim 2, wherein electrical wiring extends from the ESS through a tunnel defined by the passenger capsule to the IMG such that the ESS is positioned away from the engine and outside of the tunnel.

4. The control system of claim 1, wherein the ESS is configured to provide power to (i) the IMG to facilitate providing a first output to drive the transmission and, thereby, drive at least one of a front axle or a rear axle and (ii) the electric motor-generator of the FEAD to facilitate providing a second output to drive the plurality of accessories of the FEAD independent of and with the engine off.

5. The control system of claim 1, wherein the IMG includes a clutch and a housing having (i) a backing plate coupled to the transmission and (ii) an engine mount coupled to the backing plate and the engine, the housing defining an interior chamber within which the clutch and the IMG are disposed, and wherein (a) the clutch and the IMG are configured in a stacked arrangement or (b) the clutch is integrated into the IMG.

6. The control system of claim 1, wherein the processing circuitry is configured to operate a clutch that is positioned to selectively couple the engine with the IMG, wherein the clutch is pneumatically-operated and spring-biased into engagement with the engine.

7. The control system of claim 1, wherein the plurality of accessories of the FEAD include an air compressor, wherein the electric motor-generator of the FEAD is electrically coupled to the ESS, wherein the driveline of the military vehicle further comprises a clutch positioned between the engine and the IMG, wherein the clutch is spring-biased into engagement with the engine and pneumatically disengaged by an air supply selectively provided thereto based on operation of the air compressor.

8. The control system of claim 7, wherein in the engine mode, (i) the clutch does not receive the air supply such that the engine is coupled to the IMG and (ii) the engine drives (a) the FEAD and (b) at least one of a front axle or a rear axle through the IMG.

9. The control system of claim 7, wherein in the electric mode the electric motor-generator of the FEAD receives power from the ESS to drive the air compressor to compress air to facilitate supplying the air supply to the clutch to disengage the clutch and decouple the engine from the IMG.

10. The control system of claim 9, wherein the air compressor is configured to charge an air tank, wherein the clutch receives the air supply from the air tank.

11. The control system of claim 9, wherein the clutch receives the air supply directly from the air compressor.

12. The control system of claim 7, wherein in an event of damage to the electric motor-generator of the FEAD or the ESS during the electric mode, the air compressor cannot be driven by the electric motor-generator and, therefore, the air supply to the clutch stops such that the clutch auto-engages with the engine and the driveline remains operational.

13. The control system of claim 12, wherein the engine can be started by inertial forces of the military vehicle if the military vehicle is moving during the event of damage.

14. The control system of claim 1, wherein the engine can be started by inertial forces of the military vehicle if the military vehicle is moving when the driveline is switched from the electric mode to the engine mode.

15. The control system of claim 1, wherein the electric motor-generator of the FEAD is configured to function as a generator to generate electricity as the FEAD is driven by the engine during the engine mode.

16. A control system for operating a military vehicle according to a plurality of modes, the control system comprising:
processing circuitry configured to communicably couple with a user interface and a driveline of the military vehicle, the driveline comprising an engine, an integrated motor generator (IMG), and a front end accessory drive (FEAD), the FEAD comprising a plurality of accessories and an electric motor-generator, wherein the processing circuitry is configured to:
receive a user input from the user interface indicating a selected mode of the plurality of modes; and
operate the driveline according to the selected mode;
wherein the plurality of modes comprise an ultrasilent mode, wherein in the ultrasilent mode, the processing circuitry is configured to shut off the engine, operate the IMG to drive tractive elements of the military vehicle for transportation, and disengage a fan of the FEAD:
wherein the processing circuitry is configured to obtain a battery state of charge (SOC) from an energy storage system (ESS), wherein when the driveline is in the ultrasilent mode, the processing circuitry is configured to:
compare the battery SOC to a first threshold;
in response to the battery SOC being less than or equal to the first threshold, operate a display to notify a user that the battery SOC is less than or equal to the first threshold;
compare the battery SOC to a second threshold, the second threshold being less than the first threshold;
in response to the battery SOC being less than or equal to the second threshold:
operate the display to notify the user that the battery SOC is less than or equal to the second threshold; and
prompt the user to provide an input to transition the military vehicle out of the ultrasilent mode and into an engine mode;
wherein the plurality of modes further comprise the engine mode, an electric mode, and a dual-drive mode;
wherein in the engine mode, the processing circuitry operates the engine to drive the FEAD, the tractive elements of the military vehicle for transportation, and the electric motor-generator of the FEAD to generate electrical energy for use or storage by one or more electrical components of the military vehicle;
wherein in the electric mode, the processing circuitry is configured to shut off the engine to reduce a sound output of the military vehicle, operate the IMG to drive the tractive elements of the military vehicle for transportation, and operate the electric motor-generator to drive the FEAD;
wherein in the dual-drive mode the processing circuitry is configured to operate both the engine and the IMG cooperatively to drive the tractive elements of the military vehicle for transportation, and is configured to consistently:
determine a maximum allowable torque based on a rating of a transmission of the military vehicle;
obtain a current speed and a current amount of torque provided by the engine;
determine if the transmission can support additional torque based on a comparison between the current amount of the torque provided by the engine and the maximum allowable torque, wherein the processing circuitry determines that the transmission can support additional torque if the current amount of torque provided by the engine is less than the maximum allowable torque; and
in response to determining that the transmission can support additional torque: operate the IMG to provide an additional amount of torque to the tractive elements, the additional amount of torque being substantially equal to a difference between the maximum allowable torque and the current amount of torque provided by the engine so that the engine and the IMG consistently provide the maximum allowable torque to the tractive elements for a combat environment.

17. The control system of claim 16, wherein the current amount of torque provided by the engine is determined by the processing circuitry based on the current speed of the engine and using a torque-speed curve of the engine, wherein the processing circuitry is further configured to determine a speed at which to operate the IMG to provide the additional amount of torque using a torque-speed curve of the IMG.

18. The control system of claim 16, wherein the processing circuitry is configured to automatically transition the military vehicle out of the engine mode and into the dual-drive mode based on sensor data indicating that the military vehicle is climbing a hill.

19. A control system for operating a military vehicle according to a first mode, a second mode, a third mode, and a fourth mode, the control system comprising processing circuitry configured to:
receive a user input from a user interface indicating a selected mode of the first mode, the second mode, the third mode, and the fourth mode; and
operate a driveline and a front end accessory drive (FEAD) of the military vehicle according to the selected mode, the driveline comprising an engine, an integrated motor generator (IMG), and the FEAD, the FEAD comprising a plurality of accessories and an electric motor-generator;
wherein in the first mode the processing circuitry is configured to:
operate the engine to drive the FEAD, tractive elements of the military vehicle through the IMG for transportation, and the electric motor-generator of the FEAD to generate electrical energy for use or storage by one or more electrical components of the military vehicle;
operate the IMG to selectively function as a generator to generate electrical energy for use or storage by one or more electrical components of the military vehicle;
wherein in the second mode the processing circuitry is configured to:
shut off the engine to reduce a sound output of the military vehicle, operate the IMG to drive the tractive elements of the military vehicle for transportation, and operate the electric motor-generator to drive the FEAD; and operate the electric motor-generator to drive the FEAD and the plurality of accessories independently of operation of the engine and the IMG;

wherein in the third mode the processing circuitry is configured to:
  operate both the engine and the IMG to cooperatively drive the tractive elements of the military vehicle for transportation, wherein the processing circuitry is configured to:
    determine a maximum allowable torque based on a rating of a transmission of the military vehicle;
    obtain a current speed and a current amount of torque provided by the engine;
    determine if the transmission can support additional torque based on a comparison between the current amount of the torque provided by the engine and the maximum allowable torque, wherein the processing circuitry determines that the transmission can support additional torque if the current amount of torque provided by the engine is less than the maximum allowable torque; and
    in response to determining that the transmission can support additional torque: operate the IMG to provide an additional amount of torque to the tractive elements, the additional amount of torque being less than or equal to a difference between the maximum allowable torque and the current amount of torque provided by the engine;

wherein in the fourth mode the processing circuitry is configured to:
  shut off the engine and operate the IMG to drive the tractive elements of the military vehicle for transportation;
  disengage a fan of the FEAD to reduce a sound output of the military vehicle, wherein the sound output of the military vehicle when operating in the fourth mode is less than the sound output of the military vehicle when operating in the second mode, and wherein the sound output of the military vehicle when operating in the second mode is less than the sound output of the military vehicle when operating in the first mode and the third mode, wherein in the fourth mode, the processing circuitry is configured to not automatically transition out of the fourth mode until receiving a user input to transition out of the fourth mode, regardless of an overheat event occurring at the military vehicle or complete depletion of energy occurring at an energy storage system (ESS) that provides the IMG with electrical energy to drive the tractive elements for transportation.

* * * * *